(12) United States Patent
Petite

(10) Patent No.: US 9,860,820 B2
(45) Date of Patent: *Jan. 2, 2018

(54) WIRELESS NETWORK PROTOCOL SYSTEMS AND METHODS

(71) Applicant: SIPCO, LLC, Atlanta, GA (US)

(72) Inventor: David Petite, Douglasville, GA (US)

(73) Assignee: SIPCO, LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/257,641

(22) Filed: Sep. 6, 2016

(65) Prior Publication Data

US 2016/0373998 A1  Dec. 22, 2016

Related U.S. Application Data

(63) Continuation of application No. 11/814,632, filed as application No. PCT/US2006/002342 on Jan. 25, 2006, now Pat. No. 9,439,126.

(Continued)

(51) Int. Cl.
*H04L 1/00* (2006.01)
*H04W 40/14* (2009.01)
(Continued)

(52) U.S. Cl.
CPC .............. *H04W 40/14* (2013.01); *H04B 3/36* (2013.01); *H04W 40/00* (2013.01); *H04W 88/04* (2013.01); *H04W 88/12* (2013.01)

(58) Field of Classification Search
CPC ......... H04L 65/00; H04L 45/00; H04L 45/02; H04L 45/04; H04L 47/10; H04L 47/127;
(Continued)

(56) References Cited

U.S. PATENT DOCUMENTS 3,665,475 A   5/1972   Gram
3,705,385 A   12/1972  Batz
(Continued)

FOREIGN PATENT DOCUMENTS

EP   0483547 A1   5/1992
EP   0578041 B1   1/1994
(Continued)

OTHER PUBLICATIONS

Prophet, Graham, Living in a Wireless Wonderland, available at http://www.ednmag.com/infoaccess.asp, Jun. 5, 2010, pp. 79-94.
(Continued)

*Primary Examiner* — Brenda H Pham
(74) *Attorney, Agent, or Firm* — Troutman Sanders LLP; James E. Schutz; Dustin B. Weeks

(57) ABSTRACT

A system and method for providing wireless network communications between a plurality of remote devices and a site controller are provided. Each network and the site controller communicates using a communications protocol adapted to allow remote devices and the site controller to independently control the communication path for transmissions sent by each device. In some embodiments, remote devices can collect and store information about other remote devices and available communication paths for optimum data transmission. Also, in some embodiments, remote devices can quickly join a preexisting network by communicating with a site controller and/or other remote devices. Other embodiments are also claimed and described.

15 Claims, 4 Drawing Sheets

Related U.S. Application Data

(60) Provisional application No. 60/646,689, filed on Jan. 25, 2005.

(51) Int. Cl.
*H04W 40/00* (2009.01)
*H04B 3/36* (2006.01)
*H04W 88/04* (2009.01)
*H04W 88/12* (2009.01)

(58) Field of Classification Search
CPC ............ H04L 47/11; H04L 2012/5608; H02W 40/24; H04W 40/34; H04W 74/0816; H04W 74/04; H04W 80/04; H04W 8/26; H04W 84/12; H04W 88/08; H04W 84/18; H04W 88/06; H04W 65/00
USPC .... 370/310.2, 312, 328, 331, 332, 338, 349, 370/351
See application file for complete search history.

(56) References Cited

U.S. PATENT DOCUMENTS

| | | |
|---|---|---|
| 3,723,876 A | 3/1973 | Seaborn, Jr. |
| 3,742,142 A | 6/1973 | Martin |
| 3,848,231 A | 11/1974 | Wooton |
| 3,892,948 A | 7/1975 | Constable |
| 3,906,460 A | 9/1975 | Halpern |
| 3,914,692 A | 10/1975 | Seaborn, Jr. |
| 3,922,492 A | 11/1975 | Lumsden |
| 3,925,763 A | 12/1975 | Wadhwani et al. |
| 4,025,315 A | 5/1977 | Mazelli |
| 4,056,684 A | 11/1977 | Lindstrom |
| 4,058,672 A | 11/1977 | Crager et al. |
| 4,083,003 A | 4/1978 | Haemmig |
| 4,120,452 A | 10/1978 | Kimura et al. |
| 4,124,839 A | 11/1978 | Cohen |
| 4,135,181 A | 1/1979 | Bogacki et al. |
| 4,204,195 A | 5/1980 | Bogacki |
| 4,213,119 A | 7/1980 | Ward et al. |
| 4,277,837 A | 7/1981 | Stuckert |
| 4,278,975 A | 7/1981 | Kimura et al. |
| 4,284,852 A | 8/1981 | Szybicki et al. |
| 4,322,842 A | 3/1982 | Martinez |
| 4,345,116 A | 8/1982 | Ash et al. |
| 4,354,181 A | 10/1982 | Spletzer |
| 4,395,780 A | 7/1983 | Gohm et al. |
| 4,396,910 A | 8/1983 | Enemark et al. |
| 4,396,915 A | 8/1983 | Farnsworth et al. |
| 4,399,531 A | 8/1983 | Grande et al. |
| 4,406,016 A | 9/1983 | Abrams et al. |
| 4,417,450 A | 11/1983 | Morgan, Jr. et al. |
| 4,436,957 A | 3/1984 | Mazza |
| 4,446,454 A | 5/1984 | Pyle |
| 4,446,458 A | 5/1984 | Cook |
| 4,454,414 A | 6/1984 | Benton |
| 4,468,656 A | 8/1984 | Clifford et al. |
| 4,488,152 A | 12/1984 | Arnason et al. |
| 4,495,496 A | 1/1985 | Miller, III |
| 4,551,719 A | 11/1985 | Carlin et al. |
| 4,611,198 A | 9/1986 | Levison et al. |
| 4,621,263 A | 11/1986 | Takenaka et al. |
| 4,630,035 A | 12/1986 | Stahl et al. |
| 4,631,357 A | 12/1986 | Grunig |
| 4,665,519 A | 5/1987 | Kirchner et al. |
| 4,669,113 A | 5/1987 | Ash et al. |
| 4,670,739 A | 6/1987 | Kelly, Jr. |
| 4,692,761 A | 9/1987 | Robinton |
| 4,704,724 A | 11/1987 | Krishnan et al. |
| 4,707,852 A | 11/1987 | Jahr et al. |
| 4,731,810 A | 3/1988 | Watkins |
| 4,742,296 A | 5/1988 | Petr et al. |
| 4,757,185 A | 7/1988 | Onishi |
| 4,788,721 A | 11/1988 | Krishnan et al. |
| 4,792,946 A | 12/1988 | Mayo |
| 4,799,059 A | 1/1989 | Grindahl et al. |
| 4,800,543 A | 1/1989 | Lyndon-James et al. |
| 4,814,763 A | 3/1989 | Nelson et al. |
| 4,825,457 A | 4/1989 | Lebowitz |
| 4,829,561 A | 5/1989 | Matheny |
| 4,849,815 A | 7/1989 | Streck |
| 4,851,654 A | 7/1989 | Nitta |
| 4,856,046 A | 8/1989 | Streck et al. |
| 4,857,912 A | 8/1989 | Everett, Jr. et al. |
| 4,864,559 A | 9/1989 | Perlman |
| 4,875,231 A | 10/1989 | Hara et al. |
| 4,884,123 A | 11/1989 | Dixit et al. |
| 4,884,132 A | 11/1989 | Morris et al. |
| 4,897,644 A | 1/1990 | Hirano |
| 4,906,828 A | 3/1990 | Halpern |
| 4,908,769 A | 3/1990 | Vaughan et al. |
| 4,912,656 A | 3/1990 | Cain et al. |
| 4,918,432 A | 4/1990 | Pauley |
| 4,918,690 A | 4/1990 | Markkula, Jr. et al. |
| 4,918,995 A | 4/1990 | Pearman et al. |
| 4,924,462 A | 5/1990 | Sojka |
| 4,928,299 A | 5/1990 | Tansky et al. |
| 4,939,726 A | 7/1990 | Flammer et al. |
| 4,940,976 A | 7/1990 | Gastouniotis et al. |
| 4,949,077 A | 8/1990 | Mbuthia |
| 4,952,928 A | 8/1990 | Carroll et al. |
| 4,962,496 A | 10/1990 | Vercellotti et al. |
| 4,967,366 A | 10/1990 | Kaehler |
| 4,968,970 A | 11/1990 | LaPorte |
| 4,968,978 A | 11/1990 | Stolarczyk |
| 4,972,504 A | 11/1990 | Daniel, Jr. et al. |
| 4,973,957 A | 11/1990 | Shimizu et al. |
| 4,973,970 A | 11/1990 | Reeser |
| 4,977,612 A | 12/1990 | Wilson |
| 4,980,907 A | 12/1990 | Raith et al. |
| 4,987,536 A | 1/1991 | Humblet |
| 4,989,230 A | 1/1991 | Gillig et al. |
| 4,991,008 A | 2/1991 | Nama |
| 4,993,059 A | 2/1991 | Smith et al. |
| 4,998,095 A | 3/1991 | Shields |
| 4,999,607 A | 3/1991 | Evans |
| 5,007,052 A | 4/1991 | Flammer |
| 5,032,833 A | 7/1991 | Laporte |
| 5,038,372 A | 8/1991 | Elms et al. |
| 5,055,851 A | 10/1991 | Sheffer |
| 5,057,814 A | 10/1991 | Onan et al. |
| 5,061,997 A | 10/1991 | Rea et al. |
| 5,079,768 A | 1/1992 | Flammer |
| 5,086,391 A | 2/1992 | Chambers |
| 5,088,032 A | 2/1992 | Bosack |
| 5,091,713 A | 2/1992 | Horne et al. |
| 5,111,199 A | 5/1992 | Tomoda et al. |
| 5,113,183 A | 5/1992 | Mizuno et al. |
| 5,113,184 A | 5/1992 | Katayama |
| 5,115,224 A | 5/1992 | Kostusiak et al. |
| 5,115,433 A | 5/1992 | Baran et al. |
| 5,117,422 A | 5/1992 | Hauptschein et al. |
| 5,124,624 A | 6/1992 | de Vries et al. |
| 5,128,855 A | 7/1992 | Hilber et al. |
| 5,130,519 A | 7/1992 | Bush et al. |
| 5,130,987 A | 7/1992 | Flammer |
| 5,131,038 A | 7/1992 | Puhl et al. |
| 5,134,650 A | 7/1992 | Blackmon |
| 5,136,285 A | 8/1992 | Okuyama |
| 5,138,615 A | 8/1992 | Lamport et al. |
| 5,155,481 A | 10/1992 | Brennan, Jr. et al. |
| 5,159,317 A | 10/1992 | Brav |
| 5,159,592 A | 10/1992 | Perkins |
| 5,162,776 A | 11/1992 | Bushnell et al. |
| 5,170,393 A | 12/1992 | Peterson et al. |
| 5,177,342 A | 1/1993 | Adams |
| 5,189,287 A | 2/1993 | Parienti |
| 5,191,192 A | 3/1993 | Takahira et al. |
| 5,191,326 A | 3/1993 | Montgomery |
| 5,193,111 A | 3/1993 | Matty et al. |
| 5,195,018 A | 3/1993 | Kwon et al. |
| 5,197,095 A | 3/1993 | Bonnet et al. |
| 5,200,735 A | 4/1993 | Hines |

(56) References Cited

U.S. PATENT DOCUMENTS

| | | |
|---|---|---|
| 5,204,670 A | 4/1993 | Stinton |
| 5,212,645 A | 5/1993 | Wildes et al. |
| 5,216,502 A | 6/1993 | Katz |
| 5,221,838 A | 6/1993 | Gutman et al. |
| 5,223,844 A | 6/1993 | Mansell et al. |
| 5,224,468 A | 7/1993 | Simon et al. |
| 5,231,658 A | 7/1993 | Eftechiou |
| 5,235,630 A | 8/1993 | Moody et al. |
| 5,239,294 A | 8/1993 | Flanders et al. |
| 5,239,575 A | 8/1993 | White et al. |
| 5,241,410 A | 8/1993 | Streck et al. |
| 5,243,338 A | 9/1993 | Brennan, Jr. et al. |
| 5,245,633 A | 9/1993 | Schwartz et al. |
| 5,251,205 A | 10/1993 | Calion et al. |
| 5,252,967 A | 10/1993 | Brennan et al. |
| 5,253,167 A | 10/1993 | Yoshida et al. |
| 5,265,150 A | 11/1993 | Helmkamp et al. |
| 5,265,162 A | 11/1993 | Bush et al. |
| 5,266,782 A | 11/1993 | Alanara et al. |
| 5,272,747 A | 12/1993 | Meads |
| 5,276,680 A | 1/1994 | Messenger |
| 5,282,204 A | 1/1994 | Shpancer et al. |
| 5,282,250 A | 1/1994 | Dent et al. |
| 5,289,165 A | 2/1994 | Belin |
| 5,289,362 A | 2/1994 | Liebl et al. |
| 5,291,516 A | 3/1994 | Dixon et al. |
| 5,295,154 A | 3/1994 | Meier et al. |
| 5,305,370 A | 4/1994 | Kearns et al. |
| 5,309,501 A | 5/1994 | Kozik et al. |
| 5,315,645 A | 5/1994 | Matheny |
| 5,317,309 A | 5/1994 | Vercellotti et al. |
| 5,319,364 A | 6/1994 | Waraksa et al. |
| 5,319,698 A | 6/1994 | Gilidewell et al. |
| 5,319,711 A | 6/1994 | Servi |
| 5,323,384 A | 6/1994 | Norwood et al. |
| 5,325,429 A | 6/1994 | Kurgan |
| 5,329,394 A | 7/1994 | Calvani et al. |
| 5,331,318 A | 7/1994 | Montgomery |
| 5,334,974 A | 8/1994 | Simms et al. |
| 5,335,265 A | 8/1994 | Cooper et al. |
| 5,343,493 A | 8/1994 | Karimullah |
| 5,344,068 A | 9/1994 | Haessig |
| 5,345,231 A | 9/1994 | Koo et al. |
| 5,345,595 A | 9/1994 | Johnson et al. |
| 5,347,263 A | 9/1994 | Carroll et al. |
| 5,352,278 A | 10/1994 | Korver et al. |
| 5,354,974 A | 10/1994 | Eisenberg |
| 5,355,278 A | 10/1994 | Hosoi et al. |
| 5,355,513 A | 10/1994 | Clarke et al. |
| 5,365,217 A | 11/1994 | Toner |
| 5,371,736 A | 12/1994 | Evan |
| 5,382,778 A | 1/1995 | Takahira et al. |
| 5,383,134 A | 1/1995 | Wrzesinski |
| 5,383,187 A | 1/1995 | Vardakas et al. |
| 5,390,206 A | 2/1995 | Rein |
| 5,406,619 A | 4/1995 | Akhteruzzaman et al. |
| 5,412,192 A | 5/1995 | Hoss |
| 5,412,654 A | 5/1995 | Perkins |
| 5,412,760 A | 5/1995 | Peitz |
| 5,413,812 A | 5/1995 | Reyes et al. |
| 5,416,475 A | 5/1995 | Tolbert et al. |
| 5,416,725 A | 5/1995 | Pacheco et al. |
| 5,420,910 A | 5/1995 | Rudokas et al. |
| 5,424,708 A | 6/1995 | Ballesty et al. |
| 5,430,729 A | 7/1995 | Rahnema |
| 5,432,507 A | 7/1995 | Mussino et al. |
| 5,438,329 A | 8/1995 | Castouniotis et al. |
| 5,439,414 A | 8/1995 | Jacob |
| 5,440,545 A | 8/1995 | Buchholz et al. |
| 5,442,553 A | 8/1995 | Parrillo |
| 5,442,633 A | 8/1995 | Perkins et al. |
| 5,445,287 A | 8/1995 | Center et al. |
| 5,445,347 A | 8/1995 | Ng |
| 5,451,929 A | 9/1995 | Adelman et al. |
| 5,451,938 A | 9/1995 | Brennan, Jr. |
| 5,452,344 A | 9/1995 | Larson |
| 5,454,024 A | 9/1995 | Lebowitz |
| 5,455,569 A | 10/1995 | Sherman et al. |
| 5,465,401 A | 11/1995 | Thompson |
| 5,467,074 A | 11/1995 | Pedtke |
| 5,467,082 A | 11/1995 | Sanderson |
| 5,467,345 A | 11/1995 | Cutler, Jr. et al. |
| 5,468,948 A | 11/1995 | Koenck et al. |
| 5,471,201 A | 11/1995 | Cerami et al. |
| 5,473,322 A | 12/1995 | Carney |
| 5,475,689 A | 12/1995 | Kay et al. |
| 5,479,400 A | 12/1995 | Dilworth et al. |
| 5,481,259 A | 1/1996 | Bane |
| 5,481,532 A | 1/1996 | Hassan et al. |
| 5,484,997 A | 1/1996 | Haynes |
| 5,488,608 A | 1/1996 | Flammer, III |
| 5,493,273 A | 2/1996 | Smurlo et al. |
| 5,493,287 A | 2/1996 | Bane |
| 5,502,726 A | 3/1996 | Fischer |
| 5,504,746 A | 4/1996 | Meier |
| 5,506,837 A | 4/1996 | Sollner et al. |
| 5,508,412 A | 4/1996 | Kast et al. |
| 5,509,073 A | 4/1996 | Monnin |
| 5,513,244 A | 4/1996 | Joao et al. |
| 5,515,419 A | 5/1996 | Sheffer |
| 5,517,188 A | 5/1996 | Carroll et al. |
| 5,522,089 A | 5/1996 | Kikinis et al. |
| 5,528,215 A | 6/1996 | Siu et al. |
| 5,528,507 A | 6/1996 | McNamara et al. |
| 5,539,825 A | 7/1996 | Akiyama et al. |
| 5,541,938 A | 7/1996 | Di Zenzo et al. |
| 5,542,100 A | 7/1996 | Hatakeyama |
| 5,544,036 A | 8/1996 | Brown, Jr. et al. |
| 5,544,322 A | 8/1996 | Cheng et al. |
| 5,544,784 A | 8/1996 | Malaspina |
| 5,548,632 A | 8/1996 | Walsh et al. |
| 5,550,358 A | 8/1996 | Tait et al. |
| 5,550,359 A | 8/1996 | Bennett |
| 5,550,535 A | 8/1996 | Park |
| 5,553,094 A | 9/1996 | Johnson |
| 5,555,258 A | 9/1996 | Snelling et al. |
| 5,555,286 A | 9/1996 | Tendler |
| 5,557,320 A | 9/1996 | Krebs |
| 5,557,748 A | 9/1996 | Norris |
| 5,562,537 A | 10/1996 | Zver et al. |
| 5,565,857 A | 10/1996 | Lee |
| 5,568,535 A | 10/1996 | Sheffer et al. |
| 5,570,084 A | 10/1996 | Ritter et al. |
| 5,572,438 A | 11/1996 | Ehlers et al. |
| 5,572,528 A | 11/1996 | Shuen |
| 5,573,181 A | 11/1996 | Ahmed |
| 5,574,111 A | 11/1996 | Brichta et al. |
| 5,583,850 A | 12/1996 | Snodgrass et al. |
| 5,583,914 A | 12/1996 | Chang et al. |
| 5,587,705 A | 12/1996 | Morris |
| 5,588,005 A | 12/1996 | Ali et al. |
| 5,589,878 A | 12/1996 | Cortjens et al. |
| 5,590,038 A | 12/1996 | Pitroda |
| 5,590,179 A | 12/1996 | Shincovich et al. |
| 5,592,491 A * | 1/1997 | Dinkins ............ H04B 7/15514 348/E7.07 |
| 5,594,431 A | 1/1997 | Sheppard et al. |
| 5,596,719 A | 1/1997 | Ramakrishnan et al. |
| 5,596,722 A | 1/1997 | Rahnema |
| 5,602,843 A | 2/1997 | Gray |
| 5,604,414 A | 2/1997 | Milligan et al. |
| 5,604,869 A | 2/1997 | Mincher et al. |
| 5,606,361 A | 2/1997 | Davidsohn et al. |
| 5,608,721 A | 3/1997 | Natarajan et al. |
| 5,608,786 A | 3/1997 | Gordon |
| 5,613,620 A | 3/1997 | Center et al. |
| 5,615,227 A | 3/1997 | Schumacher, Jr. et al. |
| 5,615,277 A | 3/1997 | Hoffman |
| 5,617,084 A | 4/1997 | Sears |
| 5,619,192 A | 4/1997 | Ayala |
| 5,623,495 A | 4/1997 | Eng et al. |
| 5,625,410 A | 4/1997 | Washino et al. |
| 5,628,050 A | 5/1997 | McGraw et al. |
| 5,629,687 A | 5/1997 | Sutton et al. |

(56) References Cited

U.S. PATENT DOCUMENTS

| | | |
|---|---|---|
| 5,629,875 A | 5/1997 | Adair, Jr. |
| 5,630,209 A | 5/1997 | Wizgall et al. |
| 5,631,554 A | 5/1997 | Briese et al. |
| 5,636,216 A | 6/1997 | Fox et al. |
| 5,640,002 A | 6/1997 | Ruppert et al. |
| 5,644,294 A | 7/1997 | Ness |
| 5,649,108 A | 7/1997 | Spiegel |
| 5,655,219 A | 8/1997 | Jusa et al. |
| 5,657,389 A | 8/1997 | Houvener |
| 5,659,300 A | 8/1997 | Dresselhuys et al. |
| 5,659,303 A | 8/1997 | Adair, Jr. |
| 5,668,876 A | 9/1997 | Falk et al. |
| 5,673,252 A | 9/1997 | Johnson et al. |
| 5,673,259 A | 9/1997 | Quick, Jr. |
| 5,673,304 A | 9/1997 | Connor et al. |
| 5,673,305 A | 9/1997 | Ross |
| 5,682,139 A | 10/1997 | Pradeep et al. |
| 5,682,476 A | 10/1997 | Tapperson et al. |
| 5,689,229 A | 11/1997 | Chaco et al. |
| 5,691,980 A | 11/1997 | Welles, II et al. |
| 5,696,695 A | 12/1997 | Ehlers et al. |
| 5,699,328 A | 12/1997 | Ishizaki et al. |
| 5,701,002 A | 12/1997 | Oishi et al. |
| 5,702,059 A | 12/1997 | Chu et al. |
| 5,704,046 A | 12/1997 | Hogan |
| 5,704,517 A | 1/1998 | Lancaster, Jr. |
| 5,706,191 A | 1/1998 | Bassett et al. |
| 5,706,976 A | 1/1998 | Purkey |
| 5,708,223 A | 1/1998 | Wyss |
| 5,708,655 A | 1/1998 | Toth et al. |
| 5,712,619 A | 1/1998 | Simkin |
| 5,712,980 A | 1/1998 | Beeler et al. |
| 5,714,931 A | 2/1998 | Petite et al. |
| 5,717,718 A | 2/1998 | Rowsell et al. |
| 5,719,564 A | 2/1998 | Sears |
| 5,722,076 A | 2/1998 | Sakabe et al. |
| 5,726,534 A | 3/1998 | Seo |
| 5,726,544 A | 3/1998 | Lee |
| 5,726,634 A | 3/1998 | Hess et al. |
| 5,726,644 A | 3/1998 | Jednacz et al. |
| 5,726,984 A | 3/1998 | Kubler et al. |
| 5,732,074 A | 3/1998 | Spaur et al. |
| 5,732,078 A | 3/1998 | Arango |
| 5,736,965 A | 4/1998 | Mosebrook et al. |
| 5,737,318 A | 4/1998 | Melnik |
| 5,740,232 A | 4/1998 | Pailles et al. |
| 5,740,366 A | 4/1998 | Mahany et al. |
| 5,742,509 A | 4/1998 | Goldberg et al. |
| 5,745,849 A | 4/1998 | Britton |
| 5,748,104 A | 5/1998 | Argyroudis et al. |
| 5,748,619 A | 5/1998 | Meier |
| 5,754,111 A | 5/1998 | Garcia |
| 5,754,227 A | 5/1998 | Fukuoka |
| 5,757,783 A | 5/1998 | Eng et al. |
| 5,757,788 A | 5/1998 | Tatsumi et al. |
| 5,760,742 A | 6/1998 | Branch et al. |
| 5,761,083 A | 6/1998 | Brown, Jr. et al. |
| 5,764,742 A | 6/1998 | Howard et al. |
| 5,767,791 A | 6/1998 | Stoop et al. |
| 5,771,274 A | 6/1998 | Harris |
| 5,774,052 A | 6/1998 | Hamm et al. |
| 5,781,143 A | 7/1998 | Rossin |
| 5,790,644 A | 8/1998 | Kikinis |
| 5,790,662 A | 8/1998 | Valerij et al. |
| 5,790,938 A | 8/1998 | Talarmo |
| 5,796,727 A | 8/1998 | Harrison et al. |
| 5,798,964 A | 8/1998 | Shimizu et al. |
| 5,801,643 A | 9/1998 | Williams et al. |
| 5,812,531 A | 9/1998 | Cheung et al. |
| 5,815,505 A | 9/1998 | Mills |
| 5,818,822 A | 10/1998 | Thomas et al. |
| 5,822,273 A | 10/1998 | Bary et al. |
| 5,822,309 A | 10/1998 | Ayanoglu et al. |
| 5,822,544 A | 10/1998 | Chaco et al. |
| 5,825,772 A | 10/1998 | Dobbins et al. |
| 5,826,195 A | 10/1998 | Westerlage et al. |
| 5,828,044 A | 10/1998 | Jun et al. |
| 5,832,057 A | 11/1998 | Furman |
| 5,838,223 A | 11/1998 | Gallant et al. |
| 5,838,237 A | 11/1998 | Revell et al. |
| 5,838,812 A | 11/1998 | Pare, Jr. et al. |
| 5,841,118 A | 11/1998 | East et al. |
| 5,841,764 A | 11/1998 | Roderique et al. |
| 5,842,976 A | 12/1998 | Williamson |
| 5,844,808 A | 12/1998 | Konsmo et al. |
| 5,845,230 A | 12/1998 | Lamberson |
| 5,848,054 A | 12/1998 | Mosebrook et al. |
| 5,852,658 A | 12/1998 | Knight et al. |
| 5,854,994 A | 12/1998 | Canada et al. |
| 5,856,974 A | 1/1999 | Gervais et al. |
| 5,862,201 A | 1/1999 | Sands |
| 5,864,772 A | 1/1999 | Alvarado et al. |
| 5,870,686 A | 2/1999 | Monson |
| 5,872,773 A | 2/1999 | Katzela et al. |
| 5,873,043 A | 2/1999 | Comer |
| 5,874,903 A | 2/1999 | Shuey et al. |
| 5,875,185 A | 2/1999 | Wang et al. |
| 5,880,677 A | 3/1999 | Lestician |
| 5,883,886 A | 3/1999 | Eaton et al. |
| 5,884,184 A | 3/1999 | Sheffer |
| 5,884,271 A | 3/1999 | Pitroda |
| 5,886,333 A | 3/1999 | Miyake |
| 5,889,468 A | 3/1999 | Banga |
| 5,892,690 A | 4/1999 | Boatman et al. |
| 5,892,758 A | 4/1999 | Argyroudis |
| 5,892,924 A | 4/1999 | Lyon et al. |
| 5,896,097 A | 4/1999 | Cardozo |
| 5,897,421 A | 4/1999 | Rink et al. |
| 5,897,607 A | 4/1999 | Jenney et al. |
| 5,898,369 A | 4/1999 | Godwin |
| 5,898,733 A | 4/1999 | Satyanarayana |
| 5,905,438 A | 5/1999 | Weiss et al. |
| 5,905,442 A | 5/1999 | Mosebrook et al. |
| 5,907,291 A | 5/1999 | Chen et al. |
| 5,907,491 A | 5/1999 | Canada |
| 5,907,540 A | 5/1999 | Hayashi |
| 5,907,807 A | 5/1999 | Chavez, Jr. et al. |
| 5,909,429 A | 6/1999 | Satyanarayana et al. |
| 5,914,656 A | 6/1999 | Ojala et al. |
| 5,914,672 A | 6/1999 | Glorioso et al. |
| 5,914,673 A | 6/1999 | Jennings et al. |
| 5,917,405 A | 6/1999 | Joao |
| 5,917,629 A | 6/1999 | Hortensius et al. |
| 5,923,269 A | 7/1999 | Shuey et al. |
| 5,926,101 A | 7/1999 | Dasgupta |
| 5,926,103 A | 7/1999 | Petite |
| 5,926,529 A | 7/1999 | Haohe et al. |
| 5,926,531 A | 7/1999 | Petite |
| 5,933,073 A | 8/1999 | Shuey |
| 5,940,771 A | 8/1999 | Gollnick et al. |
| 5,941,363 A | 8/1999 | Partyka et al. |
| 5,941,955 A | 8/1999 | Wilby et al. |
| 5,946,631 A | 8/1999 | Melnik |
| 5,948,040 A | 9/1999 | DeLorme et al. |
| 5,949,779 A | 9/1999 | Mostafa et al. |
| 5,949,799 A | 9/1999 | Grivna et al. |
| 5,953,319 A | 9/1999 | Datta et al. |
| 5,953,371 A | 9/1999 | Rowsell et al. |
| 5,953,507 A | 9/1999 | Cheung et al. |
| 5,955,718 A | 9/1999 | Levasseur et al. |
| 5,957,718 A | 9/1999 | Cheng et al. |
| 5,960,074 A | 9/1999 | Clark |
| 5,963,146 A | 10/1999 | Johnson et al. |
| 5,963,452 A | 10/1999 | Etoh et al. |
| 5,963,650 A | 10/1999 | Simionescu |
| 5,966,658 A | 10/1999 | Kennedy, III et al. |
| 5,969,608 A | 10/1999 | Sojdehei et al. |
| 5,973,756 A | 10/1999 | Erlin |
| 5,974,236 A | 10/1999 | Sherman |
| 5,978,364 A | 11/1999 | Melnik |
| 5,978,371 A | 11/1999 | Mason, Jr. et al. |
| 5,978,578 A | 11/1999 | Azarya et al. |
| 5,986,574 A | 11/1999 | Colton |

(56) References Cited

U.S. PATENT DOCUMENTS

| | | | |
|---|---|---|---|
| 5,987,011 A * | 11/1999 | Toh | H04W 40/10 370/255 |
| 5,987,331 A | 11/1999 | Grube et al. | |
| 5,987,421 A | 11/1999 | Chuang | |
| 5,991,625 A | 11/1999 | Vanderpool | |
| 5,991,639 A | 11/1999 | Rautiola et al. | |
| 5,994,892 A | 11/1999 | Turin et al. | |
| 5,995,022 A | 11/1999 | Plis et al. | |
| 5,995,592 A | 11/1999 | Shirai et al. | |
| 5,995,593 A | 11/1999 | Cho | |
| 5,997,170 A | 12/1999 | Brodbeck | |
| 5,999,094 A | 12/1999 | Nilssen | |
| 6,005,759 A | 12/1999 | Hart et al. | |
| 6,005,884 A | 12/1999 | Cook et al. | |
| 6,005,963 A | 12/1999 | Bolle et al. | |
| 6,018,659 A | 1/2000 | Avyagari et al. | |
| 6,021,664 A | 2/2000 | Granto et al. | |
| 6,023,223 A | 2/2000 | Baxter, Jr. | |
| 6,026,095 A | 2/2000 | Sherer et al. | |
| 6,028,522 A | 2/2000 | Petite | |
| 6,028,857 A | 2/2000 | Poor | |
| 6,031,455 A | 2/2000 | Grube et al. | |
| 6,032,197 A | 2/2000 | Birdwell et al. | |
| 6,035,213 A | 3/2000 | Tokuda et al. | |
| 6,035,266 A | 3/2000 | Williams et al. | |
| 6,036,086 A | 3/2000 | Sizer, II et al. | |
| 6,038,491 A | 3/2000 | McGarry et al. | |
| 6,044,062 A | 3/2000 | Brownrigg et al. | |
| 6,046,978 A | 4/2000 | Melnik | |
| 6,054,920 A | 4/2000 | Smith et al. | |
| 6,055,561 A | 4/2000 | Feldman et al. | |
| 6,060,994 A | 5/2000 | Chen | |
| 6,061,604 A | 5/2000 | Russ et al. | |
| 6,064,318 A | 5/2000 | Kirchner | |
| 6,067,017 A | 5/2000 | Stewart et al. | |
| 6,067,030 A | 5/2000 | Burnett et al. | |
| 6,069,886 A | 5/2000 | Ayerst et al. | |
| 6,073,169 A | 6/2000 | Shuey | |
| 6,073,266 A | 6/2000 | Ahmed et al. | |
| 6,073,840 A | 6/2000 | Marion | |
| 6,075,451 A | 6/2000 | Lebowitz et al. | |
| 6,078,251 A | 6/2000 | Landt et al. | |
| 6,084,867 A | 7/2000 | Meier | |
| 6,087,957 A | 7/2000 | Gray | |
| 6,088,659 A | 7/2000 | Kelley et al. | |
| 6,094,622 A | 7/2000 | Hubbard et al. | |
| 6,097,703 A | 8/2000 | Larsen et al. | |
| 6,100,816 A | 8/2000 | Moore | |
| 6,100,817 A | 8/2000 | Mason, Jr. et al. | |
| 6,101,427 A | 8/2000 | Yang | |
| 6,101,445 A | 8/2000 | Alvarado et al. | |
| 6,108,614 A | 8/2000 | Lincoln et al. | |
| 6,112,983 A | 9/2000 | D'Anniballe et al. | |
| 6,115,393 A | 9/2000 | Engel et al. | |
| 6,115,580 A | 9/2000 | Chuprun et al. | |
| 6,119,076 A | 9/2000 | Williams et al. | |
| 6,121,593 A | 9/2000 | Mansbery et al. | |
| 6,121,885 A | 9/2000 | Masone et al. | |
| 6,122,759 A | 9/2000 | Ayanoglu et al. | |
| 6,124,806 A | 9/2000 | Cunningham et al. | |
| 6,127,917 A | 10/2000 | Tuttle | |
| 6,128,551 A | 10/2000 | Davis et al. | |
| 6,130,622 A | 10/2000 | Hussey et al. | |
| 6,133,850 A | 10/2000 | Moore | |
| 6,137,423 A | 10/2000 | Glorioso et al. | |
| 6,140,975 A | 10/2000 | Cohen | |
| 6,141,347 A | 10/2000 | Shaughnessy et al. | |
| 6,150,936 A | 11/2000 | Addy | |
| 6,150,955 A | 11/2000 | Tracy et al. | |
| 6,157,464 A | 12/2000 | Bloomfield et al. | |
| 6,157,824 A | 12/2000 | Bailey | |
| 6,163,276 A | 12/2000 | Irving et al. | |
| 6,167,239 A | 12/2000 | Wright et al. | |
| 6,172,616 B1 | 1/2001 | Johnson et al. | |
| 6,173,159 B1 | 1/2001 | Wright et al. | |
| 6,174,205 B1 | 1/2001 | Madsen et al. | |
| 6,175,922 B1 | 1/2001 | Wang | |
| 6,177,883 B1 | 1/2001 | Jennetti et al. | |
| 6,178,173 B1 | 1/2001 | Mundwiler et al. | |
| 6,181,255 B1 | 1/2001 | Crimmins et al. | |
| 6,181,284 B1 | 1/2001 | Madsen et al. | |
| 6,181,981 B1 | 1/2001 | Varga et al. | |
| 6,185,307 B1 | 2/2001 | Johnson, Jr. | |
| 6,188,354 B1 | 2/2001 | Soliman et al. | |
| 6,188,675 B1 | 2/2001 | Casper et al. | |
| 6,192,282 B1 | 2/2001 | Smith et al. | |
| 6,192,390 B1 | 2/2001 | Berger et al. | |
| 6,195,018 B1 | 2/2001 | Ragle et al. | |
| 6,198,390 B1 | 3/2001 | Schlager et al. | |
| 6,199,068 B1 | 3/2001 | Carpenter | |
| 6,201,962 B1 | 3/2001 | Sturniolo et al. | |
| 6,205,143 B1 | 3/2001 | Lemieux | |
| 6,208,247 B1 | 3/2001 | Agre et al. | |
| 6,208,266 B1 | 3/2001 | Lyons et al. | |
| 6,212,175 B1 | 4/2001 | Harsch | |
| 6,215,404 B1 | 4/2001 | Morales | |
| 6,215,440 B1 | 4/2001 | Geldart et al. | |
| 6,218,953 B1 | 4/2001 | Petite | |
| 6,218,958 B1 | 4/2001 | Eichstaedt | |
| 6,218,983 B1 | 4/2001 | Kerry et al. | |
| 6,219,409 B1 | 4/2001 | Smith et al. | |
| 6,229,438 B1 | 5/2001 | Tice | |
| 6,233,327 B1 | 5/2001 | Petite | |
| 6,234,111 B1 | 5/2001 | Ulman et al. | |
| 6,236,332 B1 | 5/2001 | Conkright et al. | |
| 6,243,010 B1 | 6/2001 | Addy et al. | |
| 6,246,676 B1 | 6/2001 | Chen et al. | |
| 6,246,677 B1 | 6/2001 | Nap | |
| 6,246,886 B1 | 6/2001 | Oliva | |
| 6,249,516 B1 | 6/2001 | Brownrigg et al. | |
| 6,259,360 B1 | 7/2001 | Monico | |
| 6,271,752 B1 | 8/2001 | Vaios | |
| 6,275,166 B1 | 8/2001 | del Castillo et al. | |
| 6,275,707 B1 | 8/2001 | Reed et al. | |
| 6,286,050 B1 | 9/2001 | Pullen et al. | |
| 6,286,756 B1 | 9/2001 | Stinson et al. | |
| 6,288,634 B1 | 9/2001 | Weiss et al. | |
| 6,288,641 B1 | 9/2001 | Casais | |
| 6,295,291 B1 | 9/2001 | Larkins | |
| 6,301,514 B1 | 10/2001 | Canada et al. | |
| 6,304,556 B1 | 10/2001 | Haas | |
| 6,305,205 B1 | 10/2001 | Derks et al. | |
| 6,305,602 B1 | 10/2001 | Grabowski et al. | |
| 6,307,843 B1 | 10/2001 | Okanoue | |
| 6,308,111 B1 | 10/2001 | Koga | |
| 6,311,167 B1 | 10/2001 | Davis et al. | |
| 6,314,169 B1 | 11/2001 | Schelberg, Jr. et al. | |
| 6,317,029 B1 | 11/2001 | Fleeter | |
| 6,327,245 B1 | 12/2001 | Satyanarayana et al. | |
| 6,329,902 B1 | 12/2001 | Lee et al. | |
| 6,334,117 B1 | 12/2001 | Covert et al. | |
| 6,351,223 B1 | 2/2002 | DeWeerd et al. | |
| 6,356,205 B1 | 3/2002 | Salvo et al. | |
| 6,357,034 B1 | 3/2002 | Muller et al. | |
| 6,362,745 B1 | 3/2002 | Davis | |
| 6,363,057 B1 | 3/2002 | Ardalan et al. | |
| 6,363,422 B1 | 3/2002 | Hunter et al. | |
| 6,366,217 B1 | 4/2002 | Cunningham | |
| 6,366,622 B1 | 4/2002 | Brown et al. | |
| 6,369,769 B1 | 4/2002 | Nap et al. | |
| 6,370,489 B1 | 4/2002 | Williams et al. | |
| 6,373,399 B1 | 4/2002 | Johnson et al. | |
| 6,380,851 B1 | 4/2002 | Gilbert et al. | |
| 6,384,722 B1 | 5/2002 | Williams | |
| 6,392,692 B1 | 5/2002 | Monroe | |
| 6,393,341 B1 | 5/2002 | Lawrence et al. | |
| 6,393,381 B1 | 5/2002 | Williams et al. | |
| 6,393,382 B1 | 5/2002 | Williams et al. | |
| 6,396,839 B1 | 5/2002 | Ardalan | |
| 6,400,819 B1 | 6/2002 | Nakano et al. | |
| 6,401,081 B1 | 6/2002 | Montgomery et al. | |
| 6,405,018 B1 | 6/2002 | Reudink et al. | |
| 6,411,889 B1 | 6/2002 | Mizunuma et al. | |
| 6,415,155 B1 | 7/2002 | Koshima et al. | |

(56) References Cited

U.S. PATENT DOCUMENTS

| | | |
|---|---|---|
| 6,415,245 B2 | 7/2002 | Williams et al. |
| 6,416,471 B1 | 7/2002 | Kumar et al. |
| 6,421,354 B1 | 7/2002 | Godlewski |
| 6,421,731 B1 | 7/2002 | Ciotti, Jr. et al. |
| 6,422,464 B1 | 7/2002 | Terranova |
| 6,424,270 B1 | 7/2002 | Ali |
| 6,424,931 B1 | 7/2002 | Sigmar et al. |
| 6,430,268 B1 | 8/2002 | Petite |
| 6,431,439 B1 | 8/2002 | Suer et al. |
| 6,437,692 B1 | 8/2002 | Petite et al. |
| 6,438,575 B1 | 8/2002 | Khan et al. |
| 6,441,723 B1 | 8/2002 | Mansfield, Jr. et al. |
| 6,445,291 B2 | 9/2002 | Addy et al. |
| 6,456,960 B1 | 9/2002 | Williams et al. |
| 6,457,038 B1 | 9/2002 | Defosse |
| 6,462,644 B1 | 10/2002 | Howell et al. |
| 6,462,672 B1 | 10/2002 | Besson |
| 6,477,558 B1 | 11/2002 | Irving et al. |
| 6,483,290 B1 | 11/2002 | Hemminger et al. |
| 6,484,939 B1 | 11/2002 | Blaeuer |
| 6,489,884 B1 | 12/2002 | Lamberson et al. |
| 6,491,828 B1 | 12/2002 | Sivavec et al. |
| 6,492,910 B1 | 12/2002 | Ragle et al. |
| 6,496,696 B1 | 12/2002 | Melnik |
| 6,504,357 B1 | 1/2003 | Hemminger et al. |
| 6,504,834 B1 | 1/2003 | Fifield |
| 6,507,794 B1 | 1/2003 | Hubbard et al. |
| 6,509,722 B2 | 1/2003 | Lopata |
| 6,513,060 B1 | 1/2003 | Nixon et al. |
| 6,515,586 B1 | 2/2003 | Wymore |
| 6,519,568 B1 | 2/2003 | Harvey et al. |
| 6,532,077 B1 | 3/2003 | Arakawa |
| 6,538,577 B1 | 3/2003 | Ehrke et al. |
| 6,542,076 B1 | 4/2003 | Joao |
| 6,542,077 B2 | 4/2003 | Joao |
| 6,543,690 B2 | 4/2003 | Leydier et al. |
| 6,560,223 B1 | 5/2003 | Egan et al. |
| 6,574,234 B1 | 6/2003 | Myer et al. |
| 6,574,603 B1 | 6/2003 | Dickson et al. |
| 6,584,080 B1 | 6/2003 | Ganz et al. |
| 6,600,726 B1 | 7/2003 | Nevo et al. |
| 6,608,551 B1 | 8/2003 | Anderson et al. |
| 6,618,578 B1 | 9/2003 | Petite |
| 6,618,709 B1 | 9/2003 | Sneeringer |
| 6,628,764 B1 | 9/2003 | Petite |
| 6,628,965 B1 | 9/2003 | LaRosa et al. |
| 6,653,945 B2 | 11/2003 | Johnson et al. |
| 6,654,357 B1 | 11/2003 | Wiedeman |
| 6,665,278 B2 | 12/2003 | Grayson |
| 6,671,586 B2 | 12/2003 | Davis et al. |
| 6,671,819 B1 | 12/2003 | Passman et al. |
| 6,674,403 B2 | 1/2004 | Gray et al. |
| 6,678,235 B1 | 1/2004 | Garg |
| 6,678,255 B1 | 1/2004 | Kuriyan |
| 6,691,173 B2 | 2/2004 | Morris et al. |
| 6,731,201 B1 | 5/2004 | Bailey et al. |
| 6,735,630 B1 | 5/2004 | Gelvin et al. |
| 6,747,557 B1 | 6/2004 | Petite et al. |
| 6,751,196 B1 | 6/2004 | Hulyalkar et al. |
| 6,771,981 B1 | 8/2004 | Zalewski et al. |
| 6,775,258 B1 | 8/2004 | van Valkenburg et al. |
| 6,804,532 B1 | 10/2004 | Moon et al. |
| 6,816,088 B1 | 11/2004 | Knoska et al. |
| 6,826,607 B1 | 11/2004 | Gelvin et al. |
| 6,832,251 B1 | 12/2004 | Gelvin et al. |
| 6,842,430 B1 | 1/2005 | Melnik |
| 6,858,876 B2 | 2/2005 | Gordon et al. |
| 6,859,831 B1 | 2/2005 | Gelvin et al. |
| 6,888,876 B1 | 5/2005 | Mason, Jr. et al. |
| 6,891,838 B1 | 5/2005 | Petite |
| 6,900,737 B1 | 5/2005 | Ardalan et al. |
| 6,906,636 B1 | 6/2005 | Kraml |
| 6,914,533 B2 | 7/2005 | Petite |
| 6,914,893 B2 | 7/2005 | Petite |
| 6,922,558 B2 | 7/2005 | Delp et al. |
| 6,959,550 B2 | 11/2005 | Freeman et al. |
| 6,970,434 B1 | 11/2005 | Mahany et al. |
| 7,020,701 B1 | 3/2006 | Gelvin et al. |
| 7,027,416 B1 | 4/2006 | Kriz |
| 7,027,773 B1 | 4/2006 | McMillin |
| 7,053,767 B2 | 5/2006 | Petite et al. |
| 7,054,271 B2 | 5/2006 | Brownrigg et al. |
| 7,064,679 B2 | 6/2006 | Ehrke et al. |
| 7,103,511 B2 | 9/2006 | Petite |
| 7,117,239 B1 | 10/2006 | Hansen |
| 7,181,501 B2 | 2/2007 | Defosse |
| 7,254,372 B2 | 8/2007 | Janusz et al. |
| 7,280,483 B2 * | 10/2007 | Joshi .................... H04L 45/127 370/230.1 |
| 7,304,587 B2 | 12/2007 | Boaz |
| 7,349,682 B1 | 3/2008 | Bennett, III et al. |
| 7,408,911 B2 * | 8/2008 | Joshi .................... H04L 45/123 370/225 |
| 7,408,929 B2 | 8/2008 | Adachi |
| 7,424,527 B2 | 9/2008 | Petite |
| 7,468,661 B2 | 12/2008 | Petite et al. |
| 7,480,501 B2 | 1/2009 | Petite |
| 7,484,008 B1 | 1/2009 | Gelvin et al. |
| 7,573,813 B2 | 8/2009 | Melnik |
| 7,653,394 B2 | 1/2010 | McMillin |
| 7,739,378 B2 | 6/2010 | Petite |
| 7,808,939 B2 | 10/2010 | Bansal |
| 9,439,126 B2 * | 9/2016 | Petite .................... H04W 40/00 |
| 2001/0002210 A1 | 5/2001 | Petite |
| 2001/0003479 A1 | 6/2001 | Fujiwara |
| 2001/0021646 A1 | 9/2001 | Antonucci et al. |
| 2001/0024163 A1 | 9/2001 | Petite |
| 2001/0034223 A1 | 10/2001 | Rieser et al. |
| 2001/0038343 A1 | 11/2001 | Meyer et al. |
| 2002/0002444 A1 | 1/2002 | Williams et al. |
| 2002/0012323 A1 | 1/2002 | Petite et al. |
| 2002/0013679 A1 | 1/2002 | Petite |
| 2002/0016829 A1 | 2/2002 | Defosse |
| 2002/0019725 A1 | 2/2002 | Petite |
| 2002/0027504 A1 | 3/2002 | Petite |
| 2002/0031101 A1 | 3/2002 | Petite et al. |
| 2002/0032746 A1 | 3/2002 | Lazaridis |
| 2002/0061031 A1 | 5/2002 | Sugar et al. |
| 2002/0072348 A1 | 6/2002 | Wheeler et al. |
| 2002/0089428 A1 | 7/2002 | Walden et al. |
| 2002/0095399 A1 | 7/2002 | Devine et al. |
| 2002/0098858 A1 | 7/2002 | Struhsaker |
| 2002/0109607 A1 | 8/2002 | Cumeralto et al. |
| 2002/0136233 A1 | 9/2002 | Chen et al. |
| 2002/0158774 A1 | 10/2002 | Johnson et al. |
| 2002/0163442 A1 | 11/2002 | Fischer |
| 2002/0169643 A1 | 11/2002 | Petite et al. |
| 2002/0186665 A1 * | 12/2002 | Chaffee .................... H04L 45/00 370/255 |
| 2002/0193144 A1 | 12/2002 | Belski et al. |
| 2003/0001754 A1 | 1/2003 | Johnson et al. |
| 2003/0023146 A1 | 1/2003 | Shusterman |
| 2003/0028632 A1 | 2/2003 | Davis |
| 2003/0030926 A1 | 2/2003 | Aguren et al. |
| 2003/0034900 A1 | 2/2003 | Han |
| 2003/0035438 A1 | 2/2003 | Larrson |
| 2003/0036822 A1 | 2/2003 | Davis et al. |
| 2003/0046377 A1 | 3/2003 | Daum et al. |
| 2003/0058818 A1 | 3/2003 | Wilkes et al. |
| 2003/0069002 A1 | 4/2003 | Hunter et al. |
| 2003/0073406 A1 | 4/2003 | Benjamin et al. |
| 2003/0078029 A1 | 4/2003 | Petite |
| 2003/0093484 A1 | 5/2003 | Petite |
| 2003/0133473 A1 | 7/2003 | Manis et al. |
| 2003/0169710 A1 | 9/2003 | Fan et al. |
| 2003/0185204 A1 | 10/2003 | Murdock |
| 2003/0210638 A1 | 11/2003 | Yoo et al. |
| 2004/0047324 A1 | 3/2004 | Diener |
| 2004/0053639 A1 | 3/2004 | Petite et al. |
| 2004/0090950 A1 | 5/2004 | Lauber et al. |
| 2004/0113810 A1 | 6/2004 | Mason, Jr. et al. |
| 2004/0131125 A1 | 7/2004 | Sanderford, Jr. et al. |
| 2004/0133917 A1 | 7/2004 | Schilling |
| 2004/0183687 A1 | 9/2004 | Petite et al. |

(56) References Cited

U.S. PATENT DOCUMENTS

| | | |
|---|---|---|
| 2004/0228330 A1 | 11/2004 | Kubler et al. |
| 2004/0260808 A1 | 12/2004 | Strutt |
| 2005/0017068 A1 | 1/2005 | Zalewski et al. |
| 2005/0195775 A1 | 8/2005 | Petite |
| 2005/0190055 A1 | 9/2005 | Petite |
| 2005/0195768 A1 | 9/2005 | Petite |
| 2005/0201397 A1 | 9/2005 | Petite |
| 2005/0243867 A1 | 11/2005 | Petite |
| 2005/0270173 A1 | 12/2005 | Boaz |
| 2006/0098576 A1 | 5/2006 | Brownrigg et al. |
| 2006/0098608 A1 | 5/2006 | Joshi |
| 2007/0112907 A1 | 5/2007 | Defosse |
| 2007/0258508 A1* | 11/2007 | Werb .................. H04W 84/18 375/140 |
| 2008/0186898 A1 | 7/2008 | Petite |
| 2009/0006617 A1 | 1/2009 | Petite |
| 2009/0215424 A1 | 8/2009 | Petite |
| 2009/0243840 A1 | 10/2009 | Petite et al. |
| 2009/0068947 A1 | 12/2009 | Petite |
| 2010/0250054 A1 | 9/2010 | Petite |

FOREIGN PATENT DOCUMENTS

| | | |
|---|---|---|
| EP | 0663746 B1 | 7/1995 |
| EP | 0718954 | 6/1996 |
| EP | 0740873 B1 | 11/1996 |
| EP | 0749259 A2 | 12/1996 |
| EP | 0749260 A2 | 12/1996 |
| EP | 0766489 A2 | 4/1997 |
| EP | 0768777 A2 | 4/1997 |
| EP | 0812502 B1 | 12/1997 |
| EP | 0825577 A1 | 2/1998 |
| EP | 0999717 A2 | 5/2000 |
| EP | 1096454 | 5/2001 |
| FR | 2817110 | 5/2002 |
| GB | 2229302 | 9/1990 |
| GB | 2247761 | 3/1992 |
| GB | 2262683 | 6/1993 |
| GB | 2297663 | 8/1996 |
| GB | 2310779 | 9/1997 |
| GB | 2326002 | 12/1998 |
| GB | 2336272 | 10/1999 |
| GB | 2352004 | 1/2001 |
| GB | 2352590 | 1/2001 |
| JP | 60261288 | 12/1985 |
| JP | 1255100 | 10/1989 |
| JP | 11353573 | 12/1999 |
| JP | 200113590 | 4/2000 |
| JP | 2001063425 | 3/2001 |
| JP | 2001088401 | 4/2001 |
| JP | 2001309069 | 11/2001 |
| JP | 2001319284 | 11/2001 |
| JP | 2001357483 | 12/2001 |
| JP | 2002007672 | 1/2002 |
| JP | 2002007826 | 1/2002 |
| JP | 2002085354 | 3/2002 |
| JP | 2002171354 | 6/2002 |
| KR | 20010025431 | 4/2001 |
| WO | 90013197 | 11/1990 |
| WO | WO 95/12942 | 5/1995 |
| WO | WO 95/24177 | 9/1995 |
| WO | 95034177 | 12/1995 |
| WO | WO 96/10307 | 4/1996 |
| WO | 98000056 | 1/1998 |
| WO | WO1998/10393 | 3/1998 |
| WO | 98037528 | 8/1998 |
| WO | WO 98/45717 | 10/1998 |
| WO | 99013426 | 3/1999 |
| WO | 00023956 | 4/2000 |
| WO | WO2000/36812 | 6/2000 |
| WO | WO 00/55825 | 9/2000 |
| WO | 01015114 | 3/2001 |
| WO | 01024109 | 4/2001 |
| WO | 02008725 | 1/2002 |
| WO | 02008866 | 1/2002 |
| WO | 02052521 | 7/2002 |
| WO | 03007264 | 1/2003 |
| WO | 03021877 | 3/2003 |
| WO | WO 2004/002014 A | 12/2003 |

OTHER PUBLICATIONS

U.S. Appl. No. 12/816,266 Non-Final Office Action dated Jun. 15, 2011.
U.S. Appl. No. 12/169,536 Non-Final Office Action dated Jun. 8, 2011.
U.S. Appl. No. 12/169,536 Non-Final Office Action dated Nov. 21, 2011 0.
U.S. Appl. No. 12/689,220 Final Office Action dated Oct. 5, 2011.
U.S. Appl. No. 12/482,892 Non-Final Office Action dated Jun. 28, 2011.
U.S. Appl. No. 12/482,892 Non-Final Office Action dated Nov. 25, 2011.
Haartsen et al., "Bluetooth: Vision, Goals, and Architecture;" Mobile Computing and Communications Review; vol. 1, No. 2; pp. 1-8.
Haartsen, "Bluetooth—The Universal Radio Interface for Ad Hoc, Wireless Connectivity;" Ericsson Review No. 3, 1998; pp. 110-117.
Hahn et al., "Packet Radio Network Routing Algorithms: A Survey," IEEE Communications Magazine, vol. 22, No. 11, Nov. 1984, pp. 41-47.
Hai Omni, Features & Specifications, Home Automation, Inc., available at http://web.archive.org/web/19970216055832/www.homeauto.com/omni on Feb. 17, 2009, pp. 1-6.
Hall, "Tactical Internet System Architecture for Task Force XXI," 1996 IEEE, pp. 219-230.
Hamilton et al., "Optimal Routing in Multihop Packet Radio Networks," 1990 IEEE, pp. 389-396.
Harrington, "More Visible Vehicles," ActionLINE, Jul. 2003 (4 pages).
Harrison, "Microwave Radio in The British Telecom Access Network," Second IEE National Conference on Telecommunications, Conference Publication No. 300,Date: unknown, pp. 208-213.
Hedrick, "An Introduction to IGRP," Rutgers, The State University of New Jersey, Center for Computers and Information Services, Laboratory for Computer Science Research, Aug. 22, 1991 (Updated Aug. 10, 2005), pp. 1-21.
Hedrick, "Routing Information Protocol" (Jun. 1988), RFC 1058, available at Http://Tools.Ietf.Org/Html/Rfc1058, Jun. 24, 2009, pp. 1-34.
Hinden et al., "The DARPA Internet Gateway," RFC 823, Publisher: unknown, Sep. 1982, pp. 1-43.
Hogan, "Call of the Wi-Fi," Entrepeneur Magazine, Sep. 2003, pp. 39-42.
Holtsville et al., "Symbol Technologies, Telxon and Aironet Commit to Future Interoperability of Their Wireless Local Area Networks Based on the IEEE 802.11 Specification," Business Wire, Jun. 24, 1996, available at http://www.thefreelibrary.co ml IprintiPrintArticle.aspx?id=18414624, pp. 1-3.
Home Automation Inc., "HAI Company Background;" Publisher: Unknown, Date: unknown, pp. 1-2.
Home Toys, Inc., "HTINews Review," available at http://www.hometoys.com/htinews/aug97 Ireviews/hom evis/homevis 1 .htm on Mar. 21, 2009, pp. 1-26.
Honeywell, Inc., "Honeywell Home Control Version 2.0 Demonstratin," available at http://web.archive.org/web/19980630195929/www.hbc.honeywell.com/ on Mar. 5, 2009 (7 pages).
Hong et al., "U.S. Lightning Market Characterization, vol. II.: Energy Efficient Lighting Technology Options," Sep. 30, 2005, Reportprepared for Building Technologies Program, Office of Energy Efficiency and Renewable Energy, pp. 1-36.
Hotel Technology Next Generation, "A Guide for Understanding Wireless in Hospitality," an HTNG White Paper, Jun. 2006 (Jayne O'Neill, ed.), pp. 1-77.

(56) References Cited

OTHER PUBLICATIONS

Hruschka et al., "Packet Radio, Drahtlose Datenubertragung im Amateurfunk," Elektor, Jun. 1991, pp. 54-57 and 84.
Hsu et al., "Wireless Communications for Smart Dust," Berkeley: UCLA, Jan. 30, 1998, pp. 1-20.
Hubner et al., "A Distributed Multihop Protocol for Mobile Stations to Contact a Stationary Infrastructure," The Third IEE Conference on Telecommunications, Conference Publication No. 331, Date: unknown, pp. 204-207.
Humpal, "Extended Timers for Fort Riley," Publisher: unknown; Mar. 1993.
Humpal, "Modified Download Files for Fort Riley," Publisher: unknown; Apr. 1994.
Internet Protocol, Version 4 (IPv4), RFC791 (Sep. 1981).
Internet Protocol, Version 6 (IPv6) Specification, RFC 2460 (Dec. 1998).
Internet Protocol; DARPA Internet Program Protocol Specification, John Postel Editor; Information Sciences Institute, University of Southern California, California; Sep. 1981; pp. 1-45.
Iwata et al., "Scalable Routing Strategies for Ad Hoc Wireless Networks," IEEE Journal on Selected Areas in Communications, vol. 17, No. 8, Aug. 1999, pp. 1369-1379.
Jacobsen, "The Building Blocks of a Smart Sensor for Distributed Control Networks," IEEE Technical Applications Conference Northcon, Nov. 4-6, 1998, pp. 285-290.
JDS Technologies, "Infrafred Xpander, IR-XP2, User Manual," Date: unknown, pp. 1-15.
JDS Technologies, "Model: 8R5PR, 8 Channel RS485 Relay Xpander, Installation Manual," pp. 1-5.
JDS Technologies, "Stargate 8 Channel RS-485 HUB," Publisher: unknown, Date: unknown, pp. 1.
JDS Technologies, "Stargate Interactive Automation System," 1998, pp. 1-2.
JDS Technologies, "Stargate, Operation Manual," Mar. 2000, pp. 1-114.
JDS Technologies, "Stargate-IP System Layout," Publisher: unknown; Date: unknown, pp. 1.
JDS Technologies, "Support: Protocol Specifications," available at http://jdstechnologies.com/protocoLhtm, on Feb. 16, 2009, pp. 1-32.
JDS Technologies, "TimeCommander, TimeCommander Plus, User Guide," Jun. 1998, pp. 1-95.
JDS Technologies, "Web Xpander, Installation and Operation Manual," Feb. 2004, pp. 1-34.
Jimenez-Cedeno et aL, "Centralized Packet Radio Network: A Communication Approach Suited for Data Collection in Real-Time Flash Flood Prediction System," ACM-SAC 1993, pp. 709-713.
Johnson Controls, Inc., LonWorks® Digital Controller, 1998, pp. 1-12.
Johnson et al., "Dynamic Source Routing in Ad Hoc Wireless Networks," reprinted in Mobile Computing; Tomasz Imielinski and Hank Korth eds., 1996; Kluwer Academic Publishers, pp. 153-181.
Johnson et al., "Protocols for Adaptive Wireless and Mobile Networking," IEEE Personal Communications, 3(1), Feb. 1996, pp. 1-18.
Johnson et aL, "Route Optimization in Mobile IP," Internet Draft (Nov. 28, 1994), available at http://www.monarch.cs.rice.edu/internetdrafts/draft-ietf-mobileip-optim-OO.txt., 9/26109, pp. 1-29.
Johnson, "Mobile Host Internetworking Using IP Loose Source Routing," Carnegie Mellon University CMU-CS-93-128, DARPA Order No. 7330, Feb. 1993, pp. 1-18.
Johnson, "Scalable and Robust Internetwork Routing for Mobile Hosts," 1994 IEEE, pp. 1-11.
Kaashoek et al., "FLIP: An Internetwork Protocol for Supporting Distributed Systems," ACM Transactions on Computer Systems, vol. 11, No. 1, Feb. 1993, pp. 73-106.
Kaiser et al., "Detailed Progress Report—LWIM Applications, Systems Verification and Field Test," UCLA.
Kaiser et al., "Low Power Wireless Integrated Microsensors (LWIM), BAA 94-15 Proposal Abstract," UCLA Electrical Engineering Department, Rockwell Science Center, Date: unknown, 15 pages.
Kaiser et al., "Low Power Wireless Integrated Microsensors (LWIM), Request for Support to Project", UCLA Electrical Engineering Department, Rockwell Science Center, Sep. 13, 1994, 71 pages.
Kaiser et al., "Low Power Wireless Integrated Microsensors (LWIM)," UCLA; Rockwell Science Center; LWIM Kickoff Meeting, Aug. 8, 1995, Presented to Dr. Ken Gabriel (ARPA), Dr. Elissa Sobolewski (ARPA), and Dr. Joseph Kielman (FBI), 62 pages.
Kaiser et al., "Program Mission: Low Power Wireless Integrated Microsensor (LWIM)," UCLA, Date: unknown.
Kaiser, "Circuits and Systems for Embedded Wireless Devices: Low Power Sensor, Interface, Signal Processing, Communication, and Network Systems," Ecole Poly technique Federale de Lausanne, pp. 1-40.
Elster's Initial Disclosure of Invalidity Contentions Pursuant to LPR 4.3; *IPCO, LLC v. Elster Electricity, LLC*, Northern District of Georgia Case No. 1:05-cv-1138 (183 pages).
Elster's First Supplement to its Initial Disclosure of Invalidity Contentions Pursuant to LPR 4.3; *IPCO, LLC v. Elster Electricity, LLC*, Northern District of Georgia Case No. 1:05-cv-1138 (154 pages).
Elster's Second Supplemental to its Initial Disclosure of Invalidity Contentions Pursuant to LPR 4.3; *IPCO, LLC v. Elster Electricity, LLC*, Northern District of Georgia Case No. 1:05-cv-1138 (111 pages).
Defendant's Joint Preliminary Invalidity Contentions filed by Defendants Crestron Electronics, Inc. and Wayne-Dalton Corporation in *SIPCO, LLC v. Amazon. Com, Inc. et al.*, District Court for the Eastern District of Texas Case No. 2:08-cv-359 (180 pages).
Trilliant Network, Inc.'s Invalidity Contentions Pursuant to Patent Rule 3-3, *IP Co. LLC v. Oncor Electric Delivery Company LLC et al.*, District Court for the Eastern District of Texas Case No. 2:09-cv-37 (112 pages).
Sensus's Invalidity Contentions filed by Defendant Sensus USA Inc. in *SIPCO, LLC v. Sensus USA Inc.*, District Court for the Eastern District of Texas Case No. 2:09-cv-37 (21 pages).
Defendant EKA Systems, Inc.'s Invalidity Contentions, *IP Co. LLC v. Oncor Electric Delivery Company LLC et al.*, District Court for the Eastern District of Texas Case No. 2:09-cv-37 (110 pages).
EKA Systems, Inc.'s Invalidity Contentions Pursuant to Patent Rule 3-3, *IP Co. LLC v. Oncor Electric Delivery Company LLC et al.*, District Court for the Eastern District of Texas Case No. 2:09-cv-37 (110 pages).
Sensus's Invalidity Contentions filed by Defendant Sensus USA Inc. in *SIPCO, LLC v. Sensus USA Inc.*, District Court for the Eastern District of Texas Case No. 6:09-cv-532 (22 pages).
Defendant Datamatic, LTD's Invalidity Contentions to Plaintiff, *SIPCO, LLC v. Datamatic LTD, et al.*, District Court for the Eastern District of Texas Case No. 6:09-cv-532 (2 pages with 7 claim chart exhibits).
Johnson Controls, Inc.'s Invalidity Contentions and Disclosures Pursuant to P.R. 3-3 and 3-4, *SIPCO, LLC v. Datamatic Ltd, et al.*, District Court for the Eastern District of Texas Case No. 6:09-cv-532 (59 pages).
Trilliant Networks, Inc.'s Invalidity Contentions to Plaintiff, *SIPCO, LLC v. Datamatic Ltd, et al.*, Eastern District Court for the District of Texas Case No. 6:09-cv-532 (418 pages).
Defendant Datamatic, LTD's Invalidity Contentions to Plaintiff Pursuant to P.R. 3-3(a), *SIPCO, LLC v. Datamatic Ltd's et al.*, District Court for the Eastern District of Texas Case No. 6:09-cv-532 (2 pages with 7 claim chart exhibits).
Johnson Controls, Inc.'s Supplement Letter to the Invalidity Contentions, *SIPCO, LLC v. Datamatic Ltd, et al.*, District Court for the Eastern District of Texas Case No. 6:09-cv-532 (5 pages and 99 page Addendum).
Defendant's Invalidity Contentions Pursuant to P.R. 3-3 and 3-4 filed by Control4 Corporation et al., *SIPCO, LLC v. Control4Corporation*, Eastern District of Texas Case No. 6: 10-cv-249 (85 pages).

(56) References Cited

OTHER PUBLICATIONS

Johnson Controls, Inc.'s Supplemental Invalidity Contentions and Disclosures Pursuant to P.R. 3-3 and 3-4, *SIPCO, LLC* v. *Datamatic Ltd, et al.*, District Court for the Eastern District of Texas Case No. 6:09-cv-532 (89 pages).
Defendant Toro Company's Motion for Summary Judgment of Invalidity, *SIPCO, LLC* v. *The Toro Company, JLH Labs, LLC, and Jason Hill*, District Court for the Eastern District of Pensylvania Case No. 08-CV-00505-TJS
Babak Daneshrad, et al.; 1997 Project Summary "Mobile Versatile Radios (MoVeR); "University of California, Los Angeles; pp. 1-4.
Rajeev Jain, et al.; 1997 Project Summary "Held Untethered Nodes;" University of California, Los Angeles; pp. 1-5.
Randy H. Katz and Eric A. Brewer; 1997 Project Summary "Towards a Wireless Overlay Internetworking 3 Architecture," University of California, Berkeley; pp. 1-8, including slide show presentation at http://daedalus.cs.berkeley.edu/talks/retreat.6.96/Overview.pdf.
J.J. Garcia-Luna-Aceves, et al.; "Wireless Internet Gateways (Wings)," IEEE, 1997; pp. 1271-1276.
Randy H. Katz, et al., "The Bay Area Research Wireless Access Network (BARWAN);" Electrical Engeneering and 5 Computer Science Department, University of California, Berkeley, CA; IEEE, 1996; pp. 15-20, including slide show presentation at http://daedalus.cs.berkeley.edu/talks/retreat.6.97/BARWAN.S97.ppt.
USPO's Decision dated Nov. 28, 2008 Denying Ex Parte Reexamination of U.S. Pat. No. 7,103,511 in Reexamination Control No. 90/010,315.
USPTO's Decision dated Jun. 22, 2009 Granting Ex Parte Reexamination of U.S Pat. No. 7,103,511 in Reexamination Control No. 90/010,509.
USPTO's Decision dated Jun. 22, 2009 Granting Ex Parte Reexamination of U.S. Pat. No. 7,103,511 in Reexamination Control No. 90/010,505.
USPTO's Decision dated Jun. 22, 2009 Granting Ex Parte Reexamination of U.S. Pat. No. 7,103,511 in Reexamination Control No. 90/010,507.
USPTO's Decision dated Jun. 22, 2009 Granting Ex Parte Reexamination of U.S. Pat. No. 7,103,511 in Reexamination Control No. 90/010,508.
USPTO's Decision dated Jul. 21, 2009 Granting Ex Parte Reexamination of U.S. Pat. No. 6,891,838 in Reexamination Control No. 90/010,512.
USPTO's Decision dated Jul. 21, 2009 Granting Ex Parte Reexamination of U.S. Pat. No. 6,891,838 in Reexamination Control No. 90/010,510.
USPTO's Decision dated Jul. 21, 2009 Granting Ex Parte Reexamination of U.S. Pat. No. 6,891,838 in Reexamination Control No. 90/010,511.
USPTO's Decision dated Nov. 13, 2008 Granting Ex Parte Reexamination of U.S. Pat. No. 6,891,838 in Reexamination Control No. 90/010,301.
K. Bul T, et al.; "Low Power Systems for Wireless Microsensors;" UCLA Electrical Engineering Department, Los Angeles, CA and Rockwell Science Center, Thousand Oaks, CA; pp. 25-29.
David B. Johnnson and David A. Maltz. Dynamic Source Routing in Ad Hoc Wireless Networks; Computer Science Department, Carnegie Mellon University; a chapter in Mobile Computing; Feb. 29, 1996; pp. 1-18.
David A. Maltz et al.; Experiences Designing and Building a Multi-Hop Wireless Ad Hoc Network Testbed; School of Computer Science, Carnegie Mellon University; Mar. 5, 1999; pp. 1-20.
"Part 11: Wireless LAN Medium Access Control (MAC) and Physical Layer (PHY) Specifications;" IEEE Std 802.11-1997; published Jun. 26, 1997 by the IEEE; pp. 1-459.
John Jubin and Janet D. Tornow; "The DARPA Packet Radio Network Protocols;" Proceedings of the IEEE; vol. 75, No. 1, Jan. 1987; pp. 64-79.

Chane Lee Fullmer; "Collision Avoidance Techniques for Packet-Radio Networks" thesis; University of California at Santa Cruz, CA; Jun. 1998; pp. 1-172.
"3Com Invests in Coactive Networks," Coactive (press release), Author: unknown, Dec. 14, 1999, pp. 1-4.
"5808 Photoelectric Smoke/Heat Detector with Built0in Wireless Transmitter Installation Instructions," Ademco, 1998.
"ABB Kent-Taylor Interfacing," Author: unknown, Engineering Report, No. 93-011, Jun. 18, 1996, pp. 1-9.
"AES Central Station Installation & Operation Manual, Document No. 40-0551e," AES Intellinet, Nov. 1996.
"AlarmNet-C Service Shutdown," Honeywell, Inc., Author: unknown, Date: unknown, pp. 1.
"Allen-Bradley Interfacing," Author: unknown, Engineering Report, No. 90-023, Jul. 21, 1999, pp. 1-11.
AN/TSQ-129 Position Location Reporting System (PLRS), Author: unknown, available at http://www.fas.org/man/dod-101/sys/land/plrs.htm on Feb. 22, 2010, pp. 1-3.
"AWAIRS Adaptive Wireless Arrays Interactive Recconaissance, Surveillance, and Target Acquisition in Small Unit Operations".
"Barrington Interface," Author: unknown, Engineering Report, No. 90-013, Revised: Oct. 1994, pp. 1.
Bell Canada launches public wireless Internet hotspot pilot, Dec. 10, 2002, http://www.bell.ca/3n/about/press/release/2002/pr_20021210.asp (3 pages).
"Bristol Babcock Interfacing," Author: unknown, Engineering Report, No. 95-001, Revised: Apr. 17, 1996, pp. 1-4.
"Caddx Installation Instructions Package, document No. 466-1486," Caddx Controls, Aug. 1998.
"Caddx Installation Instructions Package, document No. 466-1786," CADDX Installation Controls, Inc., Caddx Controls; Author: unknown; Aug. 1998, pp. 1-58.
"Caddx Installation Instructions Package," document No. 466-1786, CADDX Installation Controls, Inc., Caddx Controls; Author: unknown; Jul. 15, 1999, pp. 1-116.
"CADDX NetworX NX-8 Control/Communicator Installation Manual," Caddx Controls, 1996.
"Case Study: Genentech Uses Coactive's Technology to Centralize Monitor and Control Functions in a Mixed Legacy and New Equipment Environment," Coactive, Author: unknown, 1998, pp. 1-4.
"Case Study: Ingham Regional Medical Center Uses Coactive Technology to Monitor and Control Critical Power Generations in a Multi-Campus Environment," Coactive, 1998, pp. 1-4.
"Central Station Manual Section 1 System Overview, document No. 40-0551," AES Intellinet, Dec. 1996.
"Circon Systems Partners with Coactive Networks to Deliver Circon WebControl™," Coactive (press release), Author: unknown; Feb. 7, 2000, pp. 1-4.
"CIRCON Technology Connects Building Management Systems to Internet Using Coactive Routers," Coactive (press release), May 20, 1997.
"Cisco's John Chambers Discusses the Internet Consumer Revolution at CES Using Demo Based on Echelon's LonWorks Technology," Home Toys (press release), Jan. 8, 1999.
Coactive Bridges Gap between Control Systems and Corporate Data Networks with New Off-the-Shelf Router Family, Coactive (press release), Jun. 8, 1998.
"Coactive Enhances Residential Gateway to Enable Multiple Home Networks," Coactive (press release), Author: unknown; Jan. 6, 2000, pp. 1-4.
"Coactive Joins 3Com to Demonstrate Convergence of Control and Enterprise Networks at Retail Systems '98," Coactive (press release), Author: unknown, Jun. 16, 1998, pp. 1-4.
"Coactive Launches First Architecture to Support the Convergence Between Contol and IP Networks," Coactive (press release), Author: unknown, May 20, 1998, pp. 1-4.
"Coactive Leads Standardization Effort for LonTalk/IP Routers," Coactive (press release), Author: unknown, May 20, 1997, pp. 3.
"Coactive Networks and Diverse Networks Team to Deliver End-to-End Infrastructure for Enabling the Digital Home," Coactive (press release), Author: unknown, Aug. 28, 2000, pp. 1-4.

(56) References Cited

OTHER PUBLICATIONS

"Coactive Networks and Innovex Technologies Deliver Internet Access to Home Security, Lighting and Climate Control," Coactive (press release), Author: unknown, Feb. 29, 2000, pp. 1-4.
"Coactive Networks and Silicon Energy Partner to Deliever an End-to-End Solution for Internet-Based Energy Monitoring and Analysis," Coactive (press release), Author: unknown, Sep. 19, 2000, pp. 1-4.
"Coactive Networks and Vicinium Systems team to Deliver a Complete Television-Based Interface to Digital Homes and Neighborhoods," Coactive (press release), Author: unknown, Jun. 19, 2000, pp. 1-4.
"Coactive Networks Announces First Shipments of Internet Gateway to Home Control Systems," Coactive (press release), Author: unknown, May 3, 1999, pp. 1-4.
"Coactive Networks Announces Formation of Technical Advisory Board," Coactive (press release), Author: unknown, Oct. 5, 1998, pp. 1-4.
"Coactive Networks Announces System Provider Partner Program," Coactive (press release), Author: unknown, Jan. 25, 1999, pp. 1-4.
"Coactive Networks Expands Support for Management and HMI Applications," Coactive (press release), Author: unknown, Nov. 2, 1998, pp. 1-4.
"Coactive Networks Names Gus Ezcurra Vice President of Sales," Coactive (press release), Author: unknown, Jul. 20, 1998, pp. 2.
"Coactive Networks Names Janice Roberts, 3Com Senior VP, to Board of Directors," Coactive (press release), Author: unknown, Jun. 2, 1998, pp. 2.
"Coactive Networks Powers Innovative Energy Management Solution," Coactive (press release), Author: unknown, Jan. 5, 2001, pp. 1-4.
"Coactive Networks President Named to LonMark Board of Directors," Coactive (press release), Jun. 14, 1998.
"Coactive Networks Shatters Price Barriers with New IP Gateway to Home Control Systems," Coactive (press release), Author: unknown, Oct. 26, 1998, pp. 1-4 .
"Coactive Networks to Supply Internet-Based Home Gateways for up to 400,000 customers; First Phase of Deliveries Valued at US$2 Million," Coactive (press release), Author: unknown, Oct. 25, 1999.
"Coactive Networks Unveils the First Full-Service Residential Gateway," Coactive (press release), Author: unknown, May 3, 2000, pp. 1-4.
"Coactive Receives $2 Million in Funding," Coactive (press release), Oct. 15, 1997.
"Coactive Receives First Round of Venture Funding Investors Embrace Control Network Connectivity Technology," Coactive (press release), Author: unknown, Dec. 1, 1997, pp. 2.
"DSC-3500 Meeting the Control and Conservation Challenge," Johnson Controls, 1984, pp. 1-6.
"DTE Energy Technologies Selects Coactive Networks Internet Gateways to Roll Out New Class of E-Services to Businesses," Coactive (press release), Author: unknown, May 3, 2000, pp. 1-4.
"DTE Energy Technologies Selects Coactive Networks to Power Distributed Generation Solutions Worldwide," Coactive (press release), Author: unknown, Aug. 1, 2001, pp. 1-4.
"Echelon Corporation Demonstrates Internet Connectivity in Digital Home Applications at 1999 International Consumer Electronics Show," Home Toys (press release) , Dec. 15, 1998.
"Eight Leading Controls Companies Join Coactive Partner Program," Coactive (press release), Author: unknown, Aug. 21, 2000, pp. 1-4.
"Enhanced Position Location Reporting System (EPLRS)," Author: unknown, available at http://www.globalsecurity.org/military/systems/ground/eplrs.htm on Feb. 22, 2010, pp. 1-3.
"ESTeem Engineering Report, Johnson Controls Interface No. 91-102," Author: unknown, Publisher: unknown, Nov. 1994, pp. 1-14.
"ESTeem Model 96F," Author: unknown, ESTeem Radios; Sep. 6, 1996, pp. 1-2.

"Foxboro Interfacing," Author: unknown, Engineering Report, No. 91-023, Revised: Jun. 19, 1996, pp. 1-5.
"GE Fanuc Interfacing," Author: unknown, Engineering Report, No. 91-010, Revised: Apr. 11, 1996, pp. 1-8.
"General PLC/RTU Interfacing," Author: unknown, Engineering Report, No. 92-010, Revised: Jun. 18, 1996, pp. 1-5.
"Fort Riley Water Distribution Monitoring Control System Drawings 1-30," Author: unknown; Publisher: unknown; Date: unknown.
Kaiser, "Embedded Wireless Devices: Sensors," Outline, École Polytechnique Federale de Lausanne, pp. 1-53.
Kaiser, "Embedded Wireless Devices: Signal Processing," Outline, École Polytechnique Fédérale de Lausanne, pp. 1-19.
Kaiser, "Embedded Wireless Devices: Wireless Networking," Outline, École Polytechnique Fédérale de Lausanne, pp. 1-16.
Kaiser, "Embedded Wireless Devices: Wireless Physical Layer," Outline, École Polytechnique Fédérale de Lausanne, pp. 1-29.
Karn et al., "Packet Radio in the Amateur Service," IEEE Journal on Selected Areas in Communications, vol. SAC-3, No. 3, May 1985, pp. 431-439.
Katz et al., "The Bay Area Research Wireless Access Network (BARWAN)" (Jun. 1996) (presentation paper), http://daedalus.cs.berkeley.edu/talks/retreat.6.97/BARWAN.597.ppt, pp. 1-66.
Katz et al., "Towards a Wireless Overlay Internetworking Architecture", DARPA ITO Sponsored Research, 1997 Project Summary, University of California, Berkeley, pp. 1-8, Including a Slide Show Presentation of 56 Pages at http://daedalus.cs.berkeley.edu/talks/retreat.6.96/overview.pdf.
Kemp, "Home Automation Application Guide," Applications for Home Automation in Any Home, vol. 1, 2000, pp. 1-106.
Kocom, "Digital Home Network, Kitchen TV Phone KTD-505, User's Manual," pp. 1-7.
Kohno et al., "An Adaptive Sensor Network System for Complex Environments in Intelligent Autonomous Systems (Kakazu et al., eds.)," IOS Press, 1998, pp. 21-28.
Kooser et al., "Testing 1-2-3," Entrepreneur Magazine, Sep. 2003, pp. 27-30.
Krishnamachari, "Networking Wireless Sensors," Cambridge University Press, Date: unknown, pp. 1-10.
Krishnamachari, "Wireless Sensor Networks: the Vision;" Cambridge University Press; pp. 1-10.
Lacoss, "Distributed Sensor Networks, Final Report," Lincoln Laboratory at Massachusetts Institute of Technoloay, Sep. 30, 1986, pp. 1-225.
Lauer, "Packet-Radio Routing, Routing in Communications Networks," Ch. 11 (1995) pp. 351-396.
Lee et al., "Distributed Measurement and Control Based on the IEEE 1451 Smart Transducer Interface Standards," Proceedings of the 16th IEEE Instrumentation and Measurement Technology Conference, vol. 1, May 24-26, 1999, IEEE, pp. 608-613.
Leiner et al., "Goals and Challenges of the DARPA GloMo Program;" IEEE Personal Communications; Dec. 1996, vol. 3, No. 6; pp. 34-45.
Leviton Manufacturing Co., Inc., "The Decora® Collection of Designer Devices," 2006, pp. 1-85.
Lewis et al., "Packet-Switching Applique for Tactical VHF Radios," 1987 IEEE Military Communications Conference, Oct. 19-22, 1987, Conference Record vol. 2 of 3, pp. 449-455.
Lin et al., "Adaptive Clustering for Mobile Wireless Networks;" Publisher: unknown; Date: unknown; pp. 1-21.
Lin et al., "CMOS Front End Components for Micropower RF Wireless Systems;" EED, UCLA Electrical Engineering Department; 1998, pp. 1-5.
Lin et al., "Wireless Integrated Network Sensors (WINS) for Tactical Information Systems," UCLA, Rockwell Science Center; Date: unknown; pp. 1-5.
Linear Corporation, "Supervised Digital Security Transmitter t-90, Installation Instructions," 2006, pp. 1-2.
Linear Corporation, "Supervised Digital Security Transmitters TX-91, TX-92, TX-94, Operation Instructions," 1993, pp. 1.
Linear Corporation, "Supervised Wireless Receiver and Zone Expander SRX-64A, Installation Instructions," 2003, pp. 1-2.

(56) References Cited

OTHER PUBLICATIONS

Local and Metropolitan Area Networks: Wireless Medium Access Control (MAC) and Physical (PHY) Specifications, Author: unknown; IEEE, Nov. 1997, pp. 1-98.
Clare et al., "Self-Organizing Distributed Sensor Networks," UCLA, Rockwell Science Center.
Clare, "AWAIRS Progress Review: Planned Milestones," UCLA Rockwell Science Center, Nov. 20, 1998.
Lougheed et al., "A Border Gateway Protocol 3 (BGP-3)," RFC 1267, (Oct. 1991), available at http://tools.ietf.org/html/rfc1267, Jun. 24, 2009, pp. 1-36.
Lowe et al., "Publishing Bibliographic Data on Optical Disks: A Prototypical Application and Its Implications," Third International Conference on Optical Mass Data Storage, Proceedings of SPIE, vol. 529, pp. 227-236.
Lutron Electronics Co. Inc,, Connecting to a RadioRA System via a Local Area Network, Application Note #127, Date: unknown, pp. 1-16.
Lutron Electronics Co. Inc., Homeowner's Guide for the RadioRA® Quick Start Package, 2004, pp. 1-8.
Lutron Electronics Co. Inc., How to Retrofit RadioRA® Wall-Mounted Master Control into an existing home, Application #41, 2004, pp. 1-2.
Lutron Electronics Co. Inc., Interfacing RadioRA® to Security and Fire Alarm Systems, Application Note #59, pp. 1-4.
Lutron Electronics Co. Inc., IR/RS232 Interface for Bang & Olufsen® Remote Control and RadioRA®, Application Note #119, 2004, pp. 1-3.
Lutron Electronics Co. Inc., Level Capture with a RadioRA® Master Control, Application Note #73, 2003, pp. 1-3.
Lutron Electronics Co. Inc., Modem Installation for HomeWorks®, Application Note #9, 1998, pp. 1-4.
Lutron Electronics Co. Inc., RadioRA® RA-IR-KIT Installation Instructions, Application Note #61, 2000, pp. 1-4.
Lutron Electronics Co. Inc., RadioRA® RF Signal Repeater, 1998, pp. 1-2.
Lutron Electronics Co. Inc., RadioRA® Single-Location Switch, Controls for Permanently Installed Lighting Loads, 1998, pp. 1-2.
Lutron Electronics Co. Inc., RadioRA® Table Lamp Controls, Dimming and Switching Controls for Table and Floor Lamps, 1999, pp. 1-2.
Lutron Electronics Co. Inc,, Using a Photocell with the RadioRA® System, Application Note #45, 1998, pp. 1-4.
Lutron Electronics Co. Inc., Using an Astronomic Timeclock with the RadioRA® System, Application Note #42, 1998, pp. 1-2.
Lutron Electronics Co. Inc., Using the RadioRA® System to Activate Scenes 5-16 on a Grafik Eye® Control Unit, Application Note #48, 1998, pp. 1-4.
Lutron Electronics Co. Inc., Using the RadioRA® Telephone Interface, Application Note #46, 1998, pp. 1-2.
Lynch et al., "Application of Data Compression Techniques to a Large Bibliographic Database," Proceeding of the Seventh International Conference on Very Large Databases, Cannes, France, Sep. 9-11, 1981 (Washington, DC: IEEE Computer Society Press, 1981), pp. 435-447.
Lynch et al., "Beyond the Integrated Library System Concept: Bibliographic Networking at the University of California," Proceedings of the Second National Conference on Integrated Online Library Systems Proceedings, Sep. 1984, pp. 243-252.
Lynch et al., "Conservation, Preservation and Digitization, Energies for Transition," Proceedings of the Fourth National Conference of the Association of College and Research Libraries, Baltimore, MD, Apr. 9-12, 1986 (Chicago, IL: Association of College and Research Libraries, 1986), pp. 225-228.
Lynch et al., "Document Delivery and Packet Facsimile," Proceedings of the 48th ASIS Annual Meeting, vol. 22, Oct. 20-24, 1985, pp. 11-14.
Lynch et al., "Electronic Publishing, Electronic Imaging, and Document Delivery, Electronic Imaging '86," (Boston, MA: Institute for Graphic Communication, Inc., 1986), pp. 662-667.
Lynch et al., "Library Applications of Electronic Imaging Technology," Information Technology and Libraries, Jun. 1986, pp. 100-105.
Lynch et al., "Public Access Bibliographic Databases in a Multicampus University Environment, Databases in the Humanities and Social Sciences—4," Proceedings of the International Conference on Databases in the Humanities and Social Sciences, Jul. 1987, Learned Information, Inc., 1989, pp. 411-419.
Lynch et al., "The Telecommunications Landscape: 1986," Library Journal, Oct. 1, 1986, pp. 40-46.
Mak et al., "Design Considerations for Implementation of Large Scale Automatic Meter Reading Systems," IEEE Transactions on Power Delivery, vol. 10, No. 1, Jan. 1995, pp. 97-103.
Malkin, "RFC 2453, RIP Version 2 (Nov. 1998)," available at http://tools.ietf.org/html/rfc2453, Jun. 24, 2009, pp. 1-40.
Maltz, "On-Demand Routing in Multi-Hop Wireless Mobile Ad Hoc Networks," Thesis, May 2001, pp. 1-192.
Marcy et al., "Wireless Sensor Networks for Area Monitoring and lintegrated Vehicle Health Management Applications," Rockwell Science Center, Thousand Oaks, CA, AIAA-99-4557; Date: unknown, pp. 1-11.
Markie et al., "LonWorks and PC/104: A winning combination," PC/104 Embedded Solutions, Summer 1998, pp. 1-8.
Martel et al., "Home Automation Report: A Modular Minimum Complexity, High-Resolution and Low CostField Device Implementation for Home Automation and Healthcare," MIT; Publisher: unknown; Mar. 31, 1998; pp. 1-29.
McQuillan et al., "The ARPA Network Design Decisions," Computer Networks, vol. 1, No. 5, Aug. 1977 pp. 243-289.
McQuillan et al., "The New Routing Algorithm for the ARPANET," IEEE Transactions on Communications, vol. COM-28, No. 5, May 1980, pp. 711-719.
Mills, "Exterior Gateway Protocol Formal Specification" (Apr. 1984), RFC 904, available at http://tools.ietf.org/html/rfc904, Jun. 24, 2009, pp. 1-32.
Moorman, "Packet Radio Used in a Cost-Effective Automated Weather Meso-Net," available at http://www.wrh.noaa.gov/wrh/96TAs/TA963 1/ta96-31.html, Dec. 3, 1996 (5 pages).
Moy, "RFC 2328, OSPF Version 2 (Apr. 1998)," available at http://tool.ietf.org/html/rfc2328, Jun. 24, 2009, pp. 1-245.
Mozer et al., "The Neural Network House: An Overview," in L. Niklasson & Boden (eds.), Current trends in connectionism (pp. 371-380); Hillsdale: Erlbaun, 1995; pp. 1-9.
Murthy et al., "An Efficient Routing Protocol for Wireless Networks, Mobile Networks and Applications 1," (1996), pp. 183-197.
Natkunanathan et al. "WINS: Signal Search Engine for Signal Classification," EED, UCLA; Date: unknown; pp. 1-6.
Natkunanathan et al., "A Signal Search Engine for Wireless Integrated Network Sensors," EED, UCLA Electrical Engineering Department;; Date: unkown; pp. 1-4.
Negus et al., "HomeRF™ and SWAP: Wireless Networking for the Connected Home," ACM SIGMOBILE Mobile Computing and Communications Review, vol. 2, Issue 4, Oct. 1998, available at http://portal.acm.org/citation.cfm?id=1321400.1321401 on Mar. 29, 2009, pp. 1-2.
Negus et al., "HomeRF™ and SWAP: Wireless Networking for the Connected Home," Mobile Computing and Communications Review, vol. 2, No. 4, Date: unknown, pp. 28-37.
NEXTGEN Searches, "IPCO v. The Wireless Sensor Network Industry? Special Report on IPCO v. Oncor et al.," Corporate Manager's Edition, 2009, pp. 1-16.
Nilsen et al., "Storage Monitoring Systems for the Year 2000," Dept. of Energy, Office of Scientific and Technical Information, Report No. SAND-97-8532C, available at http://www.osti.gov/bridge/product.biblio.jsp?query_id=3&page=0&osti_id=303988 (1997).
Ondo, "PLRS/JTIDS Hybrid," Filled Artillery Journal, Jan.-Feb. 1981, pp. 20-25.
Oran (ed.), "OSI IS-IS Intra-Domain Routing Protocol," RFC 1142 (Feb. 1990), available at http://tools.ietf.org/html/rfc1142, Jun. 24, 2009, pp. 1-665.
Park et al., "SensorSim: A Simulation Framework for Sensor Networks," ACM, 2000, pp. 104-111.

(56) References Cited

OTHER PUBLICATIONS

Perkins et al., "A Mobile Networking System Based on Internet Protocol," Publisher: unknown, Date: unknown, pp. 1-17.
Perkins et al., "Ad-Hoc On-Demand Distance Vector Routing "AODV"," http://moment.cs.ucsb.edu/AODV/aodv.html, Aug. 25, 2009, pp. 1-5.
Perkins et al., "Continuous, transparent network access for portable users, A Mobile Networking System Based on Internet Protocol," IEEE Personal Communications, First Quarter 1994, pp. 32-41.
Perkins et al., "Mobility Support in IPv6," Internet Draft (Sep. 22, 1994), available at http://www.monarch.cs.rice.edu/internet-draft/draft-perkins-ipv6-mobility-sup-oo.txt., Sep. 26, 2009, pp. 1-13.
Perkins et al., "RFC3561—Ad Hoc On-Demand Distance Vector (AODV) Routing (Jul. 2003)," available at http://tools.ietf.org/html?rfc3561, Aug. 25, 2009, pp. 1-38.
Pittway Corporation, "Company History," available at http://www.fundinguniverse.com/company-histories/Pittway-Corporation Mar. 6, 2009, pp. 1-5.
Plaintiffs' Opening Markman Brief in Support of Their Proposed Claim Constructions, filed by the patent owner and its co-plaintiff in *SIPCO LLC et al. v. The Toro Co. et al.*, Case No. 2:08-cv-00505-TJS (E.D. Pa.) filed on Sep. 26, 2008.
Pleading—Defendant Digi International Inc.'s First Amended Answer and Defenses of *SIPCO, LLC v. Control4 Corporation et al.*, Civil Action No. 6:10-cv-249, currently pending in the U.S. District Court for the Eastern District of Texas, Tyler Division, filed Nov. 22, 2010, pp. 1-27.
Pleading—Defendant Siemens Industry, Inc.'s First Amended Answer and Defenses of *SIPCO, LLC v. Control4 Corporation et al.*, Civil Action No. 6:10-cv-249, currently pending in the U.S. District Court for the Eastern District of Texas, Tyler Division, filed Nov. 22, 2010, pp. 1-27.
Pleading—Defendant The Toro Company, The Toro Company's Second Supplemented Objections and Answers to Plaintiffs SIPCO LLC and Advanced Sensor Technology, Inc.'s Interrogatory No. 4 to Defendant *The Toro Company of SIPCO LLC, et al. v. The Toro Company et al.*, Civil Action No. 08-CV-00505-TJS (pp. 1-9).
Pleading—Defendant The Toro Company, Third Supplemented Objections and Answers to Plaintiffs SIPCO LLC and Advanced Sensor Technology, Inc.'s Interrogatory No. 4 to Defendant *The Toro Company of SIPCO LLC, et al, v. The Toro Company et al.*, Civil Action No. 08-CV-00505-TJS (pp. 1-9).
Pleading—Expert Report of Randy H. Katz, Ph. D, of *SIPCO, LLC et al. v. The Toro Company et al.*, Case No. 2:08-cv-00505.
Poor, Robert D., "Hyphos: A Self-Organizing, Wireless Network," Massachusetts Institute of Technology (Jun. 1997).
Pastel (ed.), "Transmission Control Protocol, Version 4," RFC793, available at http://www.faqs.org/rfcs/rfc793.html, Sep. 1981, pp. 1-85.
Postel (Editor), "Internet Protocol, DARPA Internet Program Protocol Specification," RFC 791 (Sep. 1981), Information Sciences Institute, University of So. Cal., pp. 1-45.
Pottie et al., "Adaptive Wireless Arrays for Interactive RSTA in SUO (AWAIRS)," UCLA, Electrical Engineering Department; Date: unknown, pp. 1-20.
Pottie et al., "Adaptive Wireless Arrays Interactive Recconaissance, Surveillance, and Target Acquisition in Small Unit Operations (AWAIRS); Lower Power Wireless Integrated Microsensors (LWIM)," Presented to Dr. E. Carapezza, Dr. D. Lao and Lt. Col. J. Hernandez, UCLA, Rockwell Science Center; Mar. 21, 1997, pp. 1-110.
Pottie et al., "WINS: Principles and Practice," EDD, UCLA; Date: unknown, pp. 1-10.
Pottie et al., "Wireless Integrated Network Sensors," Communications of the ACM, vol. 43, No. 5, May 2000, pp. 51-58.
Pottie et al., "Wireless Integrated Network Sensors: Towards Low Cost and Robust Self-Organizing Security Networks;" EED, UCLA; Rockwell Science Center; SPIE vol. 3577, Nov. 1, 1998, pp. 86-95.
Pottie, "AWAIRS: Mini-Site Review, Project Status," UCLA: Rockwell Science Center, Feb. 23, 1998, pp. 1-58.
Pottie, "Hierarchical Information Processing in Distributed Sensor Networks," ISIT, Aug. 16-21, 1998, IEEE, 1998, pp. 163.
Pottie, "R&D Quarterly and Annual Status Report," SPAWAR (contractor), Apr. 31, 1999.
Pottie, "Wireless Sensor Networks," ITW 1998, Jun. 22-26, 1998, available at http://dantzig.ee.ucla.edu/oclab/Pottie.html, 2 pages.
Printout of 47 C.F.R. 15 (131 pages).
Rabaey et al., "PicoRadio Support Ad Hoc Ultra-Low Power Wireless Networking," Computer, IEEE, Jul. 2000, pp. 42-48.
Radlherr, "Datentransfer Ohne Draht and Telefon," Funkschau, Nov. 1991, pp. 49-52.
Raji, "Control Networks and the Internet, Rev. 2.0," Echelon Corp., 1998, pp. 1-39.
Raji, "Control Networks and the Internet," Echelon Corp., Rev. 2.0, available at http://www.echelon.com/solutions/opensystems/papers/Control_Internet.pdf (1998).
Rants and Ramblings, "Go Wireless . . . At a Payphone," May 10, 2003, http://www.morethanthis.net/blog/archives/2003/05/10/000301.html (2 pages).
Rehkter et al., "A Border Gateway Protocol 4 (BGP-4)," RFC 1771, (Mar. 1995), available at http://tools.ietf.org/html.rfc1771, Jun. 24, 2009, pp. 1-58.
Reuters, "Verizon Launches Wi-Fi Hot Spots," May 18, 2003, http://www.wired.com/news/wireless/0,1382,58830,00.html (2 pages).
Ritter et al., The Architecture of Metricom's Microcellular Data Network™ (MCDN) and Details of its Implementation as the Second and Third Generation Ricochet™ Wide-Area Mobile Data Service, IEEE, 2001, pp. 143-152.
Ross et al., "PNC/DOE Remote Monitoring Project at Japan's Joyo Facility," Office of Scientific and Technical Information, Report No. SAND-96-1937C, available at http://www.osti.gov/bridge/product.bib lio.jsp?query_id=0&pa ge=0&osti_id=270680 (1996).
Saffo, Paul, "Sensors: The Next Wave of Infotech Innovation," Institute for the Future (1997).
Salkintzisa et al., "Design and implementation of a low-cost wireless network for remote control and monitoring applications," Elservier, Microprocessors and Microsystems, 1997, pp. 79-88.
Saltzer et al., "Source Routing for Campus-wide Internet Transport (Sep. 15, 1980)," available at http://groups.csail.mit.edu/ana/publications/pubPDFs/Sourcerouting.html, Sep. 21, 2009, pp. 1-14.
Schneider et al., "International Remote Monitoring Project Argentina Nuclear Power Station Spent Fuel Transfer Remote Monitoring System," Dept. of Energy, Office of Scientific and Technical Information, Report No. Sand-97-1784C, available at http://www.osti.gov/bridge/product.bibli o.jsp?query_id=1&page=0&osti_id=505674 (1997).
Schulman et al., "SINCGARS Internet Controller-Heart of the Digitized Battlefield," Proceedings of the 1996 Tactical Communications Conference, Apr. 30-May 2, 1996, pp. 417-421.
Shacham et al., "Dynamic Routing for Real-Time Data Transport in Packet Radio Networks," IEEE Proceedings of INFOCOM '82, pp. 152-159.
Shacham et al., "Future Directions in Packet Radio Technology," Proceedings of IEEE Infocom 85, Mar. 26-28, 1985, pp. 93-98.
Shacham et al., "Packet Radio Networking," Telecommunications vol. 20, No. 9, Sep. 1986, pp. 42,43,46,48,64 and 82.
Shoch, "Inter-Network Naming, Addressing and Routing, Internet Experiment Note # 19, Notebook section 2.3.3.5," Xerox Palo Alto Research Center, Jan. 29, 1978, Publisher: unknown, pp. 1-9.
Sohrabi et al., Protocols for Self-Organization of a Wireless Sensor Network, IEEE Personal Communications, Oct. 2000, pp. 16-27.
Stern, "Verizon to Offer Wireless Web Link Via Pay Phones," May 10, 2003, http://www.washingtonpopst.com/ac2/wp-dyn?pagename=article&node=&contentID=A367 . . . (3 pages).
Subramanian et al., An Architectural for Building Self-Configurable Systems, IEEE, 2000, pp. 63-73.
Sunshine, "Addressing Problems in Multi-Network Systems," (Apr. 1981), available at ftp://ftp.isi.edu/in-notes/ien/ien178.txt, Sep. 14, 2009, pp. 1-26.

(56) References Cited

OTHER PUBLICATIONS

Sunshine, "Addressing Problems in Multi-Network Systems," Proceedings INFOCOM '82, 1982 IEEE, pp. 12-19.
Sunshine, "Network Interconnection and Gateways," IEEE Journal on Selected Areas in Communications, vol. 8, No. 1, Jan. 1990, pp. 4-11.
Sunshine, "Source Routing in Computer Networks," Information Sciences Department of The Rand Corporation (1977), Publisher: unknown, pp. 2933.
Sutherland, Ed, "Payphones: The Next Hotspot Wave?," Jan. 28 2003, http://www.isp-planet.com/fixed_wireless/news/2003/bellcanada_030128.html (3 pages).
Tanenbaum, "Computer Networks," 4th Int'l CAN Conf., Berlin, Germany, 1997.
Tanenbaum, Andrew S., "Computer Networks," chapters 1, 5 (3d ed, Prentice Hall 1996).
Thodorides, "Wireless Integrated Network Sensors," Power Point Presentation, Publisher: unknown, Apr. 15, 2003, pp. 1-19.
Thomas, "Extending CAN Networks by Incorporating Remote Bridging," ESTeem Radios, Nov. 1994.
Thomas, "Extending CAN Networks by Incorporating Remote Bridging," 4th Int'l CAN Conf., Berlin, Germany, available at http://www.can-cia.org/fileadmin/cia/files/icc/4/thom as.pdf (1997).
Tobagi et al, "Packet Radio and Satellite Networks," IEEE Communications Magazine, vol. 22, No. 11, Nov. 1984, pp. 24-40.
Toh, "A Novel Distributed Routing Protocol to Support Ad-Hoc Mobile Computing," Conference Proceedings of the 1996 IEEE Fifteenth Annual International Phoenix Conference on Computers and Communications, Mar. 27-29, 1996, pp. 480-486.
Totolo, Home RF, A New Protocol on the Horizon, Feb. 1999, available at www.hometoys.com/htinews/feb99/articles/totolo/totolo.htm on Mar. 2, 2009.
Transmission Control Protocol; "DARPA Internet Program Protocol Specification," John Postel Editor; Information Sciences Institute, University of Southern California, California; Sep. 1981; pp. 1-85.
Varadhan et al., "SDRP Route Construction," Internet Draft, available at draft-ietf-sdr-route-construction-01.{ps,txt}, Feb. 27, 2005, pp. 1-12.
Vardhan, "Wireless Integrated Network Sensors (WINS): Distributed In Situ Sensing for Mission and Flight Systems," 2000 IEEE Aerospace Conference Proceedings, (2000).
Verizon, "Verizon Broadband Anytime," Copyright 2003, https://www33.verizon.com/wifi/login/loacations/locations-remote.jsp (2 pages).
Wang et al., "Energy-Scalable Protocols for Battery Operated MicroSensor Networks," Department of Electrical Engineering Massachusetts Institute of Technology, 1999.
Warrock, "School Give Report on Radio-Based FMS," Energy User News, Nov. 7, 1983, pp. 1.
Weiser, "Some Computer Science Issues in Ubiquitous Computing," Communications of the ACM, Jul. 1993.
Weiser, "The Computer for the 21st Century," Scientific American, Sep. 1991.
Westcott et al., "Hierarchical Routing for Very Large Networks," IEEE Military Communications Conference, Oct. 21-24, 1984, Conference Record vol. 2, pp. 214-218.
Wikipedia, "Ad Hoc On-Demand Distance Vector Routing," available at http://en.wikipedia.org/wiki/Ad_Hoc_On-Demand_Distance_Vector_Routing on Aug. 25, 2009, pp. 1-3.
Wikipedia, "Bellman-Ford Algorithm," available at http://en.wikipedia.org/wiki/Bellman-Ford.
Wikipedia, "Border Gateway Protocol," available at http://en.wikipedia.org/wiki/Border_Gateway_Protocol, Jun. 24, 2009, pp. 1-13.
Wikipedia, "Distance-Vector Routing Protocol," available at http://en.wikipedia.org/wiki/Distance-Vector_Routing_Protocol, Jun. 24, 2009, pp. 1-4.
Wikipedia, "Enhanced Interior Gateway Routing Protocol," available at http://en.wikipedia.org/wiki/EIGRP, Jun. 24, 2009, pp. 1-7.
Wikipedia, "Exterior Gateway Protocol," available at http://en.wikipedia.org/wiki/Exterior_Gateway_Protocol, Jun. 24, 2009, pp. 1.
Wikipedia, "Interior Gateway Routing Protocol," available at http://en.wikipedia.org/wiki/Interior_Gateway_Routing_Protocol, Jun. 24, 2009, pp. 1-2.
Wikipedia, "IS-IS," available at http://en.wikipedia.org/wiki/IS-IS, Jun. 24, 2009, pp. 1-3.
Wikipedia, "L. R. Ford, Jr.," available at http://en.wikipedia.org/wiki/L._R._Ford,_Jr, Jun. 24, 2009, pp. 1.
Wikipedia, "Open Shortest Path First," available at http://en.wikipedia.org/wiki/open_shortest_path_first.
Wikipedia, "Richard E. Bellman," available at http://en.wikipedia.org/wiki/Richard_Bellman, Jun. 24, 2009, pp. 1-3.
Wikipedia, "Routing Information Protocol," available at http://en.wikipedia.org/wiki/Routing_Information_Protocol, Jun. 24, 2009, pp. 1-4.
Will et al., "Wireless Networking for Control and Automation of Off-road Equipment," ASAE, Jul. 18-21, 1999, pp. 1-10.
Wilson, Lexicon 700t Touchscreen Remote, Jan. 1, 1999, available at http://avrev.com/home-theater-remotes-system-control/remotes-system on Mar. 2, 2009, pp. 1-3.
Wright (ed.), Home-automation networks mature with the PC industry chases a new home LAN, EDN Design Feature, Date: unknown, pp. 1-9.
Nunavut et al., Web Based Remote Security System (WRSS) Model Development, IEEE, Apr. 7-9, 2000, pp. 379-382.
X10, "CK11A ActiveHome, Home Automation System, Owner's Manual," Oct. 23, 1997, pp. 1-56.
X10.com: The Supersite for Home Automation, "What's in the Kit," available at http://web.archive.org/web/19991111133453/www.com/products/x, on Mar. 2, 2009, pp. 1-2.
X10.com: The Supersite for Home Automation, "Wireless Remote Control System (RC5000)," available at http://web.archive.org/web/1999111453227/www.x10.com/products/x1 on Mar. 2, 2009, pp. 1.
X10: The Supersite for Home Automation, "Transceiver Module," available at http://web.archive.org/web/20000229141517/www.x10.com/products/x on Mar. 2, 2009, pp. 1.
Xecom Incorporated, "EX900S Smart Spread Spectrum Transceiver," Nov. 2003 (13 pages).
Yadav, "Border Security Using Wireless Integrated Network Sensors (WINS)"; ECE 7th SEM, UE6551.
Young, "USAP : A Unifying Dynamic Distributed Mulitchannel TDMA Slot Assignment Protocol," Rockwell International Communication Systems Division, IEEE (1996).
Yu, "Target Identification Processor for Wireless Sensor Network," Dissertation, Los Angeles: University of California, 1999, pp. 1-110.
Zander et al., "The SOFTNET Project: A Retrospect," 1988 IEEE, pp. 343-345.
Zich et al., "Distribution, Networks, and Networking: Options for Dissemination", Workshop on Electronic Texts Session III, http://palimpsets.stanford.edu/byorg/lc/etextw/sess3.html, pp. 1-10, Accessed Jul. 17, 2007.
Zimmermann et al., "Daten Funken, Modacom-Telekom-Datenfunkdienst; Bates SENSUS15305-15309," Publisher: unknown; Date: unknown, pp. 1-6.
Agre et al., "Development Platform for Self-Organizing Wireless Sensor Networks," Rockwell Science Center and UCLA, Date:Apr. 1999, pp. 257-268.
Rosen, "Exterior Gateway Protocol (EGP)," Bolt Beranek and Newman Inc., Oct. 1982, pp. 1-48.
ADEMCO Group, Control/Communicator 5110XM Installation Instructions, Apr. 1996, Ademco Group, Author: unknown, pp. 1-76.
ADEMCO Group, Vista-128FB Commercial Fire and Burglary Partitioned Security System Quick Start Guide, Oct. 1998, ADEMCO Group, Author: unknown, pp. 1-68.
Brain, "How Motes Work: A Typical Mote," available at http://computer.howstuffworks.com/mote4.htm, on Feb. 25, 2010, pp. 1-2.
Cook et al., Water Distribution and Control by Wireless Networking, Electronic Systems Technology; Date: unknown, pp. 1-3.

(56) References Cited

OTHER PUBLICATIONS

"HAI Omni: Features & Specifications," Home Automation, Inc. (archived web page), 1997.
"Home Telemetry Gateway Specifications Sheet: Connector 2000 Series," Coactive 1998.
"How Does the New Power Company Deliver on the Promise of Energy Reconstructing?" NewPower (press release), Author: unknown, May 31, 2001, pp. 1-6.
"IEEE Standards Board: Project Authorization Request (PAR) Form;" http://grouper.ieee.org/groups/802/11/PARs/par80211bapp.html, Mar. 24, 1998.
"Important Dealer Notification—Honeywell AlarmNet-M Network Alert," Source: unknown, Author: unknown, Apr. 2007, pp. 1.
"InCode Telecom Transforming Payphones into Wi-Fi Hot Spots," Jan. 14, 2003, http://www.pocketpcmag.com/news/incode.asp (2 pages).
"Industrial Communications," Author: unknown, available at http://web.archive.org/we b/19990222162354/www.metricom.com/industrial/ on May 10, 2010, pp. 1-3.
"Integrated Communication Services" of Industrial Communications; pp. 1-3; available at web.archive.org/web/19990222152354/www.metricom.com/industrial.
"IOConnect Architecture™," Coactive, 2001, pp. 1-4.
"JC/83RF System: Cost-effective Multiple Facility Management by Radio Network," Johnson Controls, Date: unknown, pp. 1-6.
"JC/83RF System: Multiple Facility Management by Radio Network," Johnson Controls, Publication No. 2161, 1983, pp. 1-4.
"Keltron's Home Page with Frames, Index," available at http://web.archive.org/web//19990831161957/http://www.keltroncorp.com, on Mar. 24, 2009, pp. 1.
"Local and Metropolitan Area Networks: Wireless Medium Access Control (MAC) and Physical (PHY) Specifications, Annex A: Protocol Implementation Conformance Statement (PICS) Proforma," Author: unknown; IEEE, Nov. 1997, pp. 1-75.
"LonTalk Protocol, LonWorks™ Engineering Bulletin," Echelon Corp.; Author: unknown; Apr. 1993, pp. 1-27.
"LonWorks® Products, 1998, Version A," Echelon Corp.; Author: unknown; 1997, pp. 1-21.
"LonWorks® Router User's Guide," Echelon Corp., Author: unknown; 1995, pp. 1-136.
"LonWorks® SMX™ Transceiver," datasheet, Echelon Corp.; Author: unknown; 1997, pp. 1-18.
"M100 Series Motor Actuator," Author: unknown, Johnson Controls, Inc., Apr. 1993, pp. 1-20.
"M100C Series Actuator with Digital Control Signal Input and R81CAA-2 Interface Board," Installation Bulletin, Johnson Controls, 2000, pp. 1-12.
"Man-Portable Networked Sensor System (1997-)," Author: unknown, available at http://www.spawar.navy.mil/depts/d30/d37/d371/mpnss/mpnss.html on May 20, 2010, pp. 1-4.
"March of the Motes," Author: unknown, New Scientist, vol. 179, issue 2409, Aug. 23, 2003, pp. 1-8.
"Metasys Compatible Products," Author: unknown; Johnson Controls, Inc., 1997 (9 pages).
"Metasys Extended System Architecture, vol. II," Author: unknown, Publisher: unknown, Sep. 1999.
"Metasys N2 System Protocol Specification for Vendors," Author: unknown, Publisher: unknown, Jun. 1996.
"Modicon Interfacing," Author: unknown, Engineering Report, No. 90-022, Revised: Apr. 12, 1996, pp. 1-9.
"Moore Products—Hart Protocol Interfacing," Author: unknown, Engineering Report, No. 94-007, Revised: Mar. 1, 1996, pp. 1-3.
"MTC Teams with Coactive Networks to Deliver an Advanced Energy Communications and Management Solution," Coactive (press release), Author: unknown, Feb. 5, 2001, pp. 1-4.
"Net77 Central Station Manual Section 3," AES Intellinet, Dec. 1996.
"NewPower and Coactive Networks Announce Strategic Alliance to Deliver the Connected Home," Coactive (press release), Author: unknown, Mar. 14, 2001, pp. 1-4.

"NX-480 Wireless Motion Sensor, document No. 466-1479 Rev. D," Caddx Controls, May 1, 1998.
"Omni Automation System," Author: unknown, Home Automation, Inc., Date: unknown, pp. 1-266.
"Omni Installation Manual," Author: unknown; Home Automation, Inc., Oct. 1997, pp. 1-88.
"Omni Owner's Manual," Author: unknown; Home Automation, Inc., Date: unknown, pp. 1-136.
"Omron Interfacing," Author: unknown, Engineering Report, No. 95-003, Revised: Apr. 17, 1996, pp. 1-4.
"Opto-22 Protocol," Author: unknown, Engineering Report, No. 93-010, Revised: May 31, 1996, pp. 1-8.
"Part 15.1: Wireless Medium Access Control (MAC) and Physical Layer (PHY) Specifications for Wireless Personal Area Networks (WPANS)," www.ieee802.org/15/Bluetooth/802-15-1_Clause_05.pdf, Jun. 14, 2002.
"Phoenix Contact Interfacing, Author: unknown," Engineering Report, No. 94-001, Revised: Jun. 20, 1996, pp. 1-7.
"Phonelin / HPNA / HomePNA Networks," http://www.homenethelp.com/web/howto/HomeNet-HPNA.asp (visited Jul. 29, 2003) (3 pages).
"PLC Direct (Koyo) Interfacing, Author: unknown," Engineering Report, No. 96-001, Revised: Apr. 10, 1996, pp. 1-8.
"Power/Perfect Energy Management Systems," Author: unknown, Johnson Controls, 1983, pp. 1-4.
"Selected Vendor Telecommunications Products," available at http://eetd.lbl.gov/ea/ems/reports/39015a.pdf (describing public uses in 1995), pp. 1-83.
"Smart Home Technology Leader Intelli Selects Coactive Networks Internet Gateways," Coactive (press release), Author: unknown, Sep. 11, 2000, pp. 1-4.
"Special Poll Feature," Author: unknown, Engineering Report, No. 93-008, Sep. 1993, pp. 1-5.
"Square D Interfacing," Author: unknown, Engineering Report, No. 88-010, Revised: Apr. 18, 1996, pp. 1-9.
"Technology Review, Metricom's Ricochet Packet Radio Network," Ham Radio Online, 1996, Author: unknown, pp. 1-3.
"Texas Instruments Interface," Author: unknown, Engineering Report, No. 91-021, Revised: Nov. 1994, pp. 1-3.
"The New Power Company Announces Revolutionary Energy-Saving Program the Gives Consumers Remote Control of the Their Thermostats via the Internet," NewPower (press release), Author: unknown, Apr. 24, 2001.
"The SNVT Master List and Programmer's Guide," Echelon Corp., Author: unknown, Mar. 1996, pp. 1-23.
To Starbucks and beyond: 802.11 wireless Internet access takes off, CommunicationsSolutions.com, vol. 4, Issue 1, Q1 2003, pp. 8-9.
"Toshiba Interfacing," Author: unknown, Engineering Report, No. 91-011, Revised: Jun. 19, 1996, pp. 1-4.
"TranstexT® Advanced Energy Management System," Article, Author: unknown, Publisher: unknown, Date: unknown, pp. 1-2.
"TranstexT® Advanced Energy Management System," Brochure, Author: unknown, Integrated Communication Systems, Inc., 1990, pp. 1-8.
"IIS—Contract Detail, Project Name: Ft. Riley Radio Expansion," Author: unknown, Johnson Controls, Sep. 1998.
"Wayport's Value Proposition: to provide the industry's best high-speed Internet and business center experience for the airport passenger to stay productive," http://www.wayport.net/airportsoverview (visited Jul. 29, 2003) (2 pages).
"Welcome to UtiliNet: A Wireless Data Communications Solution from Metricom, Inc.," Author: unknown, available at http://web.archive.org/web/19980602804581 2/www.metricom.com/industrial/utilinet.html on May 10, 2010, pp. 1-10.
"Westinghouse Numa Logic Interface," Author: unknown, Engineering Report, No. 91-013, Date: unknown, pp. 1-7.
"What's Behind Ricochet: A Network Overview," Author: unknown, available at http://web.archive.org/web/20000815090824/www.ricochet.com/ricochet_advantage/tech_overview.html, Aug. 15, 2000, pp. 1-4.
"Wireless Access List—Atlanta Hartsfield International Airport," http://www.ezgoal.com/hotsports/wireless/f.asp?fid=63643 (visited Jul. 29, 2003) (1 page).

(56) References Cited

OTHER PUBLICATIONS

"Wireless Access List—0 ATL Admirals Club," http://www.ezgoal.com/hotspots/wireless/f.asp?fid=60346 (visited Jul. 29, 2003) (1 page).
"Wireless Accessories, catalog pages," Home Automation, Inc (archived web page), 1997.
"ESTeem Model 96C," ESTeem Radios (describing a system that was for sale at least as early as 1994).
"Site Survey Report," ESTeem Radios, Sep. 24, 1993.
"Technical Bulletin—Johnson Controls," ESTeem Radios, Jan. 29, 1998.
Abbott et al., "Wireless Product Applications for Utilities," Electric Power Research Institute, Feb. 1996, pp. 1-137.
About AES Corporation, Aes IntelliNet, Author: unknown, available at http://web.archive.org/web/19990127093116/www/aes-intellinet.com/ae, on Mar. 5, 2009, pp. 1-2.
ADEMCO Group, 4110DL Security System, Installation Instructions, Oct. 1996, ADEMCO Group, Author: unknown, pp. 1-15.
ADEMCO Group, 4110XM Security System, Installation Instructions, Jul. 1996, ADEMCO Group, Author: unknown, pp. 1-20.
ADEMCO Group, 4120E0 Security System, Installation Instructions, Nov. 1990, ADEMCO Group, Author: unknown, pp. 1-17.
ADEMCO Group, 4120XM Security System, Installation Instructions, Oct. 1993, ADEMCO Group, Author: Unknown, pp. 1-80.
ADEMCO Group, 4140XMPT2 Partitioned Security System with Scheduling User's Manual, May 1993, ADEMCO Group, Author: unknown; pp. 1-54.
ADEMCO Group, 4281, 5881, and 5882 Series RF Receivers Installation Instructions, Oct. 1996, ADEMCO Group, Author: unknown; pp. 1-6.
ADEMCO Group, 5330 Alpha Console, Installation Instructions, May 1990, ADEMCO Group, Author: unknown, pp. 1-24.
ADEMCO Group, 5706 Smoke Detector with Built-In Wireless Transmitter, Installation Instructions, Dec. 1991, ADEMCO Group, Author: unknown, pp. 1-8.
ADEMCO Group, 5707 Smoke Detector with Built-in Wireless transmitter, Installation Instructions, Aug. 1992, ADEMCO Group, Author: unknown, pp. 1-12.
ADEMCO Group, 5715 Universal Transmitter, Installation Instructions, Mar. 1989, ADEMCO Group; Author: unknown; pp. 1-4.
ADEMCO Group, 5775 Passive Infrared Motion Detector/Transmitter, Installation Instructions, Jul. 1991, ADEMCO Group, Author: unknown; pp. 1-4.
ADEMCO Group, 5808C Photoelectronic Smoke Detector with Built-In Wireless Transmitter Installation Instructions, 1998, ADEMCO Group, Author: unknown; pp. 1-4.
ADEMCO Group, 5800TM Transmitter Module Installation Instructions, Apr. 1994, ADEMCO Group, Author: unknown; pp. 1.
Ademco Group, 5801 Remote Wireless Panic Transmitter Installation Instructions, Apr. 1994, Ademco Group, Author: unknown; pp. 2.
ADEMCO Group, 5802CP Belt Clip Transmitter Installation Instructions, Nov. 1994, ADEMCO Group, Author: unknown; pp. 1.
ADEMCO Group, 5802MN, Supervised Miniature Transmitter Installation Instructions, Jan. 1995, ADEMCO Group, Author: unknown; pp. 1.
ADEMCO Group, 5802MN2 Supervised Miniature Transmitter Installation Instructions, Jun. 1997, ADEMCO Group, Author: unknown; pp. 1.
ADEMCO Group, 5803 Wireless Key Transmitter Installation Instructions, Nov. 1994, ADEMCO Group, Author: unknown, pp. 2.
ADEMCO Group, 5804 Wireless Key Transmitter Installation Instructions, Jul. 1995, ADEMCO Group, Author: unknown, pp. 3.
ADEMCO Group, 5804BD Bi-Directional Key Transmitter Installation Instructions, Apr. 1997, ADEMCO Group, Author: unknown, pp. 4.
ADEMCO Group, 5806 Smoke Detector with Built-In Wireless Transmitter Installation Instructions, May 1998, Ademco Group, Author: unknown, pp. 1-4.
ADEMCO Group, 5807 Smoke Detector with Built-In Wireless Installation Instructions, May 1998, ADEMCO Group, Author: unknown, pp. 1-6.
ADEMCO Group, 5808 Photoelectronic Smoke/Heat Detector with Built-In Wireless Transmitter Installation Instructions, 1998, ADEMCO Group, Author: unknown, pp. 1-8.
ADEMCO Group, 5808 Wireless Smoke Detector, 1999, available at http://web.archive.org/web/20000118015507/www.ademco.com/ademco on Mar. 5, 2009 pp. 1-4.
ADEMCO Group, 5809 Rate-of Rise Heat Detector/Transmitter Installation Instructions, Nov. 1994, ADEMCO Group, Author: unknown; pp. 1-2.
ADEMCO Group, 5816 Door/Window Transmitter Installation Instructions, Nov. 1994, ADEMCO Group, Author: unknown; pp. 1-2.
ADEMCO Group, 5816TEMP Low Temperature Transmitter Installation Instructions, May 1998, ADEMCO Group, Author: unknown; pp. 1-2.
ADEMCO Group, 5818 Recessed Transmitter Installation Instructions, Jan. 1994, ADEMCO Group, Author: unknown; pp. 1-2.
ADEMCO Group, 5819 Shock Processor Transmitter Installation Instructions, May 1998, ADEMCO Group, Author: unknown; pp. 1-2.
ADEMCO Group, 5819WHS Wireless Shock Sensor and Processor, 1997, available at http://web.archive.org/web/19990428164624/www.ademco.com/ademco on Mar. 5, 2009, pp. 1.
ADEMCO Group, 5819WHS/5819BRS Shock Processor Transmitter Installation Instructions, May 1998, ADEMCO Group, Author: unknown; pp. 1-2.
ADEMCO Group, 5827 Remote Wireless Keypad/Transmitter Installation Instructions, Apr. 1994, ADEMCO Group, Author: unknown; pp. 1.
ADEMCO Group, 5827BD and 5827BDE Wireless Bi-Directional Keypads Installation Instructions and Operating Guide, Mar. 1996, ADEMCO Group, Author: unknown; pp. 1-6.
ADEMCO Group, 5849 Glass Break Detector/Transmitter Installation Instructions, Oct. 1997, ADEMCO Group, Author: unknown; pp. 1-4.
ADEMCO Group, 5850 Glass Break Detector/Transmitter Installation Instructions, May 1998, ADEMCO Group, Author: unknown; pp. 1-4.
ADEMCO Group, 5890 Passive Infrared Motion Detector/Transmitter Installation Instructions, May 1998, ADEMCO Group, Author: unknown; pp. 1-8.
ADEMCO Group, 5890 Wireless PIR Motion Detector, 1997, available at http://web.archive.org/web/19990429054256/www.ademco.com/asc on Mar. 5, 2009, pp. 1-3.
ADEMCO Group, 5890PI Passive Infrared Motion Detector/Transmitter Installation Instructions, Mar. 1998, ADEMCO Group, Author: unknown; pp. 1-4.
ADEMCO Group, 6128RF Keypad/Receiver—full wireless capability, 1997, ADEMCO Group, Author: unknown; pp. 1-2.
ADEMCO Group, 6128RF Keypad/Transceiver Installation Instructions, Jul. 1998, ADEMCO Group, Author: unknown; pp. 1-8.
ADEMCO Group, 6128RF Keypad/Transceiver, User Guide, May 1998, ADEMCO Group, Author: unknown; pp. 1.
ADEMCO Group, 6128WL Keypad/Receiver Installation Instructions, Oct. 1998, ADEMCO Group, Author: unknown; pp. 1-8.
ADEMCO Group, 6128WL Keypad/Receiver User Guide, Oct. 1998, ADEMCO Group, Author: unknown; pp. 1.
ADEMCO Group, 7715DF MicroFAST Installation Tool, User Manual, Feb. 1998, ADEMCO Group, Author: unknown; pp. 1-32.
ADEMCO Group, 7720 Subscriber Radio, Installation Instructions, Jan. 1992, ADEMCO Group, Author: unknown, available at http://www.guardianalarms.net, pp. 1-18.
ADEMCO Group, 7720NX Network Extender, 1997, ADEMCO Group, Author: unknown, available at http://web.archive.org/web/19990220035932/www.ademco.com/ademco on Mar. 5, 2009, pp. 1-3.
ADEMCO Group, 7720NX Network Extender, ADEMCO Group, Author: unknown, 1998; pp. 1-2.

(56) References Cited

OTHER PUBLICATIONS

ADEMCO Group, 7720P Programming Tool, User Guide, Mar. 1992, ADEMCO Group, Author: unknown, available at http://www.guardianalarms.net; pp. 1-8.
ADEMCO Group, 7720Plus Subscriber Radio Installation Instructions, Oct. 1996, ADEMCO Group, Author: unknown, available at http://www.guardianalarms.net; pp. 1-30.
ADEMCO Group, 7720ULF Combination Fire Control and Long Range Radio Transmitter, 1997, ADEMCO Group, Author: unknown, available at http://web.archive.org/web/19990501210612/www.ademco.com/ademco on Mar. 5, 2009, pp. 1-3.
ADEMCO Group, 7720ULF Subscriber Radio, Installation Instructions, Mar. 1995, ADEMCO Group, Author: unknown, available at http://www.guardianalarms.net, pp. 1-20.
ADEMCO Group, 7720V2 Self-Contained Long Range Radio Transmitter, 1997, ADEMCO Group, Author: unknown, available at http://web.archive.org/web/19990501212349/www.ademco.com/ademco on Mar. 5, 2009 pp. 1-4.
ADEMCO Group, 7720V2 Subscriber Radio, Installation Instructions, Jun. 1996, ADEMCO Group, Author: unknown, available at http://www.guardianalarms.net, pp. 1-24.
ADEMCO Group, 7810iR Internet Receiver, Installation and Setup Guide, May 2002, ADEMCO Group, Author: unknown, available at http://www.guardianalarms.net, pp. 1-58.
ADEMCO Group, 7820 Appendicies, Mar. 1995, ADEMCO Group, Author: unknown, available at http://www.guardianalarms.net, pp. 1-2.
ADEMCO Group, 7820 Integrated Radio Transmitter, Installation Instructions, Aug. 1995, ADEMCO Group, Author: unknown, available at http://www.guardianalarms.net, pp. 1-52.
ADEMCO Group, 7825 Outdoor Antenna with Bracket, Installation Instructions, Feb. 1995, ADEMCO Group, Author: unknown, available at http://www.guardianalarms.net, pp. 1-2.
ADEMCO Group, 7830R SafetyNet Subscriber Radio, Installation Instructions, Jun. 1996, ADEMCO Group, Author: unknown, available at http://www.guardianalarms.net, pp. 1-32.
ADEMCO Group, 7830R Subscriber Transmitter, 1997, available at http://web.archive.org/web/19990501215427/www.ademco.com.ademco on Mar. 5, 2009, pp. 1- 3.
ADEMCO Group, 7835C Cellular Control Channel Transceiver, Installation and Setup Guide, Sep. 1998, ADEMCO Group, Author: unknown, available at http://www.guardianalarms.net, pp. 1-32.
ADEMCO Group, 7835C Cellular SafetyNet Subscriber Radio Transceiver, 1997ADEMCO Group, Author: unknown, available at http://web.archive.org/web/19990801221202/www.ademco.com/ on Mar. 5, 2009, pp. 1-3.
ADEMCO Group, 7845C Cellular Control Channel Transceiver, Installation and Setup Guide, Sep. 1990, ADEMCO Group, Author: unknown, available at http://www.guardianalarms.net, pp. 1-104.
ADEMCO Group, 7845CZ Seven Zone Cellular Control Channel Transceiver, Installation and Setup Guide, Sep. 2001, ADEMCO Group, Author: unknown, available at http://www.guardianalarms.net, pp. 1-64.
ADEMCO Group, 7845i Internet Communications Module, Installation and Setup Guide, Mar. 2002, ADEMCO Group, Author: unknown, available at http://www.guardianalarms.net, pp. 1-42.
ADEMCO Group, 7920SE 900MHz Fully Synthesized Transceiver, 1997, ADEMCO Group, Author: unknown, available at http://web.archive.org/web/19990501222639/www.ademco.com/ on Mar. 5, 2009, pp. 1-3.
ADEMCO Group, 7920SE Transceiver, Installation Instructions, Apr. 1995, ADEMCO Group, Author: unknown, available at http://www.guardianalarms.net, pp. 1-80.
ADEMCO Group, ADEMCO World Leader in Home Security Products, 1997, ADEMCO Group, Author: unknown, available at http://web.archive.org/web/19990428164624/www.ademco.com/ademco on Mar. 5, 2009, pp. 1-2.
ADEMCO Group, AlarmNet Introduces Control Channel Cellular for Commercial Fire/Burglary Applications, ADEMCO Group (press release), Aug. 31, 1999, available at http://web.archive.org/web/19990420234120/www.ademco.com/pr0831 on Mar. 31, 2009.
ADEMCO Group, AlarmNet, 1997, ADEMCO Group, Author: unknown, available at http://web.archive.org/web/199904240234130/www.ademco.com/ademco on Mar. 5, 2009, pp. 1-3.
ADEMCO Group, Alpha Vista No. 5130XT Security System, Installation Instructions, Mar. 1989, ADEMCO Group, Author: unknown, pp. 96.
ADEMCO Group, Compass Network Downloader, ADEMCO Group, Author: unknown, Date: unknown, available at http://www.guardianalarms.net pp. 1-109.
ADEMCO Group, Compass, 1997, ADEMCO Group, Author: unknown, available at http://web.archive.org/web/19990209094401/www.ademco.com/ademco on Mar. 5, 2009.
ADEMCO Group, Control/Communicator 5110XM User's Manual, Apr. 1996, ADEMCO Group, Author: unknown, pp. 1-30.
ADEMCO Group, Fire and Burglary System Model 5120XM User's Manual, Apr. 1996, Ademco Group, Author: unknown, pp. 1-40.
ADEMCO Group, Home Page, ADEMCO Group, Author: unknown, available at http://web.archive.org/web/19961023204954/http://ademco.com/ on Mar. 5, 2009, pp. 1.
ADEMCO Group, Lynx—Quick Install Security System, 1997, ADEMCO Group, Author: unknown, available at http://web.archive.org/web/19990116225005 pp. 1-3.
ADEMCO Group, Lynx Quick Start Guide, Oct. 1998, ADEMCO Group, Author: unknown, pp. 1-4.
ADEMCO Group, Lynx Security System Installation and Setup Guide, Oct. 1998, ADEMCO Group, Author: unknown, pp. 1-48.
ADEMCO Group, Lynx Security System Programming Form & Summary of Connections, Oct. 1998, ADEMCO Group, Author: unknown, pp. 1-16.
ADEMCO Group, Lynx Security System User Guide, Oct. 1998, Ademco Group, Author: unknown, pp. 1-40.
ADEMCO Group, Powerline Carrier Device Modules, 1997 ADEMCO Group, Author: unknown, available at http://web.archive.org/web/19990218035115/www.ademco.com/ademco on Mar. 5, 2009, pp. 1-2.
ADEMCO Group, Remote Keypads 6128, 6137, 6137R, 6138, 6139 & 6139R, Installation Guide, Aug. 1998, Ademco Group, Author: unknown, pp. 1-2.
ADEMCO Group, Security System Model 4110DL Programming Form, Oct. 1996, ADEMCO Group, Author: unknown, pp. 1-8.
ADEMCO Group, Security System Model 4110XM Programming Form, Jul. 1996, ADEMCO Group, Author: unknown, pp. 1-4.
ADEMCO Group, Security System Model 4120EC Programming Form, Sep. 1993, ADEMCO Group, Author: unknown, pp. 1-2.
ADEMCO Group, Security System Model 4120XM Programming Form, Sep. 1992, ADEMCO Group, Author: unknown, pp. 1-4.
ADEMCO Group, Security System Model 4130XM, 4140XM, 5130XM Programming Form, Date: unknown, ADEMCO Group, Author: unknown, pp. 1-4.
ADEMCO Group, Security System Model 4130XT/4140/5130XT Programming Form, Jul. 1989, ADEMCO Group, Author: unknown, pp. 1-2.
ADEMCO Group, Security System Model 4140XMP Programming Form, Jan. 1992, ADEMCO Group, Author: unknown, pp. 1-2.
ADEMCO Group, Security System Model 4140XMPT Programming Form, ADEMCO Group, Author: unknown, Date: unknown, pp. 1-2.
ADEMCO Group, Security System Model 4140XMPT2 Programming Form, Apr. 1996, ADEMCO Group, Author: unknown, pp. 1-4.
ADEMCO Group, Security System Model 5110XM Programming Form, Apr. 1996, ADEMCO Group, Author: unknown, pp. 1-4.
ADEMCO Group, Security System Model 5120XM Programming Form, Jun. 1996, ADEMCO Group, Author: unknown, pp. 1-4.
ADEMCO Group, Security System Model 5140XM Programming Form, Jun. 1993, ADEMCO Group, Author: unknown, pp. 1-4.
ADEMCO Group, Security System Model Vista-10 Programming Form, Sep. 1994, ADEMCO Group, Author: unknown, pp. 1-4.

(56) References Cited

OTHER PUBLICATIONS

ADEMCO Group, Security System Model Vista-10SE Programming Form, Apr. 1997, ADEMCO Group, Author: unknown, pp. 1-24.
ADEMCO Group, Security System Model Vista-128B Commercial Burglary Partitioned Security System with Scheduling, Quick Start Guide, Jun. 1998, ADEMCO Group, Author: unknown, pp. 1-39.
ADEMCO Group, Security System User's Manual, Sep. 1996, ADEMCO Group, Author: unknown, pp. 1-88.
ADEMCO Group, The Vista-100 Series, 1997, ADEMCO Group, Author: unknown, available at http://web.archive.org/web19970620010543/www.ademco.com/ademco on Mar. 5, 2009.
ADEMCO Group, The Vista-10SE, 1997, ADEMCO Group, Author: unknown, available at http://web.archive.org/web/19990502214402/www.ademco/com/ademco on Mar. 5, 2009, pp. 1-4.
ADEMCO Group, via6 Programming Form, Jul. 1993, ADEMCO Group, Author: unknown, pp. 1-2.
ADEMCO Group, via6 Security System, Installation Instructions, Jan. 1992, ADEMCO Group, Author: unknown, pp. 1-24.
ADEMCO Group, via-30+, Vista 10, 4111XM Security System User's Manual, Jul. 1994, Ademco Group, Author: unknown, pp. 1-44.
ADEMCO Group, via-30Pse Security System Programming Guide, Apr. 1997, ADEMCO Group, Author: unknown, pp. 1-24.
ADEMCO Group, via-30PSE, VISTA-1SE Security System User's Manual, Jan. 1997, ADEMCO Group, Author: unknown, pp. 1-88.
ADEMCO Group, Vista 4120XM and 4140XMP Security System User's Manual, Jan. 1994, ADEMCO Group, Author: unknown, pp. 1-60.
ADEMCO Group, Vista 4130XT Security System Installation Instructions, Oct. 1998, ADEMCO Group, Author: unknown, pp. 1-84.
ADEMCO Group, Vista 4140XMPT2 Partitioned Security System with Scheduling Installation Instructions, May 1993, ADEMCO Group, Author: unknown, pp. 1-68.
ADEMCO Group, Vista AT 4140 Security System Installation Instructions, Sep. 1998, ADEMCO Group, Author: unknown, pp. 1-68.
ADEMCO Group, Vista Series 4120EC Security System User's Manual, Sep. 1992, ADEMCO Group, Author: unknown, pp. 1-28.
ADEMCO Group, Vista Series 4130XM, 5130XM, 4140XMP Security System User's Manual, Feb. 1992, ADEMCO Group, Author: unknown, pp. 1-32.
ADEMCO Group, Vista Series 4140XMPT/4140XMPT-UL Partitioned Security System User's Manual, Jun. 1993, ADEMCO Group, Author: unknown, pp. 1-32.
ADEMCO Group, Vista Series 4140XMP, Installation Instructions, Jan. 1992, ADEMCO Group, Author: unknown, pp. 1-52.
ADEMCO Group, Vista Series 5140XM User's Manual, Aug. 1992, ADEMCO Group, Author: unknown, pp. 1-28.
ADEMCO Group, Vista XM Series 4140XM, 5130XM, 4130XM, Installation Instructions, Jul. 1990, ADEMCO Group, Author: unknown, pp. 1-26.
ADEMCO Group, Vista XM Series, Installation Instructions, ADEMCO Group, Author: unknown, Oct. 1991, pp. 1-16.
ADEMCO Group, Vista-10 Security System, Installation Instructions, Sep. 1994, ADEMCO Group, Author: unknown, pp. 1-56.
ADEMCO Group, Vista-100 Commercial Fire & Burglary Alarm Partitioned Security System with Scheduling, Installation Instructions and Programming Guide, Jan. 1998, ADEMCO Group, Author: unknown, pp. 1-233.
ADEMCO Group, Vista-100 Commercial Fire & Burglary Alarm System User's Manual, Nov. 1995, ADEMCO Group, Author: unknown, pp. 1-66.
ADEMCO Group, Vista-100 Commercial Fire & Burglary Alarm System with Scheduling Quick Start, Apr. 1996, ADEMCO Group, Author: unknown, pp. 1-24.
ADEMCO Group, Vista-10SE Security System, Installation Instructions, May 1997, ADEMCO Group, Author: unknown, pp. 1-88.
ADEMCO Group, Vista-128B Commercial Burglary Partitioned Security System with Scheduling, Installation and Setup Guide, Jul. 1998, ADEMCO Group, Author: unknown, pp. 1-252.
ADEMCO Group, Vista-128FB Commercial Fire and Burglary Partioned Security System with Scheduling, Installation, and Setup Guide, Oct. 1998, ADEMCO Group, Author: unknown, pp. 1-220.
ADEMCO Group, Vista-128FB Commercial Fire and Burglary Partitioned Security System User Guide, Oct. 1998, ADEMCO Group, Author: unknown, pp. 1-80.
ADEMCO Group, Vista-20 2-Partitioned Security System, Installation Instructions, Nov. 1995, ADEMCO Group, Author: unknown, pp. 1-120.
ADEMCO Group, Vista-20 2-Partitioned Security System, Programming Form, Apr. 1996, ADEMCO Group, Author: unknown, pp. 1-8.
ADEMCO Group, Vista-20 Security System User's Manual, Apr. 1995, ADEMCO Group, Author: unknown, pp. 1-52.
ADEMCO Group, Vista-20HW 2-Partitioned Security System, Installation Instructions, Apr. 1996, ADEMCO Group, Author: unknown, pp. 1-100.
ADEMCO Group, Vista-20HW 2-Partitioned Security System, Programming Form, Apr. 1996, ADEMCO Group, Author: unknown, pp. 1-8.
ADEMCO Group, Vista-20HWse 2-Partitioned Security System, Installation Instructions, Aug. 1997, ADEMCO Group, Author: unknown, pp. 1-84.
ADEMCO Group, Vista-20HWse 2-Partitioned Security System, Programming Form, Aug. 1997, ADEMCO Group, Author: unknown, pp. 1-8.
ADEMCO Group, Vista-20SE 2-Partitioned Security System, Installation Instructions, Aug. 1997, ADEMCO Group, Author: unknown, pp. 1-100.
ADEMCO Group, Vista-20SE 2-Partitioned Security System, Programming Guide, Aug. 1997, ADEMCO Group, Author: unknown, pp. 1-8.
ADEMCO Group, Vista-20SE/Vista-20HWse Security System User's Manual, Jun. 1997, ADEMCO Group, Author: unknown; pp. 1-52.
ADEMCO Group, Vista-30Pse Security System, Installation Instructions, Apr. 1997, ADEMCO Group, Author: unknown; pp. 1-104.
ADEMCO Group, Vista-40 2-Partition Security System, Installation and Setup Guide, Jul. 1998, ADEMCO Group, Author: unknown; pp. 1-380.
ADEMCO Group, Vista-40 2-Partition Security System, Programming Guide, Jul. 1998, ADEMCO Group, Author: unknown; pp. 1-24.
ADEMCO Group, Vista-40 Programming Guide, Jun. 1997, ADEMCO Group, Author: unknown; available at www.guardianalarms.net pp. 1-20.
ADEMCO Group, Vista-40 Security System User's Guide, Jul. 1998, ADEMCO Group, Author: unknown; pp. 1-60.
ADEMCO Group, Vista-50, Vista 50UL Security System, Nov. 1994, ADEMCO Group, Author: unknown; pp. 1-66.
ADEMCO Group, Vista-50P, Vista-50PUL Partitioned Security System with Scheduling, Installation Instructions and Programming Guide, Oct. 1997, ADEMCO Group, Author: unknown; pp. 1-199.
ADEMCO Group, Vista-50P, Vista-50PUL Security System User's Manual, Jul. 1995, ADEMCO Group, Author: unknown; pp. 1-66.
ADEMCO Group, Vista-50, Vista-50PUL, Partitioned Security System with Scheduling, Quick Start, Aug. 1995, ADEMCO Group, Author: unknown; pp. 1-28.
ADEMCO Group, Vista5140XM Commercial Fire and Burglary Alarm System Installation Instructions, Jun. 1993, ADEMCO Group, Author: unknown, pp. 1-74.
ADEMCO Group, Vista-AT Security System User's Manual, Sep. 1998, ADEMCO Group, Author: unknown; pp. 1-56.
ADEMCO Group, V-Link Downloading Software User's Guide, Jun. 1994, ADEMCO Group, Author: unknown; available at http://www.guardianalarms.net, pp. 1-126.

(56) References Cited

OTHER PUBLICATIONS

ADEMCO Group, V-Plex Security Technology, 1997, ADEMCO Group, Author: unknown, available at http://web.archive.org/web/9990421110527/www.ademco.com/ademco on Mar. 5, 2009, pp. 1-6.
ADEMCO Group, Wireless Transmitters/Receivers: 5700 Wireless Transmitters, 1997, ADEMCO Group, Author: unknown, available at http://web.archive.org/web/19990127120423/www.ademco.com/ademco on Mar. 5, 2009, pp. 1-2.
ADEMCO Group, Wireless Transmitters/Receivers: 5800 Wireless Transmitters, 1997, ADEMCO Group, Author: unknown, available at http://web.archive.org/web/19990218181254/www.ademco/com/ademco on Mar. 5, 2009, pp. 1-2.
ADEMCO Group, Wirelss User Interface Devices, 1997, ADEMCO Group, Author: unknown, available at http://web.archive.org/web/19990421190353/www.ademco.com/ademco on Mar. 5, 2009, pp. 1-4.
ADEMCO Group,Vista Series Partitioned Security Systems Model 4140XMPT Installation Instructions, Feb. 1992, ADEMCO Group, Author: unknown, pp. 1-60.
AES-7700 Central Station, Installation & Operation Manual, Document 40-0551u, AES Corporation, Author: unknown, Nov. 2003, pp. 1-40.
AES-IntelliGuard 7470, AES IntelliNet, Author: unknown, Nov. 2003, pp. 1-15.
AES 7000 Smart Central Station InstaCentral Station Installation & Operation Manual, Document No. 40-551, AES IntelliNet, Author: unknown; Nov. 20, 1996, pp. 1-48.
AES 7067 IntelliTap-II Digital Dialer Interface: A Supplemental Alarm Supporting Device, AES INtelliNet, Author: unknown, Aug. 5, 2004, pp. 1-4.
AES 7099 Central Station Installation & Operation Manual, Document No. 40-0050, AES IntelliNet, Author: unknown; 1998, pp. 1-20.
AES 7450 RF Subscriber Unit Installation Manual, AES IntelliNet, Author: unknown, 1998, pp. 1-8.
AES 7750-F RF Smart Subscriber Unit Version 2, Including 7750-F-4x4 and 7750-F-8, Installation & Operation Manual, AES IntelliNet, Author: unknown, Apr. 2001 (Updated Nov. 2003), pp. 1-60.
AES 7750-F RF Smart Subscriber Unit Version 2, Installation & Operation Manual, AES IntelliNet, Author: unknown, Aug. 2000, pp. 1-30.
AES Central Alarm Monitoring, Author: unknown, available at http://web.archive.org/web/19990225163745/www.aes-intellinet.com/ae, on Mar. 5, 2009, pp. 1-3.
AES IntelliNet 7450 Addendum, AES Corporation, Author: unknown, Jul. 9, 2002, pp. 1-2.
AES IntelliNet Dealer's List by State, Author: unknown, available at http://web.archive.org/web/200102162324026/www.aes-intellinet.com/list on Mar. 5, 2009, pp. 1-13.
AES IntelliNet Model 7003 Central Station, Installation & Operation Manual, AES IntelliNet, Author: unknown, Jan. 9, 2001, available at http://www.guardianalarms.net, pp. 1-25.
AES IntelliNet Model 7050, 7750, Subscriber Unit, Version 1.62, Installation & Operation Manual, AES IntelliNet, Author: unknown, Dec. 1996, available at www.guardianalarms.net, pp. 1-110.
AES IntelliNet Model 7440 & 7440-XL RF Subscriber Unit, Addendum, AES IntelliNet, Author: unknown, Aug. 29, 2002.
AES IntelliNet Net 77 Version 1.48.30, Installation & Operation Manual, Document 40-0551u, AES Corporation, Author: unknown, Jun. 1999, pp. 1-30.
AES IntelliNet Net 77 Version 1.48.4, Installation & Operation Manual, Document 40-0551u, AES Corporation, Author: unknown, Nov. 2000, pp. 1-36.
AES IntelliNet Net 7K Version 1.48.4, Installation & Operation Manual, Document 40-0551, AES Corporation, Nov. 2000, pp. 1-36.
AES IntelliNet Net7K Version 3, Installation & Operation Manual, Document 40-0551, AES Corporation, Jun. 1999, pp. 1-30.

AES IntelliNet Radio Communication Subscriber Unit 7050, Sep. 16, 1997, available at http://web.archive.org/web/19990203061203/www.aes-intellinet.com/sp on Mar. 5, 2009, pp. 1-2.
AES IntelliNet Theory of Operation, AES IntelliNet; Author: unknown, Dec. 1996, downloaded from http://www.guardianalarms.net, pp. 1-18.
AES IntelliNet Wireless Network Glossary of Terms, document 40-0551u, AES IntelliNet, Author: unknown, Dec. 1996, pp. 1-15.
AES IntelliNotes Universal Serial data Interface/USDI, Bulletin No. 55, AES Corporation, Author: unknown, Apr. 5, 2001, pp. 1-12.
AES IntelliTAP Model 7068, Version 1.08, Installation Guide, AES IntelliNet, Author: unknown, Jun. 15, 2000, pp. 1-11.
AES IntelliTRAK 7555-RT GPS Based Vehicle Tracking Unit, Version 2.0a, AES IntelliNet, Author: unknown, Feb. 20, 2001, pp. 1-16.
AES IntelliTRAK 7555-RT GPS Based Vehicle Tracking Unit, Version 2.12, AES IntelliNet, Author: unknown, Nov. 6, 2002, pp. 1-16.
AES Net7000, Installation & Operation Manual, AES Intellinet, Author: unknown, Nov. 24, 1996, pp. 1-76.
AES Net77 Wireless Network Management Software Installation & Operation ManuCentral Station Manual, Section 3, AES IntelliNet, Author: unknown, Dec. 1996, pp. 1-87.
AES UL/ULC System Configuration, AES Corporation, Author: unknown, May 1, 2003, pp. 1.
Agre et al., "Autoconfigurable Distributed Control Systems," ISADS, Apr. 27, 1995.
Agre et al., "Development Platform for Self-Organizing Wireless Sensor Networks," Rockwell Science Center and UCLA, Date:unknown, pp. 1-25.
Agre et al., "Technical and Management Proposal for Adaptive Wireless Arrays for Interactive Reconnaissance, Surveillance and Target Acquisition in Small Unit Operations (AWAIRS)," Defense Advanced Research Projects Agency Broad Agency Announcement 96-26, UCLA, Date: unknown, pp. 1-50.
Airpath Wireless, Inc., "Hot Spot Hardware," Copyright 2003, http://www.airpath.com/programs/hardward/hardware.htm (vistited Jul. 29, 2003) (2 pages).
AlarmLink, Inc. A Brief History available at http://www.alarmlink.com/Default.aspx?tabid=28, on Mar. 23, 2009, pp. 1.
AlarmLink, Inc. Alarm Over IP Products, available at http://www.alarmlink.com/Default.aspx?tabid=38 on Mar. 24, 2009, pp. 1.
AlarmLink, Inc. Central Stations, availabe at http://www.alarmlink.com/Default.aspx?tabid=35, on Mar. 24, 2009.
AlarmLink, Inc. Home Page, avaliable at http://www.alarmlink.com/ on Mar. 24, 2009, pp. 1.
AlarmLink, Inc., "MeshWorks of Los Angeles," available at http://www.alarmlink.com/Default.aspx?tabid=39 on Mar. 24, 2009, pp. 1.
Alwan et al., "Adaptive Mobile Multimedia Networks," IEEE Personal Communications, Apr. 1996, pp. 34-51.
American National Standards Institute, Inc., "ANSI C12.18-1996: Protocol Specification for ANSI Type 2 Optical Port," National Electrical Manufactures Association, 1996.
American National Standards Institute, Inc., "ANSI C12.19-1997: Utility Industry End Device Data Tables," National Electrical Manufactures Association, 1997.
Amir et al., "An Evaluation of the Metricom Ricochet Wireless Network," CS 294-7 Class Project, Department of Electrical Engineering and Computer Science of the University of California at Berkeley, Publisher: unknown, May 7, 1996, pp. 1-20.
Amir, "The Ricochet System Architecture," available at http://www.lariat.org/Berkeley/node2.html, on May 1996, pp. 1-5.
Asada et al., "Low Power Wireless Communication and Signal Processing Circuits for Distributed Microsensors;" Proceedings of the International Circuits and Systems Symposium, ISCAS '97; UCLA, Rockwell Science Center; Jun. 1997, pp. 1-5.
Asada et al., "Wireless Integrated Network Sensors: Low Power Systems on a Chip," UCLA, Rockwell Science Center; Date: unknown, pp. 1-24.
Asada et al., "Wireless Integrated Sensors Networks: Low Power Systems on a Chip," Publisher: unknown, Date: unknown, pp. 1-8.

(56) References Cited

OTHER PUBLICATIONS

Asada, "Wireless Integrated Network Sensors (WINS)," UCLA, SPIE vol. 3673, Mar. 1999, pp. 11-18.
Baba et al., "Wireless Medium Access Control Protocol for CAN," 4th Int'l CAN Conf., Berlin, Germany, available at http://www.can-cia.org/fileadmin/cia/files/icc/4/baba1.pdf (1997).
Bagby, "Calypso Ventures Inc.—WLAN background," 2 pages.
Baker et al. "The Architectual Organization of a Mobile Radio Network via a Distributed Algorithm," IEEE, Nov. 1981.
Ball et al., "Reliability of Packet Switching Broadcast Radio Networks," IEEE Transactions on Circuits and Systems, vol. CAS-23, No. 12, Dec. 1976, pp. 806-813.
Bapna, et al., "Antenna Pointing for High Bandwidth Communications from Mobile Robots," Paper, Field Robotics Center, The Robotics Institute, Carnegie Mellon University, date: unknown, pp. 1-6.
Beech et al., "AX.25 Link Access Protocol for Amateur Packet Radio, Version 2.2," American Relay & Tucson Amateur Packet Radio Corporation, Jul. 1993, Revised Jul. 1998, pp. 1-143.
Bergstein, "US telco plans WiFi payphone," May 12, 2003, http://www.news.com/au/common/story_page/0,4057,6420676%5E15306,00.html (2 pages).
BGE, 5743 Wireless Dual Switch™ Glass Break Detector, Installation and Operating Instructions, BGE, Author: unknown; Date: unknown, pp. 1-2.
BGE, 5742 Wirelss Audio Switch™ Glass Break Detector, Installation and Operating Instructions, BGE, Author: unknown, Date: unknown, pp. 1-10.
Bhatnagar et al., "Layer Net: A New Self-Organizing Network Protocol," Department of Electrical Engineering, SUNY, IEEE, 1990.
Black, "Luton RF Technology, Reliable, First, Forward Thinking," Lutron Electronics Co. Inc., Aug. 2006, pp. 1-16.
Blaney, "HomeRF™ Working Group, 4th Liason Report," IEEE, 802.11-98/360, Nov. 1998, Slides 1-12.
Brain, "How Motes Work," available at http://computer.howstuffworks.com/mote.htm, on Feb. 25, 2010, pp. 1-2.
Brain, "How Motes Work: Ad hoc Networks," available at http://computerhowstuffw orks.com/mote3.htm on Feb. 25, 2010, pp. 1-3.
Brain, "How Motes Work: The Basic Idea," available at http://computer.howstuff works.com/mote1.htm, on Feb. 25, 2010, pp. 1-2.
Brain, "How Motes Work: Typical Applications," available at http://computer.howstuff works.com/mote2.htm, on Feb. 25, 2010, pp. 1-2.
Brayer, "Implementation and Performance of Survivable Computer Communication with Autonomous Decentralized Control," IEEE Communications Magazine, Jul. 1983, pp. 34-41.
Brownrigg et al., "Development of a Packet-Switching Network for Library Automation," Proceedings of The National Online Meeting Apr. 12-14, 1983, pp. 67-74.
Brownrigg et al., "Electrons, Electronic Publishing, and Electronic Display," Information Technology and Libraries (Sep. 1985), pp. 201-207.
Brownrigg et al., "Implementing Library Automation Plans in a University Computing Environment, Planning for Computing in Higher Education 5," EDUCOM Series in Computing and Telecommunications in Higher Education, 1980, pp. 215-225.
Brownrigg et al., "Online Catalogues: Through a Glass Darkly," Information Technology and Libraries, Mar. 1983, pp. 104-115.
Brownrigg et al., "Packet Radio for Library Automation," Information Technology and Libraries 3 (Sep. 1984), pp. 229-244.
Brownrigg et al., "Packet Switching and Library Automation: A Management Perspective," Proceedings of the 45th ASIS Annual Meeting Oct. 17-21, 1982, vol. 19, pp. 54-57.
AES IntelliNet Model 7050-E Radio Subscriber Unit Installation Manual, AES IntelliNet, Author: unknown, Jul. 17, 2000, available at www.guardianalarms.net, pp. 1-4.

AES IntelliNet Model 7050-E & 7750-E, RF Subscriber Unit, Version 1.71, Installation & Operation Manual, AES IntelliNet, Author: unknown, Feb. 24, 1997, available at www.guardianalarms.net, pp. 1-54.
Brownrigg et al., "Technical Services in the Age of Electronic Publishing," Library Resource & Technical Services, Jan./Mar. 1984, pp. 59-67.
Brownrigg, "Continuing Development of California State Radio Packet Project," Proceedings of the ASIS 1992 Mid-Year Meeting (Silver Spring, MD: American Society for Information Science, 1992), pp. 97-100.
Brunninga, "A Worldwide Packet Radio Network," Signal, vol. 42, No. 10, Jun. 1988, pp. 221-230.
Bryan et al., "Man-Portable Networked Sensor System," Publisher: unknown, Date: unknown, pp. 1-10.
Bult et al, "A Distributed, Wireless MEMS Technology for Condition Based Maintenance," EED, Defense Technical Information Center, UCLA, Electrical Engineering Department, Rockwell Science Center; Apr. 22-26, 1996.
Bult et al., "A Distributed, Wireless MEMS Technology for Condition Based Maintenance," Publisher: unknown; Nov. 1997, pp. 1-8.
Bult et al., "Low Power Systems for Wireless Microsensors," EED, UCLA; ILSPED; 1996, pp. 1-15.
Bult et al., "Low Power Systems for Wireless Microsensors," UCLA Electrical Engineering Department, Los Anegeles, CA and Rockwell Science Center, Thousand Oaks, CA; Aug. 14, 1996, pp. 25-29.
Bult et al., "Low Power Wireless Integrated Microsensors (LWIM)," EED, UCLA; ARPA—LPE PI Meeting, Apr. 27-28, 1995, pp. 1-30.
Bult et al., "Wireless Integrated Microsensors," EED, UCLA Electrical Engineering Department, Rockwell Science Center, TRF; Jun. 6, 1996, pp. 205-210.
CADDX-CADDI Controls, Inc., Ranger 9000E, User's Manual, downloaded from http://www.guardianalarms.net, May 17, 1996, pp. 1-9.
Carlisle, "Edison's NetComm Project," Proceedings of the 33rd Annual Rural Electric Power Conference, IEEE, Apr. 1989, pp. B5/1-B5/4.
Chen et al., "Route Optimization and Location Updates for Mobile Hosts," 1996 IEEE, Proceedings of the 16th ICDCS, pp. 319-326.
Chen, Emerging Home Digital Networking Needs, Paper, DSP Solutions R & D Center, Texas Instruments, Inc., pp. 1-6.
Cisco Systems, Inc., Enhanced Interior Gateway Routing Protocol, Cisco Systems, Inc., Updated Sep. 9, 2005, pp. 1-44.
Cisco Systems, RFC1812—Requirements for IP Version 4 Routers, Fred Baker ed. (Jun. 1995), available at http://www.faqs.org/rfcs/rfc1812.html, Sep. 14, 2009, pp. 1-129.
Clement, "SCADA System Using Packet Radios Helps to Lower Cincinnati's Telemetry Costs," Water/ Engineering & Management, Aug. 1996, pp. 18-20.
Cleveland, "Performance and Design Considerations for Mobile Mesh Networks," Milcom '96 Conference Proceedings, vol. 1 of 3, Oct. 22-24, 1996, pp. 245-249.
Clever Solutions—Metricom offers wireless data networks—includes related articles on Metricom's technology and the SONeTech company—Company Profile, available at http://findarticles.com/p/articles/mi_m0REL/is_n 11_v93/ai_147 70465/?tag=content;col1, on Nov. 22, 1993 (3 pages).
Coactive Networks, Inc., A New Solution for Offering Multive Telemetry Services to the Home, Coactive, 1999, pp. 1-8.
Coactive Networks, Inc., Coactive Connector® 1000 Series, Coactive, 2000, pp. 1-4.
Coactive Networks, Inc., Coactive Connector® 2000 Series, Coactive, Date: unknown, pp. 1-8.
Coactive Networks, Inc., Connecting Networks to the Real World™, Coactive, Date: unknown, pp. 1-4.
Coactive Networks, Inc., Corporate Backgrounder, Coactive, 2001, pp. 1-6.
Coactive Networks, Inc., Corporate Fact Sheet, Coactive, 2001, pp. 2.

(56) References Cited

OTHER PUBLICATIONS

Coactive Networks, Inc., Router-LE: Remote Access to LonWorks Over Ethernet, Coactive, 1998, pp. 1-4.
Coactive Networks, Inc., Router-LL: Connect LonWorks Networks Across Internet Protocol, Coactive, 1998, pp. 1-4.
Cohen et al., "IP Addressing and Routing in a Local Wireless Network," 1992 IEEE, 1992, pp. 626-632.
Cook et al., "Water Distribution and Control by Wireless Networking," Electronic Systems Technology, Date: unknown, pp. 1-3.
Corbell et al., "Technical Implementation in Support of The IAEA's Remote Monitoring Field Trial at the Oak Ridge Y-12 Plant," Dept. of Energy, Office of Scientific and Technical Information, Report No. SAND-096-1934C, available at http://www.osti.gov/bridge/product.biblio.jsp?qu ery_id=1&page=0&osti_id=270678 (1996).
Corbell et al., "Technical Results of Y-12/IAEA Field Trial of Remote Monitoring System," Dept. of Energy, Office of Scientific and Technical Information, Report No. Sand-97-1781C, available at http://www.osti.gov/bridge/product.biblio.jsp?query_id=0 &page=0&osti_id=505711 (1997).
Corcoran et al., "Browser-Style Interfaces to a Home Automation Network," IEEE Transactions on Consumer Electronics, vol. 43, No. 4, Nov. 1997, pp. 1063-1069.
Corcoran et al., "CEBus Network Access via the World-Wide-Web," available at http://ieeexplore.ieee.org/xpl/freeabs_all.jsp?arnu mber= 517285, on Mar. 29, 2009, Paper published on Consumer Electronics, 1996, Digest of Technical Papers, pp. 236-237.
Corcoran et al., "CEBus Network Access via the World-Wide-Web," IEEE, 1996.
Corson et al., "Architectural Considerations for Mobile Mesh Networking," Milcom '96 Conference Proceedings vol. 1 of 3, Oct. 22-24, 1996, pp. 225-229.
Corson et al., "Internet-Based Mobile Ad Hoc Networking," IEEE Internet Computing, Jul.-Aug. 1999, pp. 63-70.
Court's claim construction Order dated Feb. 10, 2009, in *SIPCO LLC et al.* v. *The Toro Co. et al.*, Case No. 2:08-cv-00505-TJS (E.D. Pa.).
Custom Solutions, Inc. Acessories, available at http://web.archive.org/web/19981206221844/www.csi3.com/hv_pv4.htm on Feb. 27, 2009, pp. 1-3.
Custom Solutions, Inc., HomAtion 2000 for HomeVision, Press Release, available at http://web.archive.org/web/19981207075734/www.csi3.com/HV_PR_0 on Feb. 27, 2009, pp. 1-2.
Custom Solutions, Inc., HomeVision 2.7 "How To" Information, Date: unknown; pp. 1-146.
Custom Solutions, Inc., HomeVision 2.7 Auto Report Feature, Date: unknown, pp. 1-10.
Custom Solutions, Inc., HomeVision 2.7 Interface Command Protocol, Date: unknown, pp. 1-40.
Custom Solutions, Inc., HomeVision 2.7 Interface Command Protocol, Date: unknown, pp. 1-80.
Custom Solutions, Inc., HomeVision 2.7, Date: unknown, pp. 1-42.
Custom Solutions, Inc., HomeVision 2.7, Document Purpose, Date: unknown, pp. 1-28.
Custom Solutions, Inc., HomeVision 2.7, Summary of Changes—2.7, Date: unknown, pp. 1-26.
Custom Solutions, Inc., HomeVision 2.7, Welcome to HomeVision, Date: unknown, pp. 1-18.
Custom Solutions, Inc., HomeVision 2.7e, Owner's Manual (1999); pp. 1-596.
Custom Solutions, Inc., HomeVision 2.7e, Version History Overview, Date: unknown, pp. 1-38.
Custom Solutions, Inc., HomeVision Description, available at http://web.archive.org/web/19981206004955/http://www.csi3.com/HV.htm on Mar. 2, 2009, pp. 1-14.
Custom Solutions, Inc., HomeVision PC 2.62 Interface Command Protocol, date: unknown, pp. 1-36.
Custom Solutions, Inc., HomeVision PC 2.62, Welcome to HomeVision PC, Date: unknown; pp. 1-16.
Custom Solutions, Inc., HomeVision PC 2.62, Document Purpose, Date: unknown, pp. 1-24.
Custom Solutions, Inc., HomeVision PC 2.62, Summary of Changes—2.62, date: unknown, pp. 1-8.
Custom Solutions, Inc., HomeVision PC 2.62, Version History Overview, Date:unknown, pp. 1-6.
Custom Solutions, Inc., HomeVision-PC Description, available at http://web.archive.org/web/19981205094024/http://www.csi3.com/hv_pc.htm on Mar. 2, 2009, pp. 1-6.
Custom Solutions, Inc., HomeVision-PC Software, available at http://web.archive.org/web/19990224053817/http://www.csi3.com/hvp3pc.htm on Feb. 27, 2009, pp. 1-2.
Custom Solutions, Inc., HomeVision-PC Version 2.62, Owner's Manual (1997), pp. 1-234.
Custom Solutions, Inc., Media Information, Feb. 6, 1999, available at http://web.archive.org/web/19990502073249/www.csi3.com/hv_media.htm on Feb. 27, 2009, pp. 1-2.
Custom Solutions, Inc., Using Enerzone StatNet Thermostats with HomeVision (1998) pp. 1-16.
Davies et al., "Internetworking in the Military Environment," Proceedings of IEEE Infocom '82 (1982) pp. 19-29.
Davies et al., "The Application of Packet Switching Techniques to Combat Net Radio," Proceedings of the IEEE, vol. 75, No. 1, Jan. 1987, pp. 43-55.
Deering et al., "Internet Protocol, Version 6 (IPv6)," RFC1883, Publisher: unknown, Dec. 1995, pp. 1-37.
Deering et al., "Internet Protocol, Version 6 (IPv6)," RFC2460, The Internet Society, Dec. 1998, pp. 1-39.
Diaz, "Intervehicular Information System (IVIS): the Basis for a Tactical Information System," SAE International, Mar. 1994, pp. 1-14.
Dixon et al., "Addressing, Bridging and Source Routing," IEEE Network, Jan. 1988, vol. 2, No, 1, pp. 25-32.
Dong et al., "Low Power Signal Processing Architectures for Network Microsensors," ACM, 1997, pp. 173-177.
Echelon Corp., "LonTalk® Protocol Specification," Doc. No. 19550, available at http://ww w.enerlon.com/JobAids/Lontalk %20Protocol%20Spec.pdf (1994).
Echelon Corp., "Series 90™-30 PLC LonWorks® Bus Interface Module User's Manual," Doc. No. GFK-1322A, available at http://www.pdfsupply.com/pdfs/gfk1322a.pdf (1997).
Elson et al., "Fine-Grained Network Time Synchronization Using Reference Broadcasts," UCLA Computer Science Department, May 17, 2002, pp. 1-14.
Eng et al., "BAHAMA: A Broadband Ad-Hoc Wireless ATM Local-Area Network," 1995 IEEE International Conference on Communications, Jun. 18-22, 1995, pp. 1216-1223.
Ephremides et al., "A Design Concept for Reliable Mobile Radio Networks with a Frequency Hopping Signaling," IEEE 1987, pp. 1-18.
ESTeem Application Paper—AgriNorthwest Employee's Provide Wireless Control System (describing a system that was in use prior to Mar. 1999).
ESTeem Application Paper—Allen-Bradley Goes Wireless on Alaska's North Slope (describing a system that was in use prior to Mar. 1999).
ESTeem Application Paper—Build Your Own Wireless Power Distribution System (describing a system that was in use prior to Mar. 1999).
ESTeem Application Paper—Lost Cabin Gas Plant Uses Wireless Control to Enhance Production & Safety (describing a system that was in use prior to Mar. 1999).
ESTeem Application Paper—Northwest Farm Applies Wireless Solution (describing a system that was in use prior to Mar. 1999).
ESTeem Application Paper—Wireless Control of Polluted Water (describing a system that was in use prior to Mar. 1999).
ESTeem Application Paper—Wireless Mobile Mapping System (describing a system that was in use prior to Mar. 1999).
ESTeem Application Paper—Wireless Networking for Kodiak's Coast Guard Station (describing a system that was in use prior to Mar. 1999).
ESTeem Application Paper—Wireless Networking for Natural Gas Extraction (describing a system that was in use prior to Mar. 1999).

(56) References Cited

OTHER PUBLICATIONS

ESTeem Models 85, 95, 96, & 98 User's Manual (describing the ESTeem 96C and 96F radios used prior to 1999).
Estrin et al., "Next Century Challenges: Scallable Coordination in Sensor Networks," ACM, 1999, pp. 263-270.
Estrin et al., "RFC1940-Source Demand Routing: Packet Format and Forwarding Specification (Version 1)," Network Working Group, May 1996, available at http://www.faqs.org/rfcs/rfc1940.html, Sep. 14, 2009, pp. 1-20.
Estrin et al., "Source Demand Routing: Packet Format and Forwarding Specification (Version 1)", Network Working Group, Internet Draft, Jan. 19, 1995, pp. 1-28.
Federal Communications Commission, "Notice of Proposed Rule Making and Order," Adopted Dec. 17, 2003, Released Dec. 30, 2003 (54 pages).
Frank, "Transmission of IP Datagrams Over NET/ROM Networks, ARRL Amateur Radio 7th Computer Networking Conference," Oct. 1988, pp. 65-70.
Frank, "Understanding Smart Sensors," Artech House (1996).
Franz, "HiperLAN—Der ETSI-Standard fur locale Funknetze," NTZ, Sep. 1995, 10 pages.
Gale et al., "The Impact of Optical Media on Information Publishing," Bulletin of the American Society for Information Science, vol. 12, No. 6, Aug./Sep. 1986, pp. 12-14.
Garbee, "Thoughts on the Issues of Address Resolution and Routing in Amateur Packet Radio TCP/IP Networks," ARRL Amateur Radio 6th Computer Networking Conference, Aug. 1987, p. 56-58.
Garcia-Luna-Aceves, "A Fail-Safe Routing Algorithm for Multishop Packet-Radio Networks," IEEE Infocom '86, Technical Sessions: Apr. 8-10, 1986, pp. 434-442.
Garcia-Luna-Aceves, "A Minimum-hop Routing Algorithm Based on Distributed Information," Elsevier Science Publishers, B.V. (North Holland), 1989, pp. 367-382.
Garcia-Luna-Aceves, "Routing Management in Very Large Scale Networks," Elsevier Science Publishers, B.V. (North Holland), 1988, pp. 81-93.
GE Security, "NetworkX NX-4," 2004, pp. 1-2.
GE Security, "NetworkX NX-548E," 2006, pp. 1-2.
Geier et al., "Networking Routing Techniques and their Relevance to Packet Radio Networks," ARRL/CRRL Amateur Radio 6th Computer Networking Conference, London, Ontario, Canada, Sep. 1990, pp. 105-117.
Gerla et al., "Multicluster, Mobile, Multimedia Radio Network," UCLA Computer Science Department; Baltzer Journals; Wireless Networks; Jul. 12, 1995, pp. 255-265.
Golden Power Manufacturing, "6030 PCT Programmable Communicating Thermostat," Author: unknown, 2007, pp. 1-3.
Golden Power Manufacturing, "Ritetemp Universal Wireless Thermostat," Author: unknown, 2007, pp. 1-2.
Goldman et al., "Impact of Information and Communications Technologies on Residential Customer Energy Services," Paper, Berkeley: UCLA, Oct. 1996, pp. 1-89.
Grady et al., "Telemetry Options for Small Water Systems," Special Report SR14-1999, Publisher: unknown, Sep. 1999, pp. 1-23.
Guardian Alarms, Inc., "Home Security System—Model 7068 Digital Dialer Interface," Author: unknown, available at www.guardianalarms.net, 2007, pp. 1.
Guardian Alarms, Inc., "Security Company—Home Alarm System Monitoring—AES 7067 IntelliTap-II Digital Dialer Interface," Author: unknown, available at www.guardianalarms.net, 2007, pp. 1.
Guardian Alarms, Inc., "Security System—Alarm System Monitoring—7160 EZ Router," Author: unknown, available at www.guardianalarms.net, 2007, pp. 1.
Guardian Alarms, Inc., "Security System—Alarm System Monitoring—Net 7000," Author: unknown, available at www.guardianalarms.net, 2007, pp. 1.
Guardian Alarms, Inc., "Security System—Alarm System Monitoring—Radionics FDX," Author: unknown, available at www.guardianalarms.net, 2007, pp. 1.

U.S. Appl. No. 12/477,329 Non-Final Office Action dated Aug. 19, 2010.
U.S. Appl. No. 12/477,329 Non-Final Office Action dated Dec. 28, 2009.
U.S. Appl. No. 12/356,358 Final Office Action dated Sep. 15, 2010.
U.S. Appl. No. 12/356,358 Non-Final Office Action dated Jan. 21, 2010.
U.S. Appl. No. 10/792,608 Non-Final Office Action dated Jan. 22, 2010.
U.S. Appl. No. 10/792,608 Final Office Action dated Sep. 2, 2009.
U.S. Appl. No. 10/792,608 Non-Final Office Action dated Feb. 3, 2009.
U.S. Appl. No. 10/792,608 Final Office Action dated Aug. 19, 2008.
U.S. Appl. No. 12/792,608 Restriction Requirement dated Dec. 21, 2007.
U.S. Appl. No. 10/792,608 Non-Final Office Action dated Mar. 21, 2007.
U.S. Appl. No. 12/816,266 Non-Final Office Action dated Oct. 12, 2010.
U.S. Appl. No. 11/814,632 Final Office Action dated Dec. 7, 2010.
U.S. Appl. No. 11/814,632 Non-Final Ofice Action dated Jul. 13, 2010.
U.S. Appl. No. 11/125,009 Non-Final Office Action dated Dec. 9, 2010.
U.S. Appl. No. 11/125,009 Non-Final Office Action dated Mar. 1, 2010.
U.S. Appl. No. 11/125,009 Non-Final Office Action dated Apr. 6, 2009.
U.S. Appl. No. 11/125,009 Non-Final Office Action dated Oct. 1, 2008.
U.S. Appl. No. 11/125,009 Notice of Allowance dated Sep. 21, 2009.
U.S. Appl. No. 12/169,536 Non-Final Office Action dated Oct. 20, 2010.
U.S. Appl. No. 12/689,220 Non-Final Office Action dated Dec. 15, 2010.
U.S. Appl. No. 11/300,902 Non-Final Office Action dated Aug. 6, 2010.
U.S. Appl. No. 11/300,902 Non-Final Office Action dated Nov. 17, 2009.
U.S. Appl. No. 11/300,902 Non-Final Office Action dated Oct. 7, 2008.
U.S. Appl. No. 11/300,902 Final Office Action dated Jun. 4, 2008.
U.S. Appl. No. 11/300,902 Non-Final Office Action dated Oct. 11, 2007.
U.S. Appl. No. 11/300,902 Advisory Action dated Aug. 11, 2008.
U.S. Appl. No. 12/482,892 Non-Final Office Action dated Dec. 13, 2010.
U.S. Appl. No. 11/814,632 Non-Final Office Action dated Oct. 7, 2015.
U.S. Appl. No. 11/814,632 Non-Final Office Action dated May 14, 2015.
U.S. Appl. No. 11/814,632 Non-Final Office Action dated Jul. 8, 2014.
U.S. Appl. No. 11/814,632 Non-Final Office Action dated Jan. 22, 2014.
U.S. Appl. No. 11/814,632 Non-Final Office Action dated Jul. 13, 2010.
U.S. Appl. No. 11/814,632 Final Office Action dated Sep. 25, 2015.
U.S. Appl. No. 11/814,632 Final Office Action dated Dec. 22, 2014.
U.S. Appl. No. 11/814,632 Final Office Action dated Jun. 30, 2014.
U.S. Appl. No. 90/008,011 Request for Ex Parte Reexamination of U.S. Pat. No. 6,044,062.
U.S. Appl. No. 90/008,011 Grant of Reexamination Request.
U.S. Appl. No. 90/008,011 Non-Final Office Action dated Nov. 19, 2007.
U.S. Appl. No. 90/008,011 Final Office Action dated Aug. 13, 2008.
U.S. Appl. No. 90/010,301 Request for Ex Parte Reexamination of U.S. Pat. No. 6,891,838.
U.S. Appl. No. 90/010,315 Request for Ex Parte Reexamination of U.S. Pat. No. 7,103,511.
U.S. Appl. No. 90/010,315 Petition to Review Denial of Request for Reexamination.

(56) References Cited

OTHER PUBLICATIONS

U.S. Appl. No. 90/010,507 Request for Ex Parte Reexamination of U.S. Pat. No. 7,103,511.
U.S. Appl. No. 90/010,509 Request for Ex Parte Reexamination of U.S. Pat. No. 7,103,511.
U.S. Appl. No. 90/010,510 Request for Ex Parte Reexamination of U.S. Pat. No. 6,891,838.
U.S. Appl. No. 90/010,505 Substitute Request for Ex Parte Reexamination of U.S. Pat. No. 7,103,511.
U.S. Appl. No. 90/010,507 Substitute Request for Ex Parte Reexamination of U.S. Pat. No. 7,103,511.
U.S. Appl. No. 90/010,508 Substitute Request for Ex Parte Reexamination of U.S. Pat. No. 7,103,511.
U.S. Appl. No. 90/010,509 Substitute Request for Ex Parte Reexamination of U.S. Pat. No. 7,103,511.
U.S. Appl. No. 90/010,510 Substitute Request for Ex Parte Reexamination of U.S. Pat. No. 6,891,838.
U.S. Appl. No. 90/010,511 Substitute Request for Ex Parte Reexamination of U.S. Pat. No. 6,891,838.
U.S. Appl. No. 90/010,512 Substitute Request for Ex Parte Reexamination of U.S. Pat. No. 6,891,838.
U.S. Appl. No. 90/010,301 Non-Final Office Action dated Dec. 2, 2009.
U.S. Appl. No. 90/010,315 Denial of Petition to Review Denial of Request for Reexamination.
U.S. Appl. No. 90/010,505 Non-Final Office Action dated Mar. 3, 2010.
U.S. Appl. No. 90/010,507 Non-Final Office Action dated Mar. 3, 2010.
U.S. Appl. No. 90/010,508 Non-Final Office Action dated Mar. 3, 2010.
U.S. Appl. No. 90/010,509 Non-Final Office Action dated Mar. 3, 2010.
U.S. Appl. No. 90/008,011 Examiner Answer to Appeal Brief.
U.S. Appl. No. 90/010,505 Final Office Action dated Aug. 2, 2010.
U.S. Appl. No. 90/010,507 Final Office Action dated Aug. 2, 2010.
U.S. Appl. No. 90/010,508 Final Office Action dated Aug. 2, 2010.
U.S. Appl. No. 90/010,509 Final Office Action dated Aug. 2, 2010.
U.S. Appl. No. 90/010,510 Final Office Action dated Aug. 20, 2010.
U.S. Appl. No. 90/010,511 Final Office Action dated Aug. 20, 2010.
U.S. Appl. No. 90/010,512 Final Office Action dated Aug. 20, 2010.
U.S. Appl. No. 90/010,301 Final Office Action dated Nov. 5, 2010.
U.S. Appl. No. 90/010,510 Final Office Action dated Nov. 5, 2010.
U.S. Appl. No. 90/010,511 Final Office Action dated Nov. 5, 2010.
U.S. Appl. No. 90/010,512 Final Office Action dated Nov. 5, 2010.
U.S. Appl. No. 90/008,011 BPAI Decision.
U.S. Appl. No. 90/010,510 Non-Final Office Action dated Dec. 2, 2009.
U.S. Appl. No. 90/010,511 Non-Final Office Action dated Dec. 2, 2009.
U.S. Appl. No. 90/010,512 Non-Final Office Action dated Dec. 2, 2009.
U.S. Appl. No. 90/010,301 Notice of Intent to Issue Reexam Certificate dated Dec. 13, 2010.
Brownrigg, E.B. et al.; A Packet Radio Network for Library Automation; IEEE (1987); pp. 456-462.
Brownrigg, E.B. et al.; A Packet Radio Networks; Architectures, Protocols, Technologies and Applications (1987), (introduction pp. ix-xviii); pp. 3-274.
Brownrigg, E.B. et al.; Distributions, Networks, and Networking: Options for Dissemination; Workshop on Electronic Texts Session III (http://palimpsest.standford.edu/byorg/lc/etextw/sess3.html 1992): pp. 1-10.
Brownrigg, E.B. et al., User Provided Access to the Internet; (http://web.simmons.edu/18 chen/nit/NIT'92/033-bro.htm 2005) pp. 1-6.
Wey, Jyhi-Kong et al.; Clone Terminator: An Authentication Service for Advanced Mobile Phone System; IEEE (1995); pp. 175-179.
Davis, A.B. et al.; Knowledge-Based Management of Cellular Clone Fraud; IEEE (1992); pp. 230-234.
Johnson, David B.; Routing in Ad Hoc Networks of Mobile Hosts; IEEE (1995); pp. 158-163.
Jubin, John and Tornow, Janet D., "The Darpa Packet Radio Network Protocols, "Proceedings of the IEEE, vol. 75, No. 1, Jan. 1987, pp. 21-32.
Kleinrock, Leonard and Kamoun, Farouk, "Hierarchical Routing for Large Networks," North-Holland Publishing Company, Computer Networks 1, 1977, pp. 155-174.
Perkins, C.E. et al.; Highly Dynamic Destination-Sequenced Distance-Vector Routing (DSDV) for Mobile Computers; SIGCOMM 94-9/94 London England UK (1994); pp. 234-244.
Wu, J.; Distributed System Design; CRC Press (1999); pp. 177-180 and 204.
Khan, Robert E., Gronemeyer, Steven A. Burchfiel, Jerry, and Kunzelman, Ronald C., "Advances in Packet Radio Technology" IEEE Nov. 1978, vol. 66, No. 11, pp. 1468-149.
Wescott, Jill A. and J. Albin, "A Distributed Routing Design for a Broadcast Environment," IEEE Oct. 1982, vol. 3, pp. 10.4.0 to 10.4.5.
Frankel, Michael S., "Packet Radios Provide Link for Distributed, Survivable C3 in Post-Attack Scenarios", MSN Jun. 1983.
Lauer, Greg et al., "Survivable Protocols for Large Scale Packet Radio Networks", IEEE 1984, pp. 15.1-1 to 15.1-4.
Gower, Neil et al., "Congestion Control Using Pacing in a Packet Radio Network", IEEE 1982, pp. 23.1-1 to 23.1-6.
MacGregor, William et al., "Multiple Control Stations in Packet Radio Networks", IEEE1982, pp. 10.3-1 to 10.3-5.
Shacham, Nachum et al., "Future Directions in Packet Radio Technology", IEEE 1985, pp. 93-98.
Jubin, John, "Current Packet Radio Network Protocols" IEEE 1985, pp. 86-92.
Westcott, Jill A., "Issues in Distributed Routing for Mobile Packet Radio Network", IEEE 1982, pp. 233-238.
Lynch, Clifford A. et al., Packet Radio Networks, "Architectures, Protocols, Technologies and Applications".
Khan, Robert E., "The Organization of Computer Resources into a Packet Radio Network", IEEE Jan. 1977, vol. Com-25 No. 1, pp. 169-178.
Khan, Robert E., "The Organization of Computer Resources into a Packet Radio Network," IEEE Transactions on Communications, Jan. 1977, vol. Com-25 No. 1, pp. 169-178.
Westcott, Jill A., "Issues in Distributed Routing for Mobile Packet Radio Network," IEEE 1982, pp. 233-238.
International Search Report and Written Opinion for International Application No. PCT/US2006/002342, Search Authority European Patent Office, dated May 31, 2006.
International Search Report and Written Opinion for International Application No. PCT/US2006/002342, Search Authority Korean Intellectual Property Office, dated Nov. 13, 2006.

\* cited by examiner

WIRELESS NETWORK PROTOCOL SYSTEMS AND METHODS

CROSS-REFERENCE TO RELATED APPLICATION

This application is a continuation of U.S. patent application Ser. No. 11/814,632 filed on 24 Jul. 2007, which is the United States National Stage of International Patent Application No. PCT/US2006/002342 filed on 25 Jan. 2006, which claims the benefit of U.S. Provisional Patent Application No. 60/646,689 filed on 25 Jan. 2005, the contents of which are hereby incorporated by reference in their entirety.

TECHNICAL FIELD

The present invention relates generally to communication networks, and more specifically, to a protocol for wireless communications, wireless communication systems, and wireless communication methods.

BACKGROUND

In recent years, wireless communications systems have become increasingly popular. Today, wireless systems are used for many applications, from wireless device monitoring to wireless internet access, and in both home and business environments.

In many homes built prior to the Internet revolution, electronic wiring is generally not suitable for high-speed Internet connectivity requirements. Consequently, new solutions have been developed allowing users to establish a wireless network inside a home or place of business so that one or more devices like computers, PDAs and other electronic devices may wirelessly communicate with a centrally positioned device that is coupled to the Internet via a DSL, cable modem, or other high-speed connection.

While the initial bandwidth of devices implementing such wireless technologies was fairly small, subsequent generation devices have substantially increased wireless throughput. Indeed, users can wirelessly connect to the Internet and still experience the same benefits as if wired via a broadband connection.

Yet even with the advent of wireless networks for home and business applications, the wireless Internet connection is still limited by the range of wireless connection between the user's device, such as a laptop or PDA, and the base station or access point. Even wireless applications according to IEEE standard 802.11 only provide for a few hundred feet of wireless connectivity. Thus, even though an Internet user may be disconnected by wires from the Internet, the range of motion still corresponds to the communicable range of the wireless modem access point.

Moreover, while homes and businesses may establish various Internet access points, or hotspots, the hotspots essentially create a hodge-podge of Internet access locations confining a user's range of movement. As a non-limiting example, a user may go to a retail coffee house and wirelessly connect to the Internet through an access point provided by the coffee house retailer. Once the user leaves the coffee house and travels beyond the communicable range of the access point, however, the user no longer has Internet access for the wireless device.

This limitation arises in part because last leg access has historically only been available by wired connections. As technology continues to progress and new applications for such technology are developed, however, users will have greater requirements for wireless connectivity to the Internet beyond the prescribed range as discussed above.

As such options expand, there is an increasing need for various wireless systems to effectively communicate with one another. Additionally, the expansion of wireless networking creates an opportunity for a variety of devices to take advantage of wireless communications that previously could not communicate with other devices.

To take advantage of such opportunities, a reliable communications protocol is needed in the art. Further, there is a need in the art for systems and methods for wirelessly communicating data between wireless devices utilizing reliable communications. It is to the provision of such wireless methods, systems, and protocols that the embodiments of present invention are primarily directed.

BRIEF SUMMARY

The various embodiments of the present invention provide wireless communication systems and methods. Some embodiments also provide a wireless communication protocol for use with radio frequency networks where one or more remote devices can wireless communicate with a site controller and/or other remote devices.

According to an embodiment of the present invention, a wireless communication network having a site controller wirelessly coupled to a plurality of wireless remote devices is provided. A wireless communication system can comprise a first remote device wirelessly coupled to the site controller. The first remote device can be adapted to determine a communication path between the first remote device and the site controller. The communication path can be adapted to wirelessly couple the first remote device directly to the site controller, the first remote device to a second remote device, or the second remote device to the site controller.

The remote devices, such as the first remote device, according to some embodiments can also have additional features. For example, the first remote device can be further adapted to maintain a connection list identifying one or more of said plurality of remote devices and a success data score representative of successful and unsuccessful transmissions to remote devices. In addition, the first remote device can determine a communication path by selecting a second remote device from the connection list based at least partially on the success data score. Still yet, the first remote device can select the second remote device because the second remote device is associated with a favorable transmission successes score. The first remote device can also be adapted to select a second communication path when a transmission to the second remote device is unsuccessful.

Another feature according to some embodiments of the present invention includes that at least one of the first remote device and the second remote device can select a third remote device from the connection list. The selection can be based at least partially on an associated success data score maintained by the at least one of the first remote device and the second remote device.

According to another embodiment of the present invention, a method for communicating in a network is provided. The method can comprise selecting a wireless communication path between a first remote device and a site controller, and using a first remote device logic to select the wireless communication path. The wireless network can have a site controller and a plurality of remote devices. The plurality of remote devices each preferably having remote device logic, such as firmware or other stored instructions. The remote devices also preferably have a processor, a memory, and a transceiver.

The various embodiments of the present invention can also include additional method embodiments. For example, a method can comprise selecting a wireless communication path from a first remote device to a site controller wirelessly couples the first remote device directly to the site controller. In addition, selecting a wireless communication path from a first remote device to a site controller using a first remote device logic can comprise selecting a communication path from the first remote device to a second remote device, and selecting a communication path from the second remote device to a site controller. Another method embodiment can also include maintaining a connection list identifying one or more remote devices and a success data score representative of successful and unsuccessful transmissions to remote devices.

Methods according to the various embodiments of the present invention can also include additional features. For example, selecting a wireless communication path from a first remote device to a site controller using a first remote device logic can comprise selecting a second remote device from a connection list. In addition, a second remote device can be selected because it is associated with a favorable transmission success record. Another method embodiment further comprises determining that a transmission to the second remote device was unsuccessful, and selecting a third remote device from the connection list. Still yet another method embodiment comprises selecting a communication path from the third remote device to the site controller and/or selecting a communication path from the second remote device to the site controller.

According to another embodiment of the present invention, a computer program is provided. The computer program can determine a communication path between a plurality of remote devices and a site controller. The communication path can consist of none, one, or multiple remote devices. Each of the plurality of remote devices can be adapted to store and run the computer program. The computer program can comprise a first logic (instruction set) to select a wireless communication path from a first remote device of the plurality of remote devices to the site controller. The computer program can also comprise a second logic (instruction set). The second logic can be adapted to select a second remote device of the plurality of remote devices as part of the communication path from the first remote device to the site controller.

BRIEF DESCRIPTION OF THE DRAWINGS

The accompanying drawings incorporated in and forming a part of the specification, illustrate several aspects of the present invention, and together with the description explain the principles of the various embodiments of invention. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF PREFERRED EMBODIMENTS

A system for providing wireless access to a variety of devices is disclosed in accordance with some embodiments of the present invention. The system can comprise a gateway that is wirelessly coupled to a wide area network ("WAN") so that the gateway provides first and last leg access to the WAN. As used herein, coupled can mean directly or indirectly coupled. The gateway translates information for transmission over the WAN into a predetermined WAN protocol and also translates information received from the wide area network into a predetermined wireless communication protocol. A user can wirelessly couple a portable device with a transceiver to the gateway according to the predetermined wireless communication protocol for maintaining wireless connection with the wide area network. Additionally, the system can be adapted to maintain communications between the wireless device and the wide area network while the wireless device is mobile.

Figure 1:
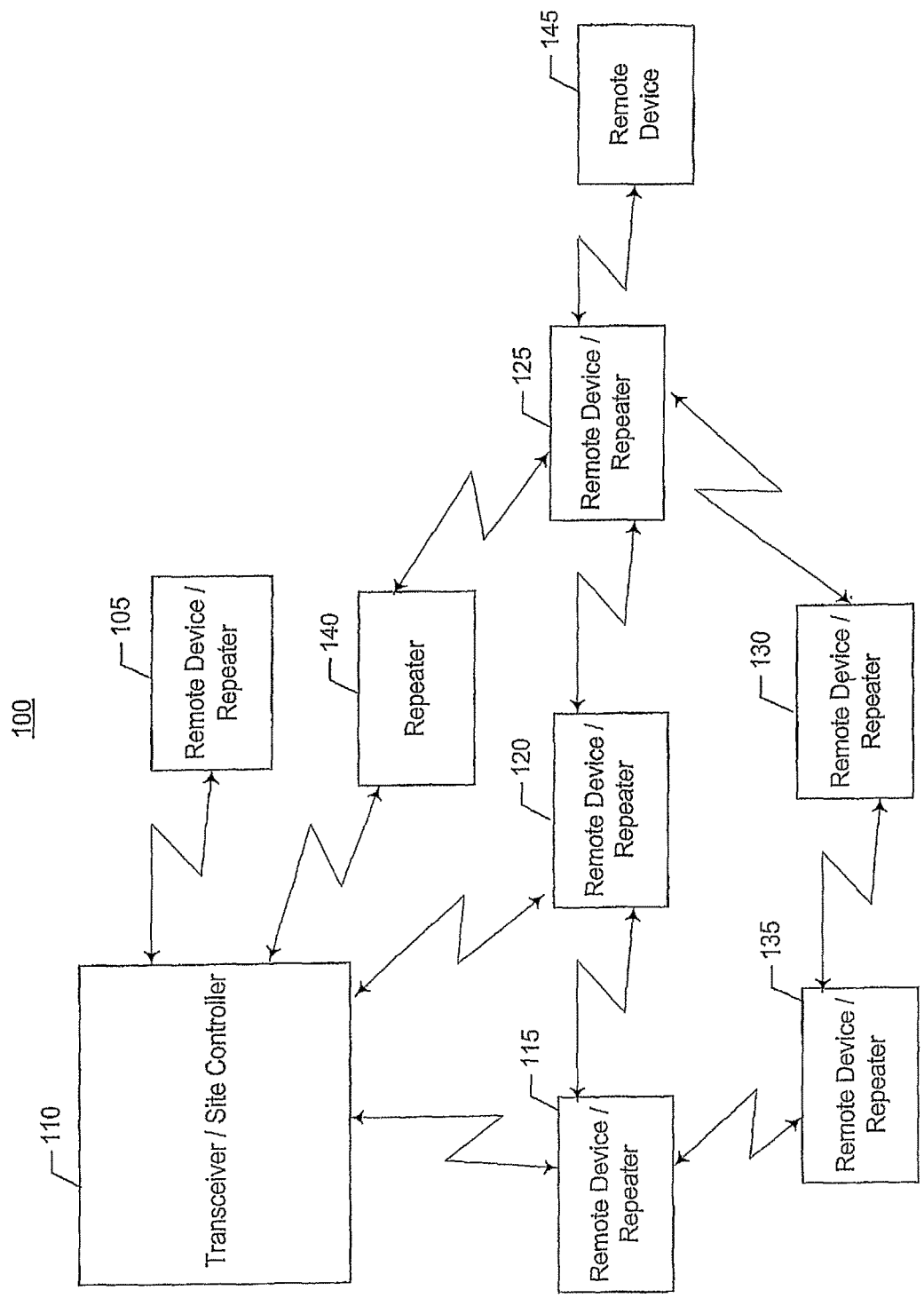
FIG. 1 is a diagram of a wireless network according to an exemplary embodiment of the present invention.

FIG. 1 is a block diagram of a system according to an exemplary embodiment of the present invention. As illustrated in FIG. 1 a Transceiver/Site Controller 110 can communicate wirelessly with one or more remote devices 105, 115, 120, 125, 130, 135, 140, 145. Throughout this description, the various remote devices/repeaters 105, 115, 120, 125, 130, 135 may be referred to generically as remote device 115 or repeater 115. Each remote device 115 can include a transceiver adapted to communicate with the site controller 110. Additionally, one or more of the remote devices 115 can also be adapted to communicate with other remote devices 115. The multiple remote devices 115 are shown to illustrate that each remote device can be adapted to communicate directly with the site controller 110 and/or with other remote devices 115. Generally, if a remote device 115 is located remotely such that it is out of range of the site controller 110, it 115 will communicate through other remote devices 115 acting as repeaters 115.

Each remote device 115 can operate as both a remote device and as a repeater. When operating as a repeater, the device 115 receives and retransmits messages received from other remote devices 115. Each remote device 115 contains a logic unit for processing data, logic instructions, and implementing a communication protocol, and a memory for storing data and logic instructions. Accordingly, each remote device 115 can independently route messages without receiving instructions directly from a site controller 110. Such an arrangement promotes more efficient communications. In addition, each remote device 115 can monitor the success or failure of transmissions and determine a communication path for messages. For example, each remote device 115 can monitor one or more communication paths and assign a communication path a transmission rate (or score) representative of successful and unsuccessful transmissions. And based on the transmission rate (or score), a remote device 115 can determine an optimum communication path for data transmission.

Additionally, a remote device 115 can be adapted to only operate as a repeater or can be adapted such that is does not act as a repeater and is a non-repeating remote device.

Further repeaters and remote devices can be used that only repeat or do not repeat transmissions.

In an exemplary embodiment of the present invention, a wireless communication protocol is used, via a radio link (radio frequency (RF) transmissions) for example, between a transceiver/site controller 110 and various remote devices 115 which are designed to operate within a wireless network 100. Each remote device 115 preferably includes logic for implementing a communications protocol and for selecting a communications path from the remote device 115 to the site controller 110 or to another remote device 115. An exemplary communications protocol will be described, but those skilled in the art will recognize that alternative protocols, or variations of the disclosed protocol may be utilized consistent with the disclosures of the present invention.

In an exemplary embodiment of the present invention, a remote device 115 is adapted to store transmission data associated with the success or failure of transmissions sent to other remote devices 115. This transmission data can be used to select a communications path between a remote device 115 and the site controller 110. Typically, a remote device 115 selects a path with a high transmission success rate. Generally, a high transmission success rate is not based on a predetermine rate, and can be selected by comparison with one or more success rates for alternative paths.

An exemplary protocol, in accordance with some embodiments of the present invention, can be used in a variety of environments, including, but not limited to, equipment utilized at sites where automatic data gathering/reporting and safety system features may be incorporated.

In an exemplary embodiment of the present invention, the protocol includes, but is not limited to, a basic message structure, including preface and postscript, message content, error checking, addressing scheme, and message routing for devices operating within the network. Additionally, in some embodiments, the protocol can handle both "normal" and "emergency" traffic flow throughout the network. For example, emergency transmissions may receive a higher priority than normal transmissions.

An exemplary embodiment of the protocol provides an open-ended architecture protocol, with a non-standard Manchester bit encoding, which employs on/off keyed ("OOK") modulation in the single-channel implementation. In another exemplary embodiment, each remote device 115 in the system can be an intelligent NODE, which constructs a response to a particular command with "real time" data affecting that particular device at the time of the request. In yet another exemplary embodiment of the present invention, a communication protocol is based on a seven layer network model. The protocol can include, but is not limited to, a physical layer, a data link layer, a network layer, a transport layer, a session layer, a presentation layer, and an application layer. The various layers of the communication protocol are discussed in turn below.

Layer 1—Physical Layer

The Physical Layer defines the RF communications hardware interface (radio) and electrical characteristics. This includes the RF carrier, modulation method, data bit encoding and packet framing.

Carrier Frequency

In an exemplary embodiment of the present invention, the RF carrier used for single-channel operation has a nominal center frequency of 916.5 Mhz (+/−200 Khz).

Modulation Scheme

In an exemplary embodiment of the present invention, the protocol, in single-channel mode, employs on/off keyed ("OOK") modulation which is a special case of amplitude shift keyed ("ASK") modulation, where no carrier is present during the transmission of a zero. OOK modulation has the advantage of allowing the transmitter to be idle during the transmission of a "zero", therefore conserving power.

Figure 2:
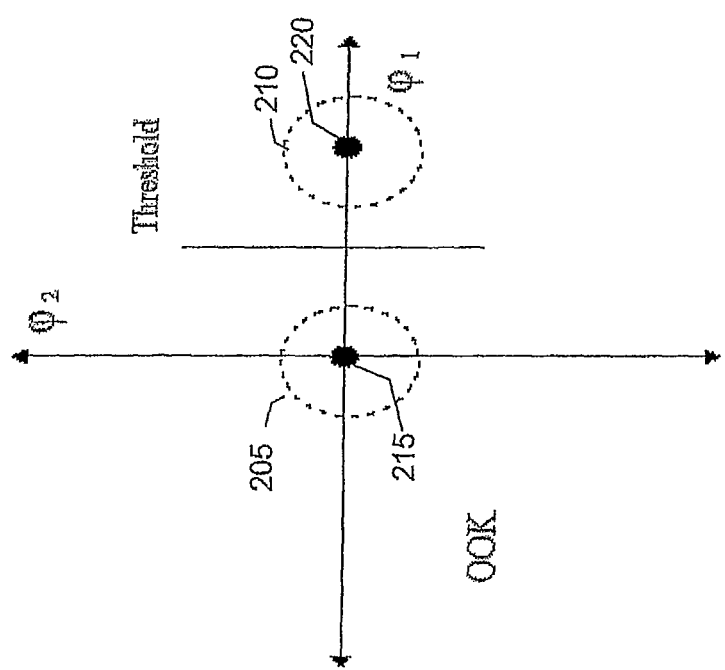
FIG. 2 is an ortho-normal plot of OOK modulation in accordance with an exemplary embodiment of the present invention.

FIG. 2 is a ortho-normal plot of OOK modulation in accordance with an exemplary embodiment of the present invention. The ortho-normal plot may also be referred to as a signal diagram. FIG. 2 illustrates the additive noise 205, 215, around two signals 210, 220.

Data Bit Encoding

In an exemplary embodiment of the present invention, the protocol uses a modified Manchester encoding as the method of transmitting data bits. Preferably, the system operates at a basic data rate of 2400 bits/second (4800 transitions/second), which enables the receiver to easily synchronise with the sender. Additionally, the bits of each byte of the message are transmitted least significant bit first, most significant bit last.

Manchester encoding splits each bit period into two, and ensures that there is always a transition between the signal levels in the middle of each bit. This allows the receiver to synchronize with the sender. Those skilled in the art will appreciate that various alternative encoding schemes and transmission speeds may be used in place of the disclosed Manchester encoding scheme.

Figure 3:
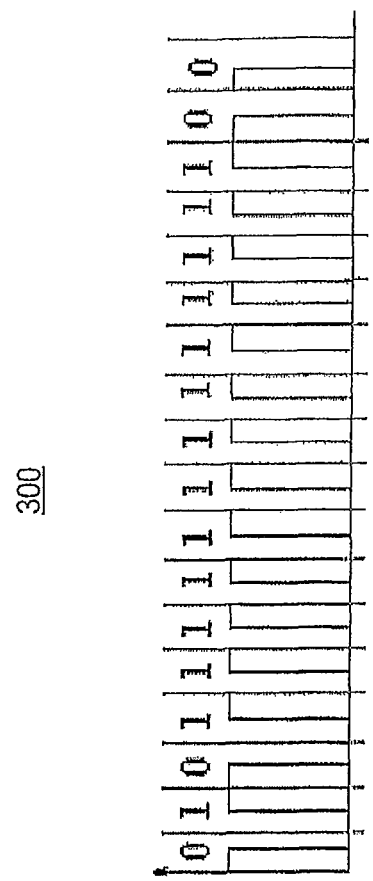
FIG. 3 is a diagram of a plurality of wireless networks for providing uninterrupted mobile access to a WAN in accordance with an embodiment of the present invention.

FIG. 3 is an illustration of a typical transmission sequence in accordance with an exemplary embodiment of the present invention. As shown in FIG. 3, a data transition occurs in the middle of each clock cycle. In Manchester Encoding, clock and data signals are encoded in a single synchronous bit stream. In this stream, each bit is represented by a transition. If the bit is a '0', the transition is from high to low. If the bit is a '1', the transition is from low to high. Thus, in a typical data stream, there will always be a transition at the center of a bit, while at the beginning of a bit there will only be a transition depending on the value of the previous bit. The encoding may be alternatively viewed as a phase encoding where each bit is encoded by a positive 90 degree phase transition, or a negative 90 degree phase transition. Manchester coding is therefore sometimes known as a bi-phase coding.

A Manchester encoded signal contains frequent level transitions, which allow the receiver to extract the clock signal reliably. The penalty for introducing frequent transitions, is that the Manchester coded signal consumes more bandwidth than the original signal (sequence of logic ones and zeros, or NRZ), but it still compares well with the bandwidth requirements of other encoding systems, such as pulse width modulation ("PWM").

Packet Preamble and Postscript

In an exemplary embodiment of the present invention, a message preamble (preface) and postscript (trailer) is used to obtain bit and byte synchronization and to frame the message. Accordingly, a device 115 transmitting a message begins the message with a preamble and follows the message with a postscript.

Figure 4:
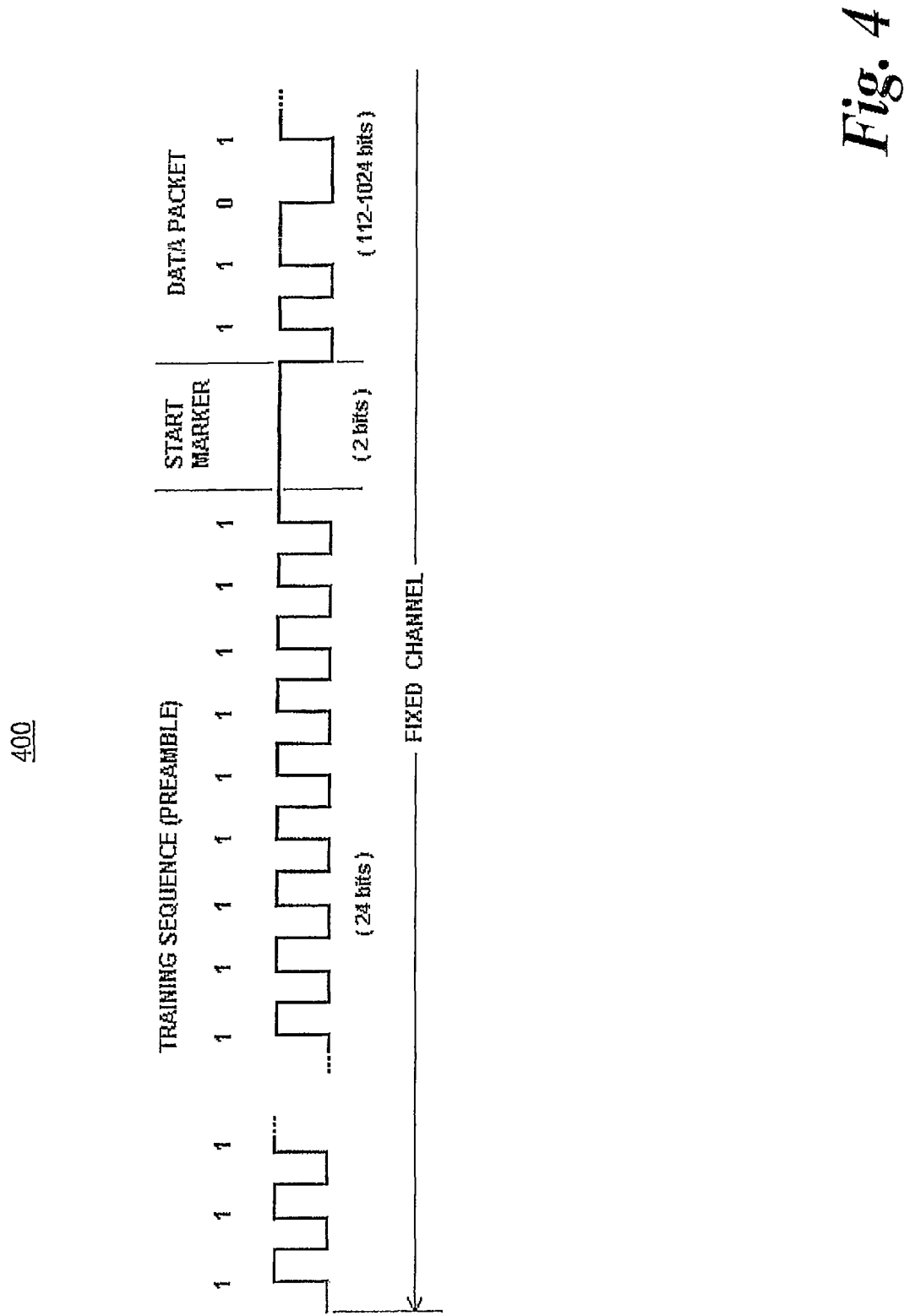
FIG. 4 is a timing diagram of a preface for use in a message in an exemplary embodiment of the present invention.

FIG. 4 is a timing diagram of a preface for use in a message in an exemplary embodiment of the present invention. For single-channel operation, the preface can preferably be 24 logic ones followed by two bit times of a high voltage with no transition, with the first byte of the message following immediately. Alternatively, other prefaces can be used in accordance with the present invention.

The postscript can be the transition, if necessary, of the wireless device's transmit data line from a high voltage to a low voltage. Additionally, the transmit data line is preferably not left high after a message has been sent.

A receiving device 115 preferably decodes, at a minimum, the last four logic ones and the transitionless marker of the preface. If a receiver 115 is not able to decode bits of a preface, the message can be ignored.

Layer 2—Data Link Layer

In an exemplary embodiment of the present invention, the Data Link Layer defines how physical media is accessed by network devices 115, as well as verification of successful message delivery. This includes collision avoidance, error detection, message acknowledgement, and message retries.

Packet Collision Avoidance

In an exemplary embodiment of the present invention, it is desirable to avoid having multiple packets transmitted on a channel simultaneously. Accordingly, before attempting to transmit a message, a device 105 preferably first listens for any conflicting RF traffic on a transmission channel it intends to use. If traffic is detected on this channel, the device 115 preferably waits a random period of time (preferably up to 1 second) and then check the channel again for traffic. The device 105 can continue to monitor the transmission channel in this manner until no conflicting traffic is detected, at which time it can begin transmitting its message.

In the event that two or more devices 115 attempt to transmit on the same channel at the same time (collision), receiving devices 115 can recognize that the packet has been corrupted and ignore the message. This will result in a "negative acknowledge" condition, which will force the transmitting device 115 to resend the original message.

Error Detection

Devices 115 implementing the protocol can use a standard cyclic redundancy check, such as a CRC-16 calculation, to determine whether any errors are present in a received transmission. Those skilled in the art will be familiar with various error detection schemes and can use alternative schemes if desired.

Preferably, all the message bytes beginning with the "TO" Address and ending with the last data byte (or CMD Byte if no data is present) are included in the checksum. The Preface and Postscript (if any) are not generally included in the checksum. The transmitting device 105 can append the calculated checksum (16-bits for CRC-16) onto the end of the message. If a received packet or message fails a checksum test, it can be ignored by the receiving device, resulting in a "negative acknowledge" condition.

Message Acknowledgement

Upon receipt of a message, a receiving device 115 can acknowledge the message as received correctly (Positive) or not received correctly (Negative).

Positive Acknowledgement

A positive acknowledgement to any message shall be obtained in two manners according to some embodiments of the present invention: tacitly (implied) or actually. A tacit, or implied, positive acknowledgement for an RF transmitted message can be obtained whenever the retransmission (or repeat) of a message, by a next device, Remote Device/Repeater 120 in the communication chain, is detected by a transmitting (sending) device (remote device 125). This type of acknowledgement occurs during either a downstream operation (from the Transceiver/Site Controller 110 or a repeater 120, to a repeater 115) or during an up-stream operation (from a remote device 125 or repeater 120, to a repeater 115).

A transmitting device (110 or 125) preferably listens for a message to be repeated (retransmitted) by a next device 120 in the downstream or upstream path. The repeat transmission preferably occurs within a predetermined period. This predetermined period is generally a fixed time-out period established for a transmitting (sending) unit 110, 125. The transmitting remote device 125 can, upon hearing the repeat transmission, verify that the message number (Msg Num) of the message being repeated is identical to the message number (Msg Num) of the original message. A transmitting device 125 can also verify that the "FM" (From) address is the address to whom the message was transmitted. If the message numbers are the identical and the "From" address correct, a positive acknowledgement shall be implied.

Actual Acknowledgement

An actual positive acknowledgement is obtained whenever a response message is received, by either the Transceiver/Site Controller 110 or a repeater 120, from a remote device 125 (or repeater). This type of acknowledgement generally occurs during downstream repeat message processing (from the Transceiver/Site Controller 110 or repeater 120 to a remote device 125). The response message, an upstream repeat message, can contain the requested data (or status) supplied in response to the command contained in the original downstream repeat message.

Additionally, when the Transceiver/Site Controller 110 or repeating device 120 receives a message directly from a repeater 120 or a device 125, it can transmit an "0x01" (Positive Acknowledge) command message. This command message can be used to acknowledge receipt of the message.

Negative Acknowledgement

A negative acknowledgement can occur whenever a "Downstream Repeat" or an "Upstream Repeat" message is not positively acknowledged. During a downstream repeat operation, the Transceiver/Site Controller 110, or Repeater 120 (or device 120 that also functions as a Repeater 120), can attempt an original transmission and variable number of retries to the downstream addressed (target) device.

If the downstream repeat message is not positively acknowledged, either tacitly or actually, after all the transmission attempts, the sending repeater 115 can transmit a Negative Acknowledge message upstream to the unit (Transceiver/Site Controller 110 or Repeater 115) that sent it the downstream repeat message. In an exemplary embodiment of the present invention, the Negative Acknowledge command can be signified by transmitting "0x02" in the data field of a message. The Negative Acknowledge message preferably increments the message number (Msg Num) contained in the original downstream repeat message, and return the six-byte address of the non-acknowledging device plus the six-byte address of the previous device. A Negative Acknowledgement can then be returned, in normal Repeater manner, to the Site Controller 110, which originated the message.

In the case of an upstream repeat operation, a remote device 115 (or repeater 115) preferably attempts an original transmission and variable number of retries to its highest priority upstream address. If the message is not acknowledged, the remote device 115 (or repeater 115) can then attempt the same for its next highest priority upstream address. If the message is still not acknowledged, and there are no more valid upstream addresses, then a negative acknowledgement condition exists. For a remote device 115, a negative acknowledgement can be treated as a downstream repeat negative acknowledgement.

In the case of a repeater 115, this negative acknowledgement can result in the downstream (sending) unit 120 attempting message transmission using its next highest priority upstream address.

Message Time-Outs and Retries

In an exemplary embodiment of the present invention, it is desirable to avoid waiting for an acknowledgement message for an extended period of time. Accordingly, the disclosed protocol provides for a time-out period and a device 115 can retry a message if it does not receive an acknowledgement prior to the end of the time-out period. Preferably, a variable time-out of 1 second+250 milliseconds will result in a "negatively acknowledged" transmission attempt if the device 115 does not hear the preamble of the command message being retransmitted by the next repeater 115 in the path of either a downstream or an upstream repeat operation. Or if the device 115 is programmed to also function as a repeater 115, the device 115 can receive the preamble of a requested response message from a downstream target device 115 if no other repeaters exist in the path.

The time-out is preferably reset (begins again) and has a value of one (1) second if another unit seizes the channel before a positive acknowledgement can be received. The protocol can also be configured for a random time-out duration to be generated by a transmitting device 115. When a device does not receive a "positive acknowledgement" before the expiration of the time-out period, it can attempt retransmission (retries) of a message.

Downstream Retries

For downstream operations, a device 115 (that is programmed to also function as a repeater 115) can attempt an original transmission and a variable or predetermined number of retries to the addressed device (or repeater). If the message is not acknowledged after these attempts, the device 115 can generate a "Negative Acknowledge (0x02)" Command Message that is sent back to the site controller 110.

Upstream Retries

For Upstream Repeat operations, a device 115 can attempt an original transmission and a variable or predetermined number of retries to its highest priority upstream address (for example, remote device 120). If these transmission attempts fail, the device 115 then attempts another transmission with the specified number of retries to its next highest priority upstream address (for example, remote device 130). Transmission attempts continue in this manner until all upstream addresses have been exhausted. If a device 115 functions only as a non-repeating node, and the transmission is still not acknowledged, it can abort the current operation and reset its upstream retry counter.

If a device 115 is programmed to also function as a Repeater 115, and all its upstream addresses fail to acknowledge the message transmission, the result is treated as a "negatively acknowledged" upstream repeat operation.

Each remote device 115 preferably maintains two (2) retry counters. The remote devices 115 may also have one or additional counters. The first retry counter is preferably a four-bit counter that counts the number of retries for the current downstream operation. This counter is generally used only if a device 115 is programmed to also function as a repeater. The second retry counter is preferably a four-bit counter that counts the number of retries for the current upstream operation. Both counters can be reset after they have been reported and acknowledged.

Layer 3—Network Layer

The Network Layer defines an exemplary method for sequencing and routing messages from one network device 115 to another. An exemplary message header format includes, as discussed below, source and destination device addresses and a message sequence number. A method for upstream and downstream message routing is also discussed below.

Message Header Formatting

Table 1, below, shows an exemplary message structure for use with a protocol embodiment of the present invention.

TABLE 1

| Packet Format | | | | | | | | | | |
|---|---|---|---|---|---|---|---|---|---|---|
| "TO" Addr | "FM" Addr | Pkt Num | Pkt Max | Pkt Len | Msg Num | CMD | Link Num | Cmd Ext | Data | CkSum |
| (1-6) | (6) | (1) | (1) | (1) | (1) | (1) | (1) | (1) | (0-239) | (2) |

In an exemplary embodiment of the present invention, the order of the message elements remains fixed, but the byte position number in each packet may vary due to the scalability of the "TO" address (1-6 bytes) and the scalability of the Data Frame (0 to 239 bytes). A brief description of each of the message fields follows. Those skilled in the art will appreciate that the size of each field can be modified if desired, provided each device communicating in accordance with the protocol is aware of such modifications.

"TO" Addr—Destination Address

The "TO" Address field (00-FF) is used to identify a particular device 115 and typically provides the Full "ID" or address of a device 115 receiving the transmission (1 to 6 Bytes). The "TO" address field can contain the address of a recipient device 115 when a request for data is sent by the site controller 110. The "TO" field can contain the address of the site controller 110 when a response to a request for data is returned by a device 115 to the site controller 110. This can also be a broadcast address when a message is sent to multiple devices 115 by another network device 115.

"FM" Addr—Source Address

The "FM" Address (00-FF) is used to identify a device 115 transmitting a message. The "FM" Address field can contain the full "ID" or address of a device 115 originating the transmission (6 Bytes). This address field can contain the address of the site controller 110 when a request for data is sent to a device 115 and it can contain the address of a remote device 115 when a response to a request for data is sent to the site controller 110.

Pkt No—Packet Number

The Packet Number (00-FF) is used when a message is too large to be sent in a single packet. Thus, if the total message is longer than the max packet length, multiple packets are used and each packet in the message is labeled with a packet number.

Pkt Max—Packet Maximum

The Pkt Max field (00-FF) indicates the total number of packets in a message when a message is too large to fit in a single packet.

Pkt Len—Packet Length

The Packet Length field (10-FF) identifies the length (in bytes) of a packet transmission, including the CRC. In an exemplary embodiment of the present invention, the minimum length is 16 bytes, and the maximum length is 255 bytes.

Msg Num—Message Number

The Message Number field (00-FF) provides a message identifier number. The Message Number is assigned by the originator of each message. In an exemplary embodiment of the present invention, messages originating from the site controller 110 (downstream) contain even message numbers and responses to the site controller 110 (upstream) will be the originating message number plus one (odd). Typically, the message number is incremented (by two) by the site controller 110 each time it sends a message.

CMD—Command

The Command field (00-FF) identifies a command operation to be performed by the recipient device 115.

Link Num—Link Number

The Link Number field (00-FF) represents a dynamic link number associated with each network device 115 when a packet is transmitted.

Cmd Ext—Command Extension

The Command Extension field (00-FF) preserves message space for additional commands, that are not presently provided by the system.

Data

The Data field (00-FF) holds data as required by a specific command. Data may be any value. If test data is sent, that data can generally be encoded in ASCII.

CkSum—Checksum

The CkSum field (0000-FFFF) holds a Packet Checksum, preferably sent high (most significant) byte first, for detecting transmission errors.

TO and FROM Device Addressing

In an exemplary embodiment of the present invention, each device 115 is programmed with a unique identifier (address). In an exemplary embodiment of the present invention, this is a 48-bit identifier number. This identifier is used in routing network messages from the source device 115 to the destination device 115. A network device 115 can recognize that it is the intended recipient of a received message by comparing its identifier (address) to the destination address in the message header.

Broadcast messaging can also be supported by supplying special broadcast address identifiers in place of the unique 48-bit destination address when transmitting a message. The broadcast identifier may typically be 1 or 6 bytes in length. Broadcast messages do not generally require a response from the receiving device(s) 115.

Device Address Byte Assignment

Table 2, below, shows how address bytes can be assigned in accordance with an exemplary embodiment of the present invention. In an exemplary embodiment of the present invention, the first byte of an address may not be 0xFn or 0x00.

TABLE 2

| | | Byte 1 - Device Type Base - (MSB) |
|---|---|---|
| (2) | F0-F1 | Broadcast to all devices (1-byte broadcast address) |
| (2) | F2-F3 | Broadcast to specific devices (6-byte broadcast address) |
| (11) | F4-FE | Reserved |

TABLE 2-continued

| (1) | FF | Broadcast to a single device (6-byte broadcast address) |
|---|---|---|
| (239) | 01-EF | 6 Byte Device Address (Device Type Base) |
| (1) | 00 | Reserved |
| | | Byte 2 - Network System ID (High Byte) |
| (1) | FF | Reserved |
| (255) | 00-FE | Network System Identifier |
| | | Byte 3 - Network System ID (Low Byte) |
| (256) | 00-FF | Network System Identifier |
| | | Byte 4 - Extension |
| (256) | 00-FF | Extension of Device Identification |
| | | Byte 5 - Extension |
| (256) | 00-FF | Extension of Device Identification |
| | | Byte 6 - Extension |
| (256) | 00-FF | Extension of Device Identification |

The Network System ID bytes can be used to associate each device 115 with a particular network or networks. Typically, each device 115 will only recognize communications from other devices 115 whose System ID matches its own. This prevents interference from other independent networks operating within the same general vicinity. However, a device 115 may also be configured to accept communications from a group of one or more System ID's other than its own, or from all System ID's. This feature allows each network 100 to be configured as either a "closed" system (which ignores all devices 115 outside of its network) or an "open" system (which allows communication with devices outside of its network 100).

Broadcast Messaging

Broadcast messaging can be used to send a message to more than one destination device 115 at a time, or to a single device 115 of unknown location. Any network device 115 may broadcast a message for various purposes such as time synchronization, network-detection, device location, etc. Broadcast messages are not typically acknowledged by receiving devices 115. Exemplary identifiers used to broadcast a message are described below. Alternatively, the system can use other identifiers for desired broadcast messages.

(0xF0)—single-byte "TO" address: Used to broadcast a message to all devices 115 within direct communication range of an originating device 115.

(0xF1)—single-byte "TO" address: Used to broadcast a system-wide message to all devices 115 within the same network 100.

(0xF2)—six-byte "TO" address: Used to broadcast a message to specified device types within direct communication range of the originating device 115. An exemplary address format is defined below:

(0xF2)—broadcast identifier (0xtt)—device type (0xFF=all device types, ignore following bytes)

(0xss)—device sub-type (0xFF=all sub-types, ignore following bytes)

(0xvv)—firmware major version number (0xFF=all firmware versions)

(0xxx)—firmware minor version number (0xFF=all minor versions)

(0xFF)—not currently used (set to 0xFF)

(0xF3)—six-byte "TO" address: The same as "0xF2" above, except broadcasts a system-wide message to all devices 115 within the same network 100.

(0xFF)—six-byte "TO" address, plus one-byte data: Used to broadcast a system-wide message to a single device 115 within the network 100. An exemplary address format is defined below:

(0xFF)—broadcast identifier
(0xa1)—destination device address, byte 2
(0xa2)—destination device address, byte 3
(0xa3)—destination device address, byte 4
(0xa4)—destination device address, byte 5
(0xa5)—destination device address, byte 6

The first byte in the data section of the packet can contain the first byte of the destination device "TO" address (0xa0).

Message Sequencing

Application data is typically moved between network devices 115 and the site controller 110 in two ways: polled or interrupt-driven communications. A polled system is normally used to retrieve "on-demand" data from network devices 115, where an interrupt-driven system can retrieve pre-scheduled data from network devices 115 at regular intervals. A network 100 may be entirely polled, entirely interrupt-driven, or it may use a combination of polled and interrupt-driven communications.

In a polled system, the site controller 110 typically initiates all regular communications with devices 115 in its network 100, thus acting as network communications master. Network devices 115 can respond to commands issued in the site controller's 110 messages. The Site Controller 110 can receive a response (either a positive acknowledgement or a negative acknowledgement) to any message (except a Broadcast message) it sends to a network device 115.

In an interrupt-driven system, network devices 115 may initiate unsolicited messages to the site controller 110 either at pre-determined time intervals, or as the result of a specific event occurring at the device 115. Traffic of this type may include network-detection messages, emergency or alarm messages, and status reporting messages from low-power devices 115.

To maintain an orderly flow of network traffic within the system, a 1-byte sequence number can be assigned to each message issued by the site controller 110. Downstream messages originating from the site controller 110 can be assigned even numbers. Upstream responses to the site controller 110 typically the incoming message number plus one (odd). The message number is generally incremented (by two) by the site controller 110 each time it sends a message. In systems where a network device 115 sends an unsolicited message to the site controller 110 (network-detection messages, emergency traffic, etc.), the device 115 assigns an odd sequence number to the message, based on a random number generated internally by the device 115.

Message Routing

To deliver messages between the site controller 110 and any other device 115 in the network, a method of routing network traffic can be defined for both downstream (site controller 110 to device 115) and upstream (device to site controller 110) messages.

Downstream Message Routing

In an exemplary embodiment of the present invention, the site controller 110 builds a downstream message in one of two ways. If a destination device 115 is within direct communication range of the site controller 110, then the message is addressed directly to that device 115 (its address is used as the message "TO" address). If the destination device 115 is not within direct communication range of the site controller 110, however, then the site controller 110 can build a "Downstream Repeat" message (command 0x03). This message contains a list of 1-byte indexes which correspond to entries in the downstream address tables of repeating devices 115 that will be forwarding the message. This routing information can be used by each repeating device 115 in the chain to know how to forward the message. The last address in the chain can be a device 115 for which the original message was intended.

When a network device 115 also functions as a repeater, a dynamic Index Table of up to fourteen (14) downstream addresses can be maintained in the device's 115 non-volatile memory. These addresses are utilized during downstream repeat operations, and represent select devices 115 within communications range, which are located downstream of the current device 115. A single-byte index is specified in the downstream message to select one of the addresses from the table to use in forwarding the message to the next device 115.

Additionally, the site controller 110 may use the "0xFF" system-wide broadcast message to transmit a message downstream to a network device 115 of unknown location. This message can be forwarded throughout the entire network 100 until the destination device 115 is reached. The destination device 115 can then respond to the command contained in the broadcast message in the normal upstream manner.

Upstream Message Routing

Network devices 115 can respond to command messages (except Broadcast messages) by directly addressing the device 115 from which it received the command (swap message "TO" and "FROM" addresses). A repeating device 115, which receives an upstream response message (not "Upstream Repeat" command), can build an "Upstream Repeat" message (command 0x04), and forward this message to one of its dynamic upstream addresses. A repeating device 115, which receives an "Emergency Message" command (0xFF), can build an "Emergency Upstream Repeat" message (command 0x44), and forward this message to one of its upstream addresses. It is generally desirable to give upstream emergency traffic (command 0xFF or 0x44) priority over all other network traffic (see "Emergency Messaging").

When a network device 115 also functions as a repeater, up to sixteen (16) dynamic upstream addresses can be maintained in the device's non-volatile memory. These addresses are utilized to transmit messages in response to commands issued by the site controller, or to repeat (retransmit) normal upstream repeat messages. The addresses in the table are prioritized such that the highest priority upstream address can be used first. In the event that the message transmission to the highest priority address is not successful (negative acknowledge), the transmission can then be retried to the next highest priority upstream address. The transmission attempts will continue in this manner until either the message is acknowledged, or all upstream addresses have been tried.

Layer 4—Transport Layer

The Transport Layer defines how the application data is packetized and sequenced, such that all the requested data can be delivered successfully to a target device 115.

Message Data Section Formatting

A data payload transported by a single network message can be placed in a data section of the packet. Generally, message data can be placed immediately after a message header. The length of the data section can vary from 0-239 bytes, depending on the message header format and data payload. The message checksum immediately follows the data section. Application data that is less than or equal to the maximum data size can be transported in a single message. For data that is greater than the maximum data size, multiple packet transmissions can be utilized.

Multi-Packet Processing

For application data payloads that cannot be transported in a single message packet, multiple packet transmissions can be utilized. In an exemplary embodiment of the present invention, the first packet in a multi-packet session can contain a "Packet Number" value equal to "0x01" and a "Packet Maximum" value equal to the total number of packets needed to transport all of the application data. Subsequent packets preferably increment the "Packet Number" value, with the last packet in a multi-packet session having the "Packet Number" and "Packet Maximum" values equal.

A receiving device 115 can identify the start of a multi-packet session, by noting that the "Packet Number" and "Packet Maximum" values are not equal (a single-packet transmission will have both values equal to "0x01"). A receiving device 115 can acknowledge each packet in a multi-packet session, and can identify the last packet in a session by noting that the "Packet Number" and "Packet Maximum" values are equal. An originating device 115 can be adapted to resend any packets which are not positively acknowledged by the receiving device 115.

Layer 5—Session Layer

As those skilled in the art will understand, a session layer is sometimes not implemented or used in a communications protocol. Accordingly, in some embodiments of the present invention, a session layer is not used, while in other embodiments, a session layer is utilized. When utilized, a session layer preferably responds to service requests from the presentation layer and issues service requests to the transport layer.

A session layer provides a mechanism for managing dialogue between devices 115 and/or between the site controller 110 and one or more devices utilizing application processes. Indeed, the session layer provides for either duplex or half-duplex operation and can establish checkpointing, adjournment, termination, and restart procedures. The session layer can allow information on different streams, perhaps originating from different sources, to be properly combined. Thus in embodiments of the present invention where synchronization features are desired to ensure that the site controller 110 and devices 115 do not encounter inconsistent message and data transmissions, the session layer can be utilized.

Layer 6—Presentation Layer

As those skilled in the art will understand, a presentation layer is sometimes not implemented or used in a communications protocol. Accordingly, in some embodiments of the present invention, a presentation layer is not used, while in other embodiments, a session layer is utilized. When utilized, a presentation layer responds to service requests from the application layer and issues service requests to the session layer.

A presentation layer can be tasked with the delivery and formatting of information to the application layer for further processing or display. The presentation layer can relieve the application layer of concern regarding syntactical differences in data representation within the end-user systems.

Layer 7—Application Layer

The Application Layer can define command formats and functionality incorporated into each network device 115. Exemplary commands and functions which are non device-specific, and generally supported by all network devices 115 are discussed below. Those skilled in the art will recognize that numerous other commands may be used and implemented in accordance with the various embodiments of the present invention.

Command Structure

In an exemplary embodiment of the present invention, command byte codes are assigned and are used for devices 115 requiring those functions. Not all devices 115 support all, or possibly any, of the codes listed below. These codes are provides for example only, and are not intended to limit the various embodiments of the present invention. Further, the command descriptions are provided as exemplary descriptions for exemplary commands are not intended to limit the scope of the present invention.

Ping Command (0x00)

Sent by the site controller 110 to any network device 115 to solicit a ping response. A receiving device 115 echoes back the original message. The ping command is used to test a communications path between any two devices in the network 100. According to some embodiments of the present invention, a data payload does need to be sent with a ping command. required.

Positive Acknowledgement (0x01)

A positive acknowledgement command can be sent from one network device 115 to another to acknowledge receipt of a message. The positive acknowledgement command enables devices to acknowledgement receipt of a transmission from a sending device. According to some embodiments of the present invention, a data payload does need to be sent with a positive acknowledgement command.

Negative Acknowledgement (0x02)

A negative acknowledgement command can be sent in an upstream message by the site controller 110 or by a repeating network device 115 whenever a downstream repeat message is not acknowledged by the addressed device 115. According to some embodiments of the present invention, a data payload does need to be sent with a negative acknowledgement command.

Downstream Repeat (0x03)

A downstream repeat command can be sent by the site controller 110 to any network device 115. The downstream repeat command can be used when a message is being sent to a network device 115 that is not within direct communication range of the site controller 110. Addressing information (repeater table indexes) is provided to route the message to a target device 115. The data area of the packet can be formatted as follows:

(nn)—downstream link count (1 byte)
(tt . . . )—list of repeater table indexes (nn bytes)
(aaaaaaaaaaaa)—destination address (6 bytes)
(cc)—destination command (1 byte)
(dd . . . )—destination data (variable length)

If the link count is not zero, then a repeating network device 115, which receives this command, can decrement the link count (nn) and remove the first byte in the list of table indexes (tt . . . ). The device 115 can then use the table index byte to obtain the new "TO" address by indexing into its Repeater Address Table.

If the link count equals zero, then a device 115 can remove the link count byte (nn) and use the 6-byte destination address (aaaaaaaaaaaa) as the new "TO" address. The command byte (CMD) can be replaced with the destination command (cc), and both the destination address (aaaaaaaaaaaa) and destination command (cc) can be removed from the message. This leaves the original message header and destination data (dd . . . ), which can be forwarded to a destination device 115.

Upstream Repeat (0x04)

An upstream repeat command can be sent by a repeating device 115 to the site controller 110 or another repeating device 115. The upstream repeat command can be used to forward a response message upstream to the site controller 110. The data area of the packet can be formatted as follows:

(nn)—upstream link count (1 byte)
    (tt . . . )—list of repeater table indexes (nn bytes)
    (cc)—original message command (1 byte)
    (ss)—originating link signal strength (1 byte)
    (aaaaaaaaaaaa)—original message "TO" address (6 bytes)
    (bbbbbbbbbbbb)—original message "FROM" address (6 bytes)
    (dd . . . )—original message data (variable length)

When a repeating network device 115 receives a standard response message (other than "Upstream Repeat" command), it can forward the message to its highest priority upstream address by creating an "Upstream Repeat" command (0x04) message. The repeating device 115 can first place the original message command byte (CMD) in the (cc) field, and set a new message command byte to "0x04". The repeating device 115 can then set the link count byte (nn) to "0x00", place the 6-byte "TO" address of the original message in the address field (aaaaaaaaaaaa) and place the 6-byte "FROM" address of the original message in the address field (bbbbbbbbbbbb). The link signal strength byte can be placed in the (ss) field (if not supported, a "0x00" byte can be used). The original message data can be placed in the variable-length data section (dd . . . ).

As each subsequent network device 115 forwards the message upstream, it can increment the link count (nn) and add its 1-byte downstream table index to the beginning of the repeater table index list (tt . . . ).

Read Status (0x10)

A read status command can be sent by the site controller 110 to a network device 115. The read status command can be used to retrieve current status information from a device 115. The status information can be returned in the data area of a response packet, and can be unique to each device 115.

Data Transport (0x20)

A data transport command can be used to move application-specific data from one network device 115 to another. A user-defined application data message can be placed in the data area of a packet and can be any length as long as the maximum packet size is not exceeded. A receiving device 115 can send a response packet, which may contain any user-defined application data that can to be returned to an originating device 115.

Load Repeater Table Addresses (0x40)

A load repeater table address can be sent by the site controller 110 to a repeating network device 115. The load repeater table address command is used to load device addresses into a dynamic Repeater Table. From 1 to 16 addresses can be loaded by specifying the number of addresses to load and the starting table index. The data area of a packet can be formatted as follows:

(nn)—number of table addresses (1 byte, value=1-16)
    (aa)—start table index (1 byte, value=0-15)
    (dd . . . )—table address data (6-96 bytes)

Emergency Message Upstream Repeat (0x44)

The emergency message upstream repeat command can be sent by a repeating device 115 to the site controller 110 or to another repeating device 115. The emergency message upstream repeat command can be used to forward an emergency message upstream to the site controller 110. Emergency upstream traffic is generally given priority over standard (or normal) upstream traffic, and repeating network devices 115 will preferably continue to transmit the message until it is acknowledged to ensure receipt. Also, any repeating network device 115 which is currently processing emergency upstream traffic preferably ignores other network traffic until the emergency message is processed. Except for the command byte (CMD), the message format and procedure can be the same as the "Upstream Repeat" command (0x04).

General Data Request (0x55)

A general data request command can be sent by the site controller 110 to a network device 115. This command can be used to request eighteen (18) bytes of general data from a device 115. The general data can include the following information:

(vvvv)—firmware version number (2 bytes)
    (pppp)—number of power failures (2 bytes)
    (rrrr)—number of device resets (2 bytes)
    (aaaaaaaaaaaa)—first dynamic repeater table address (6 bytes)
    (bbbbbbbbbbbb)—second dynamic repeater table address (6 bytes)

A receiving device 115 can send a response packet with the 18 bytes of general data in the data area.

Device Sleep (0x60)

A device sleep command can be sent by the site controller 110 to place a device into power-down or "sleep" mode, to conserve power in low-power or battery-powered devices. The device 115 can remain in "sleep" mode for the number of minutes specified by the 2-byte "time to sleep" parameter, which can be placed in the data area of the packet as follows:

(nnnn)—number of minutes (0-65535)

In accordance with some embodiments of the present invention, the devices 115 can also utilize and implement a time-out feature. This feature can automatically place a device 115 in "sleep" mode if this command is not received within a pre-defined period of time.

Device Install (0x80)

A device install command can be sent by a network device 115 to the site controller 110. This command can be used to notify the site controller 110 that a device 115 is attempting to either install itself into the network 100 for the first time, or re-establish communication with neighboring devices 115. A network device 115 can send the device command packet to the site controller 110 after building its dynamic repeater table of neighboring devices 115.

Device Test (0x90)

A device test command can be provided for device functional testing during manufacturing. While it can be used for other purposes, it is preferably generally not used for other purposes.

Load Device Firmware (0xA0)

A load device firmware command can be sent by the site controller 110 to a network device 115. This command is used to download a new firmware image, updated firmware image, or existing firmware image to a network device 115. The data area of the packet can be formatted as follows:

(nn)—length of data block (1 byte)
    (aaaa)—data block start offset (2 bytes)
    (dd . . . )—firmware image data (1-236 bytes)

The firmware binary image can be segmented into blocks and sent to a target device 115 using multiple packets.

Reserved Commands (0xE0-0xEF)

In an exemplary embodiment of the present invention, reserved commands are reserved and are preferably not used in communicating with a network device 115 in accordance with some embodiments of the present invention.

Emergency Message (0xFF)

Sent by a network device to the site controller 110. This command is used by a network device 115 to report an emergency condition to the site controller 110. Repeating devices 115 which receive this command can forward the message using the "Emergency Message Upstream Repeat" command (0x44). The data area of the packet can contain status information regarding the nature of the emergency condition, which can be unique to each device type.

Emergency Messaging

In an exemplary embodiment of the present invention, the system can handle both "normal" and "emergency" traffic flow throughout the network 100. Emergency message traffic can be identified as being either an "Emergency Message" command (0xFF), or an "Emergency Message Upstream Repeat" command (0x44). A network device 115 adapted to send an emergency message to the site controller 110, can use the "Emergency Message" command (0xFF). A device 115 functioning as a repeater, which receives an emergency message (0xFF), preferably changes the command byte (CMD) from "0xFF" to "0x44" to indicate an "Emergency Message Upstream Repeat" command. It can then retransmit (relay) the message upstream to the site controller 110 in the normal Upstream Repeat manner.

Network devices 115 generally process both "emergency" and "normal" messages in a similar manner provided there is enough system bandwidth to handle all message traffic flow. In the event that system bandwidth becomes limited and a conflict in traffic flow exists, however, emergency message traffic can be given priority over normal traffic. This means that a device 115 that is currently processing an emergency message (command "0xFF" or "0x44") can ignore other message traffic until it has completed processing the emergency message.

Similarly, a device 115 which is currently processing a normal message (other than command "0xFF" or "0x44") and receives an emergency message, can terminate its normal message processing and process the emergency traffic instead. Such actions assure that the emergency traffic will be forwarded to the site controller 110 as quickly as possible.

Automatic Network Detection (AND)

The Automatic Network Detection (AND) feature can be used by devices 115 to automatically install themselves into an existing network 100, or to re-establish communication with a non-responding network node. Typically, most devices 115 are programmed during manufacturing such that their dynamic Repeater Table contains no valid addresses, forcing the devices 115 into "AND" mode. A device 115 can also enter "AND" mode any time it loses communication with one or more neighboring network devices 115. A device 115 can exit "AND" mode and can become an active node when its dynamic Repeater Table contains one or more valid device addresses.

Once a device 115 enters "AND" mode, it can broadcast a network-detection beacon to neighboring devices at approximately 5-minute intervals. A device 115 which hears this beacon and is already an active network node (its Repeater Table contains at least one valid device address), can broadcast a response beacon. The originating device 115 listens for these response beacons, and builds its dynamic Repeater Table using the addresses of its neighboring devices, up to a maximum of 16 devices. After a beaconing cycle has completed, the network device 115 sends a Device Install command "0x80" to the site controller 110. If no devices 115 respond to a network-detection beacon, then an originating device 115 can continue to broadcast a beacon at 5-minute intervals until at least one response is received. A network device 115 can also be forced into "AND" mode at any time by clearing it's dynamic Repeater Table using command "0x40".

Upgrading Device Firmware

Some embodiments of the present invention can also upgrade device 115 firmware. Typically, devices 115 are programmed during manufacturing with an initial firmware image which controls device operation. The program memory (code space) within each device 115 is segmented such that half of the available memory is used to hold the current firmware image, and the other half is left as unused code space. When a new firmware image is downloaded to a network device 115, it is placed in the unused code space, and the original firmware image is typically erased.

First, a binary image file for the new firmware can be created. The image file can have a special header at the start-of-file, and can have a 16-bit checksum appended to the end-of-file. The image can be split into multiple data blocks and transferred to the destination device using the "Load Device Firmware" command (0xA0). Each data block is sent with a block header which specifies the block size and the relative offset from the start of the image (first block has offset=0). A destination device 115 can rebuild the new firmware image in its unused code space by writing the data blocks into the appropriate offsets in memory. After a destination device 115 receives the last image data block, it can then verify the integrity of the new image by calculating a 16-bit checksum (CRC) and comparing the result to the checksum that was sent with the image (last 2 bytes). If the checksum matches, then a device 115 transfers control to the new firmware image. If the checksum does not match, then no action is taken and the transmitted image can be resent. Once new firmware is executed on a destination device 115, the original firmware image is erased and that memory becomes unused code space. The erase memory will then be used to build the next firmware image that is downloaded.

The site controller 110 can confirm that new firmware image has been loaded successfully by verifying the firmware version number on a destination device 115 using a "General Data Request" command (0x55). If the version number that is returned does not match the version number of the new image file, then a firmware image can be resent.

New firmware can be downloaded directly to a single destination device 115 by specifying the destination device address, or it can be broadcast to a group of devices 115 by using one of the methods of message broadcasting. If the firmware image is downloaded using a broadcast method, there is no acknowledgement at the individual packet level, and the entire image can be sent before a successful transfer can be verified.

The embodiments discussed herein are intended to illustrate the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

I claim:

1. In a wireless communication network having a plurality of remote devices, a system comprising:
    a first remote device of the plurality of remote devices in wireless communication with at least a second remote device of the plurality of remote devices, the second remote device located downstream from the first remote device;
    wherein the first remote device is configured to monitor successful and unsuccessful transmissions to one or more of the plurality of remote devices as the first remote device communicates with the plurality of remote devices in the network and maintain a connection list identifying the plurality of wireless remote devices and a plurality of success data scores representative of the successful and unsuccessful transmissions to one or more of the plurality of remote devices, and wherein, based on the plurality of success data scores and the connection list, the first remote device is configured to determine a successful wireless communication path from the connection list through which the first remote device can make a transmission.

2. The system of claim 1, wherein the successful wireless communication path is configured to wirelessly couple the first remote device directly to a site controller.

3. The system of claim 2, wherein the successful wireless communication path is further configured to indirectly couple the second remote device to the site controller.

4. The system of claim 1, wherein the successful wireless communication path is configured to wirelessly couple the first remote device to a third remote device of the plurality of remote devices and wherein the third remote device is selected because it is associated with a favorable success data score.

5. The system of claim 1, wherein the second remote device is configured to maintain a connection list identifying the plurality of wireless remote devices and a plurality of success data scores.

6. The system of claim 1, wherein the first remote device is configured to address a data packet to the second remote device, the data packet comprising identification information of the first remote device and the second remote device.

7. The system of claim 6, wherein the transmission comprises forwarding the data packet to a third remote device.

8. The system of claim 6, wherein the transmission comprises forwarding the data packet to a site controller.

9. In a wireless network having a plurality of remote devices, the plurality of remote devices each having a remote device logic, a method comprising:

transmitting, by a first remote device of the plurality of remote devices, a data packet along a first wireless transmission pathway;

receiving, by a second remote device of the plurality of remote devices, the data packet; and forwarding, by the second remote device, the data packet to a third remote device wherein the transmitting, by the first remote device comprises:

identifying, by the remote device logic, a plurality of success data scores representative of successful and unsuccessful wireless transmission pathways, selecting, from a connection list, a wireless communication pathway that has a success data score representative of a successful transmission pathway, transmitting, by the first remote device, the data packet to the wireless communication pathway selected from the connection list, and monitoring, by the first remote device, successful and unsuccessful transmissions to the plurality of remote devices.

10. The method of claim 9, further comprising: maintaining, by a memory, the connection list wherein the maintaining comprises identifying one or more of said plurality of remote devices and a success data score representative of successful and unsuccessful transmissions to remote devices.

11. The method of claim 9, wherein the second wireless communication pathway is selected because it is associated with a favorable transmission success record as indicated by the success data score.

12. The method of claim 9, further comprising the step of selecting a wireless communication pathway from the second remote device to a site controller.

13. A wireless remote device configured to communicate wirelessly with a wireless remote device network comprising a plurality of wireless remote devices, the wireless remote device comprising:

a transceiver;

a logic unit; and a memory;

wherein the logic unit is configured to monitor successful and unsuccessful transmissions to one or more of the plurality of remote devices as the wireless remote device communicates with the wireless remote device network and compute a plurality of success data scores representative of one or more successful and unsuccessful transmission communication pathways within the wireless remote device network, and wherein the memory comprises a connection list identifying at least one transmission communication pathway and a success data score representative of successful and unsuccessful transmissions of the at least one transmission communication pathway within the wireless remote device network.

14. The wireless remote device of claim 13, wherein the memory includes instructions that, when executed, identify one of a first transmission communication pathway and a second transmission communication pathway on which to make a transmission.

15. The wireless remote device of claim 14, wherein at least one of the first transmission communication pathway and the second transmission communication pathway comprises a success data score corresponding to a successful transmission communication pathway.

* * * * *